(12) United States Patent
Elberbaum

(10) Patent No.: US 8,170,722 B1
(45) Date of Patent: *May 1, 2012

(54) METHOD AND APPARATUS FOR CODING AND LINKING ELECTRICAL APPLIANCES FOR CONTROL AND STATUS REPORT

(75) Inventor: David Elberbaum, Tokyo (JP)

(73) Assignee: Elbex Video Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/963,876

(22) Filed: Dec. 9, 2010

(51) Int. Cl.
*G05D 3/12* (2006.01)
*G05B 19/18* (2006.01)
*G05B 15/02* (2006.01)
*G05B 11/01* (2006.01)
*G05B 13/02* (2006.01)
*H04H 20/71* (2008.01)
*H04B 1/02* (2006.01)
*H04B 1/18* (2006.01)
*H04B 1/06* (2006.01)

(52) U.S. Cl. .......... 700/295; 700/3; 700/9; 700/20; 700/32; 455/3.03; 455/92; 455/151.1; 455/352; 455/419

(58) Field of Classification Search .......... 700/3, 9, 700/20, 32, 295; 714/E11.04; 455/3.03, 455/92, 151.1, 352, 353, 408, 419
See application file for complete search history.

(56) References Cited

U.S. PATENT DOCUMENTS

| | | | | | |
|---|---|---|---|---|---|
| 3,325,593 | A | * | 6/1967 | Platt et al. | 398/106 |
| 5,528,215 | A | * | 6/1996 | Siu et al. | 340/286.01 |
| 5,572,438 | A | * | 11/1996 | Ehlers et al. | 700/295 |
| 5,581,701 | A | * | 12/1996 | Fukatsu | 709/208 |
| 5,706,191 | A | * | 1/1998 | Bassett et al. | 700/9 |
| 5,923,363 | A | * | 7/1999 | Elberbaum | 348/156 |
| 6,208,905 | B1 | * | 3/2001 | Giddings et al. | 700/11 |
| 6,603,842 | B2 | * | 8/2003 | Elberbaum | 379/106.01 |
| 6,834,208 | B2 | * | 12/2004 | Gonzales et al. | 700/86 |
| 6,990,335 | B1 | * | 1/2006 | Shamoon et al. | 455/419 |
| 7,082,339 | B2 | * | 7/2006 | Murray et al. | 700/83 |
| 7,177,633 | B2 | * | 2/2007 | Ishiwatari | 455/418 |
| 7,461,012 | B2 | * | 12/2008 | Elberbaum | 705/27.1 |
| 7,639,907 | B2 | * | 12/2009 | Elberbaum | 385/24 |
| 8,027,752 | B2 | * | 9/2011 | Castaldo et al. | 700/296 |

(Continued)

OTHER PUBLICATIONS

Cross et al., "A Fiber Optic Home Automation System" 1993, IEEE, p. 636-645.*

(Continued)

*Primary Examiner* — Albert Decady
*Assistant Examiner* — Thomas Stevens
(74) *Attorney, Agent, or Firm* — Katten Muchin Roseman LLP

(57) ABSTRACT

A coding method and apparatus for linking electrical appliances for control and status reporting by arbitrarily appending the appliances remote control protocol with the premise's room/zone code for identifying the appliance location and ID-code to operate on the basis of the appliance type and function, sub header code define the command nature, a blank header identifies the signal and a checksum trailer ends the five byte command for operating a range of appliances, lights and LED illuminators, locally and in the different rooms, bathrooms, kitchen and laundry including provision for extending the commands when needed. Current sensors for power outlets and power cables linked via lightguides or fiber optic use same codes for reporting statuses of and current consumption by the appliances and lights to the video interphone or the shopping terminal. LED bulbs are coded through an optical transceiver accessed through the rear of the bulb socket.

39 Claims, 30 Drawing Sheets

U.S. PATENT DOCUMENTS

2005/0188279 A1* 8/2005 Gibble et al. ............... 714/42
2009/0121842 A1* 5/2009 Elberbaum ............... 340/10.5
2011/0202194 A1* 8/2011 Kobraei et al. ............. 700/295

OTHER PUBLICATIONS

Hanover-G., "Network the Intelligent Home", 1989, IEEE, p. 48-49.*
Douligeris-C., "Intelligent Home Systems", 1993, IEEE, p. 52-61.*
Elbex Divira_System5.brochure, 2008, 10 pages.*
Han et al., "Remote-Controllable and Energy-Saving Room Architecture based on ZigBee Communication", IEEE, 2009, p. 264-268.*
Kim et al., "A Wireless Sensor Node SoC with a Profiled Power Management Unit for IR Controllable Digital Consumer Devices", IEEE, Nov. 2010, p. 2282-2287.*

* cited by examiner

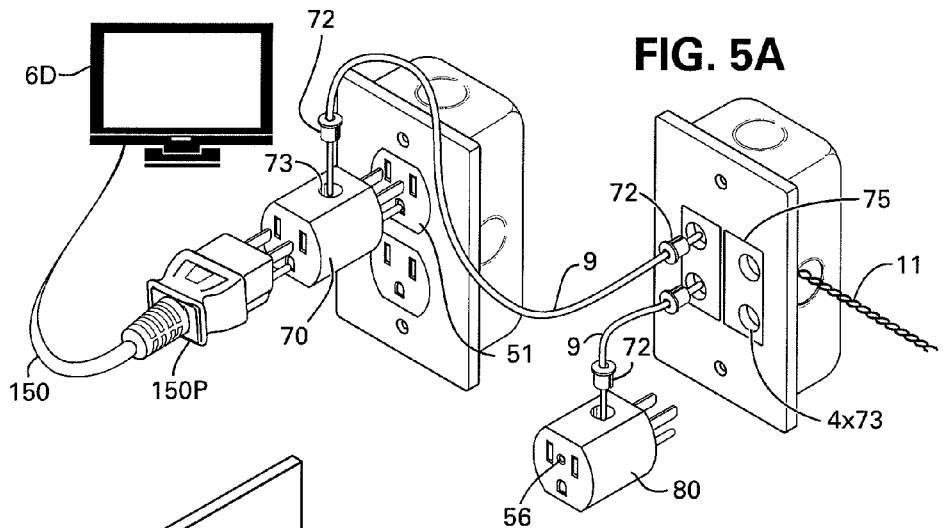
FIG. 5A
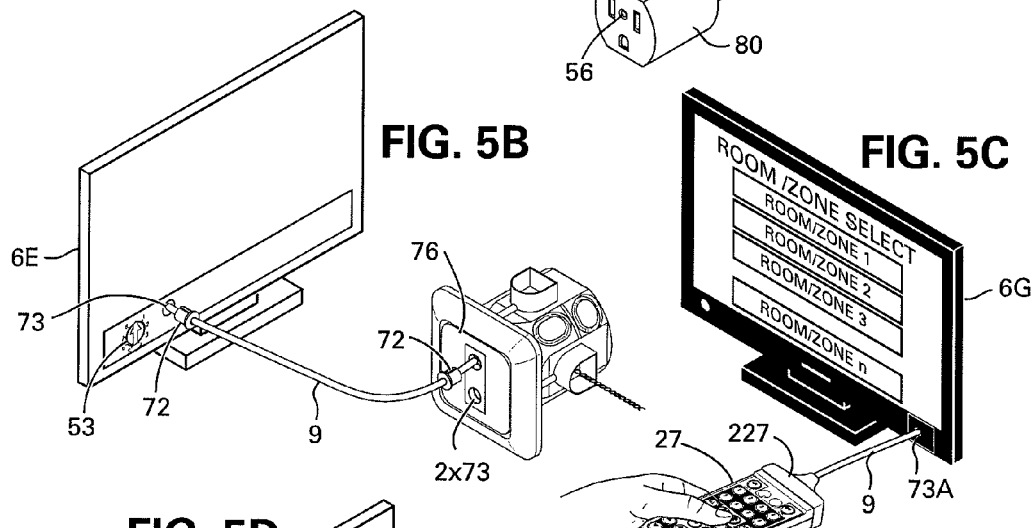
FIG. 5B
FIG. 5C
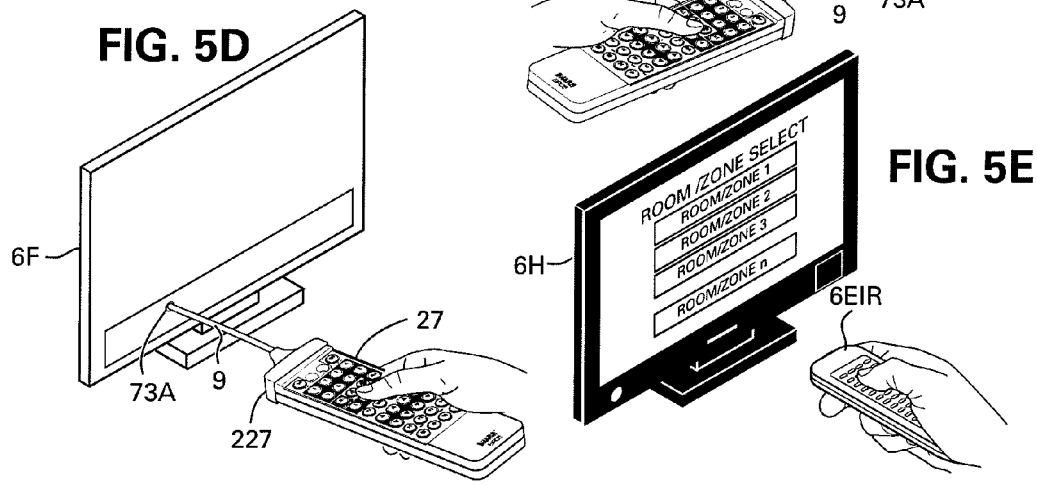
FIG. 5D
FIG. 5E

FIG. 6A
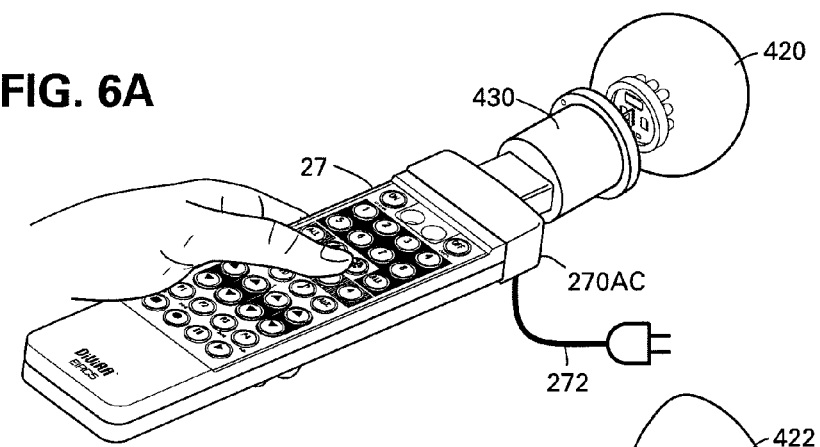
FIG. 6B
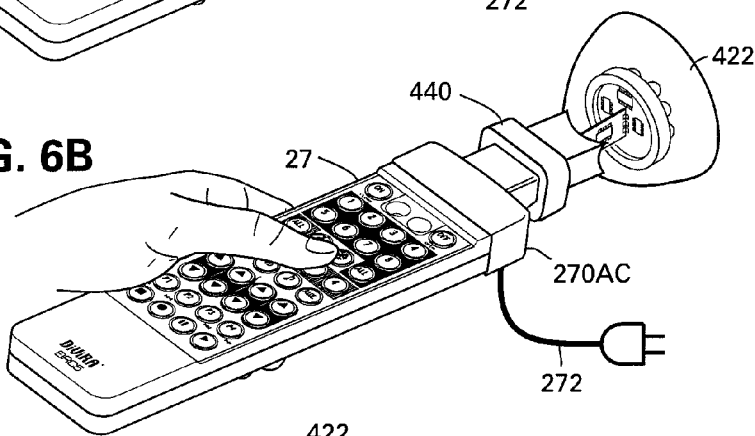
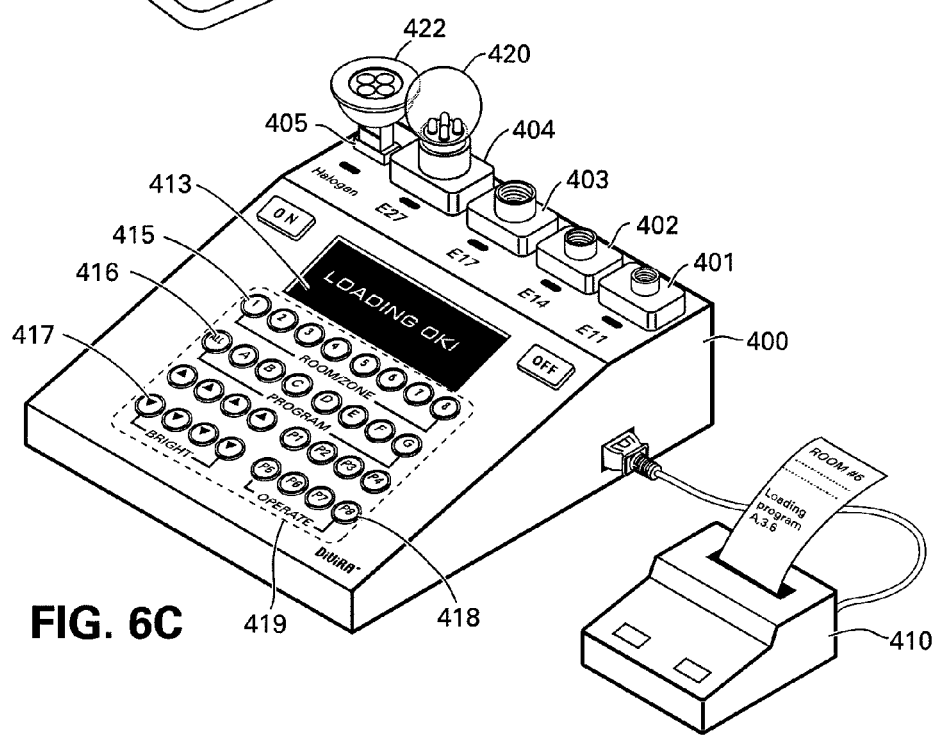
FIG. 6C

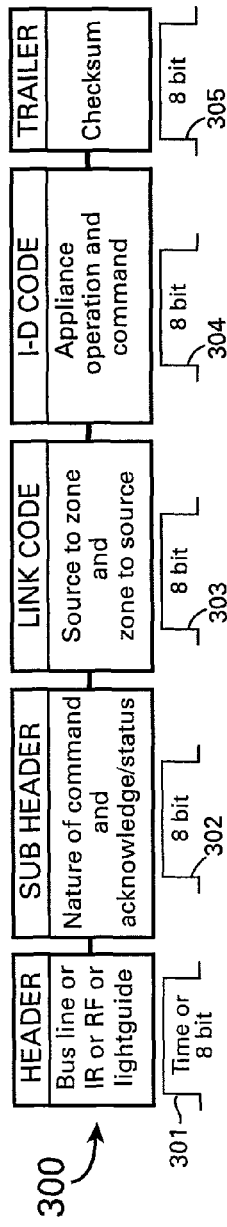
FIG. 10A  FIVE BYTE COMMAND/REPLY STRUCTURE
FIG. 10B  SOURCE ←→ ZONES OR ROOMS LINK CODE

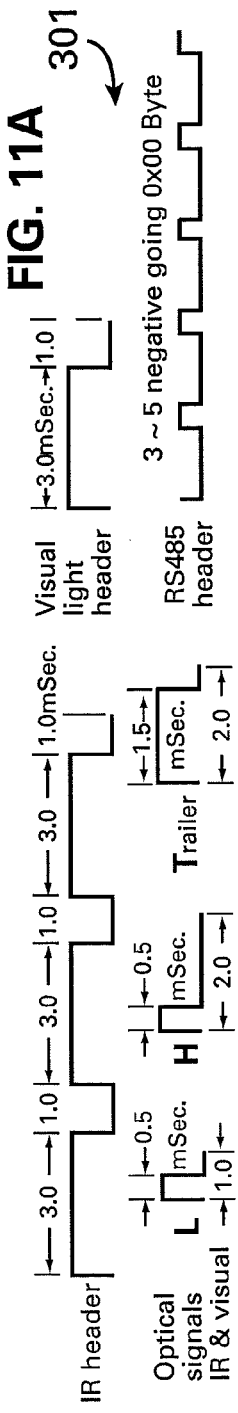

FIG. 11A

FIG. 11B  I-D CODE ⟷ BASIC - LIGHT #1, HVAC AND CURTAIN #1

| Function | | | Room/zone #1 | | | Room/zone #3 | | | Room/zone #5 | | | Room/zone #7 | | | Common #0 | | |
|---|---|---|---|---|---|---|---|---|---|---|---|---|---|---|---|---|---|
| Light #1 | HVAC | Crtn. #1 | Light #1 | HVAC | Crtn. #1 | Light #1 | HVAC | Crtn. #1 | Light #1 | HVAC | Crtn. #1 | Light #1 | HVAC | Crtn. #1 | Light #1 | HVAC | Crtn. #1 |
| Status | Status | Status | 0x01 | 0x51 | 0xa1 | 0x11 | 0x61 | 0xb1 | 0x21 | 0x71 | 0xc1 | 0x31 | 0x81 | 0xd1 | 0x41 | 0x91 | 0xe1 |
| On | On | Open | 0x02 | 0x52 | 0xa2 | 0x12 | 0x62 | 0xb2 | 0x22 | 0x72 | 0xc2 | 0x32 | 0x82 | 0xd2 | 0x42 | 0x92 | 0xe2 |
| Off | Off | Close | 0x03 | 0x53 | 0xa3 | 0x13 | 0x63 | 0xb3 | 0x23 | 0x73 | 0xc3 | 0x33 | 0x83 | 0xd3 | 0x43 | 0x93 | 0xe3 |
| Spare | Spare | Spare | 0x04 | 0x54 | 0xa4 | 0x14 | 0x64 | 0xb4 | 0x24 | 0x74 | 0xc4 | 0x34 | 0x84 | 0xd4 | 0x44 | 0x94 | 0xe4 |
| ↑Dim | Temp. Pos. | | 0x05 | 0x55 | 0xa5 | 0x15 | 0x65 | 0xb5 | 0x25 | 0x75 | 0xc5 | 0x35 | 0x85 | 0xd5 | 0x45 | 0x95 | 0xe5 |
| ↓Dim | Temp. Pos. | | 0x06 | 0x56 | 0xa6 | 0x16 | 0x66 | 0xb6 | 0x26 | 0x76 | 0xc6 | 0x36 | 0x86 | 0xd6 | 0x46 | 0x96 | 0xe6 |
| ↑Prog. | Fan | Tilt | 0x07 | 0x57 | 0xa7 | 0x17 | 0x67 | 0xb7 | 0x27 | 0x77 | 0xc7 | 0x37 | 0x87 | 0xd7 | 0x47 | 0x97 | 0xe7 |
| ↓Prog. | Fan | Tilt | 0x08 | 0x58 | 0xa8 | 0x18 | 0x68 | 0xb8 | 0x28 | 0x78 | 0xc8 | 0x38 | 0x88 | 0xd8 | 0x48 | 0x98 | 0xe8 |
| Function | | | Room/zone #2 | | | Room/zone #4 | | | Room/zone #6 | | | Room/zone #8 | | | Local #9 | | |
| Light #1 | HVAC | Crtn. #1 | Light #1 | HVAC | Crtn. #1 | Light #1 | HVAC | Crtn. #1 | Light #1 | HVAC | Crtn. #1 | Light #1 | HVAC | Crtn. #1 | Light #1 | HVAC | Crtn. #1 |
| Status | Status | Status | 0x09 | 0x59 | 0xa9 | 0x19 | 0x69 | 0xb9 | 0x29 | 0x79 | 0xc9 | 0x39 | 0x89 | 0xd9 | 0x49 | 0x99 | 0xe9 |
| On | On | Open | 0x0a | 0x5a | 0xaa | 0x1a | 0x6a | 0xba | 0x2a | 0x7a | 0xca | 0x3a | 0x8a | 0xda | 0x4a | 0x9a | 0xea |
| Off | Off | Close | 0x0b | 0x5b | 0xab | 0x1b | 0x6b | 0xbb | 0x2b | 0x7b | 0xcb | 0x3b | 0x8b | 0xdb | 0x4b | 0x9b | 0xeb |
| Spare | Spare | Spare | 0x0c | 0x5c | 0xac | 0x1c | 0x6c | 0xbc | 0x2c | 0x7c | 0xcc | 0x3c | 0x8c | 0xdc | 0x4c | 0x9c | 0xec |
| ↑Dim | Temp. Pos. | | 0x0d | 0x5d | 0xad | 0x1d | 0x6d | 0xbd | 0x2d | 0x7d | 0xcd | 0x3d | 0x8d | 0xdd | 0x4d | 0x9d | 0xed |
| ↓Dim | Temp. Pos. | | 0x0e | 0x5e | 0xae | 0x1e | 0x6e | 0xbe | 0x2e | 0x7e | 0xce | 0x3e | 0x8e | 0xde | 0x4e | 0x9e | 0xee |
| ↑Prog. | Fan | Tilt | 0x0f | 0x5f | 0xaf | 0x1f | 0x6f | 0xbf | 0x2f | 0x7f | 0xcf | 0x3f | 0x8f | 0xdf | 0x4f | 0x9f | 0xef |
| ↓Prog. | Fan | Tilt | 0x10 | 0x60 | 0xb0 | 0x20 | 0x70 | 0xc0 | 0x30 | 0x80 | 0xd0 | 0x40 | 0x90 | 0xe0 | 0x50 | 0xa0 | 0xf0 |

FIG. 12

I-D CODE ◄──► EXTENDED - LIGHT #1, HVAC AND CURTAIN #1

| Function | | Room/zone #1 | | | Room/zone #3 | | | Room/zone #5 | | | Room/zone #7 | | | Common #0 | | |
|---|---|---|---|---|---|---|---|---|---|---|---|---|---|---|---|---|
| Light #1 | HVAC | Crtn. #1 | Light #1 | HVAC | Crtn. #1 | Light #1 | HVAC | Crtn. #1 | Light #1 | HVAC | Crtn. #1 | Light #1 | HVAC | Crtn. #1 |
| Dim 1 | Temp.1 | Pos. A | 0x01 | 0x51 | 0xa1 | 0x11 | 0x61 | 0xb1 | 0x21 | 0x71 | 0xc1 | 0x31 | 0x81 | 0xd1 | 0x41 | 0x91 | 0xe1 |
| Dim 2 | Temp.2 | Pos. B | 0x02 | 0x52 | 0xa2 | 0x12 | 0x62 | 0xb2 | 0x22 | 0x72 | 0xc2 | 0x32 | 0x82 | 0xd2 | 0x42 | 0x92 | 0xe2 |
| Dim 3 | Temp.3 | Pos. C | 0x03 | 0x53 | 0xa3 | 0x13 | 0x63 | 0xb3 | 0x23 | 0x73 | 0xc3 | 0x33 | 0x83 | 0xd3 | 0x43 | 0x93 | 0xe3 |
| Dim 4 | Temp.4 | Pos. D | 0x04 | 0x54 | 0xa4 | 0x14 | 0x64 | 0xb4 | 0x24 | 0x74 | 0xc4 | 0x34 | 0x84 | 0xd4 | 0x44 | 0x94 | 0xe4 |
| Candl. | Cool | Spare | 0x05 | 0x55 | 0xa5 | 0x15 | 0x65 | 0xb5 | 0x25 | 0x75 | 0xc5 | 0x35 | 0x85 | 0xd5 | 0x45 | 0x95 | 0xe5 |
| Color | Heat | Spare | 0x06 | 0x56 | 0xa6 | 0x16 | 0x66 | 0xb6 | 0x26 | 0x76 | 0xc6 | 0x36 | 0x86 | 0xd6 | 0x46 | 0x96 | 0xe6 |
| Option | Option | Option | 0x07 | 0x57 | 0xa7 | 0x17 | 0x67 | 0xb7 | 0x27 | 0x77 | 0xc7 | 0x37 | 0x87 | 0xd7 | 0x47 | 0x97 | 0xe7 |
| Status | Status | Status | 0x08 | 0x58 | 0xa8 | 0x18 | 0x68 | 0xb8 | 0x28 | 0x78 | 0xc8 | 0x38 | 0x88 | 0xd8 | 0x48 | 0x98 | 0xe8 |

| Function | | Room/zone #2 | | | Room/zone #4 | | | Room/zone #6 | | | Room/zone #8 | | | Local #9 | | |
|---|---|---|---|---|---|---|---|---|---|---|---|---|---|---|---|---|
| Light #1 | HVAC | Crtn. #1 | Light #1 | HVAC | Crtn. #1 | Light #1 | HVAC | Crtn. #1 | Light #1 | HVAC | Crtn. #1 | Light #1 | HVAC | Crtn. #1 |
| Dim 1 | Temp.1 | Pos. A | 0x09 | 0x59 | 0xa9 | 0x19 | 0x69 | 0xb9 | 0x29 | 0x79 | 0xc9 | 0x39 | 0x89 | 0xd9 | 0x49 | 0x99 | 0xe9 |
| Dim 2 | Temp.2 | Pos. B | 0x0a | 0x5a | 0xaa | 0x1a | 0x6a | 0xba | 0x2a | 0x7a | 0xca | 0x3a | 0x8a | 0xda | 0x4a | 0x9a | 0xea |
| Dim 3 | Temp.3 | Pos. C | 0x0b | 0x5b | 0xab | 0x1b | 0x6b | 0xbb | 0x2b | 0x7b | 0xcb | 0x3b | 0x8b | 0xdb | 0x4b | 0x9b | 0xeb |
| Dim 4 | Temp.4 | Pos. D | 0x0c | 0x5c | 0xac | 0x1c | 0x6c | 0xbc | 0x2c | 0x7c | 0xcc | 0x3c | 0x8c | 0xdc | 0x4c | 0x9c | 0xec |
| Candl. | Cool | Spare | 0x0d | 0x5d | 0xad | 0x1d | 0x6d | 0xbd | 0x2d | 0x7d | 0xcd | 0x3d | 0x8d | 0xdd | 0x4d | 0x9d | 0xed |
| Color | Heat | Spare | 0x0e | 0x5e | 0xae | 0x1e | 0x6e | 0xbe | 0x2e | 0x7e | 0xce | 0x3e | 0x8e | 0xde | 0x4e | 0x9e | 0xee |
| Option | Option | Option | 0x0f | 0x5f | 0xaf | 0x1f | 0x6f | 0xbf | 0x2f | 0x7f | 0xcf | 0x3f | 0x8f | 0xdf | 0x4f | 0x9f | 0xef |
| Status | Status | Status | 0x10 | 0x60 | 0xb0 | 0x20 | 0x70 | 0xc0 | 0x30 | 0x80 | 0xd0 | 0x40 | 0x90 | 0xe0 | 0x50 | 0xa0 | 0xf0 |

I-D CODE ←→ EXTENDED - LIGHTS #2 ~ #8 FOR ALL ROOMS/COMMON.
ZONES AND LIGHTS ARE LINKED BY SUB HEADER CODES OF FIG. 13B.

304

| Function | Light #2 | Light #3 | Light #4 | Light #5 | Light #6 | Light #7 | Light #8 | Light all #0 |
|---|---|---|---|---|---|---|---|---|
| Status | 0x01 | 0x11 | 0x21 | 0x31 | 0x41 | 0x51 | 0x61 | 0x71 |
| On | 0x02 | 0x12 | 0x22 | 0x32 | 0x42 | 0x52 | 0x62 | 0x72 |
| Off | 0x03 | 0x13 | 0x23 | 0x33 | 0x43 | 0x53 | 0x63 | 0x73 |
| Spare | 0x04 | 0x14 | 0x24 | 0x34 | 0x44 | 0x54 | 0x64 | 0x74 |
| ↑Dim | 0x05 | 0x15 | 0x25 | 0x35 | 0x45 | 0x55 | 0x65 | 0x75 |
| ↓Dim | 0x06 | 0x16 | 0x26 | 0x36 | 0x46 | 0x56 | 0x66 | 0x76 |
| ↑Prog. | 0x07 | 0x17 | 0x27 | 0x37 | 0x47 | 0x57 | 0x67 | 0x77 |
| ↓Prog. | 0x08 | 0x18 | 0x28 | 0x38 | 0x48 | 0x58 | 0x68 | 0x78 |
| Dim 1 | 0x09 | 0x19 | 0x29 | 0x39 | 0x49 | 0x59 | 0x69 | 0x79 |
| Dim 2 | 0x0a | 0x1a | 0x2a | 0x3a | 0x4a | 0x5a | 0x6a | 0x7a |
| Dim 3 | 0x0b | 0x1b | 0x2b | 0x3b | 0x4b | 0x5b | 0x6b | 0x7b |
| Dim 4 | 0x0c | 0x1c | 0x2c | 0x3c | 0x4c | 0x5c | 0x6c | 0x7c |
| Candl. | 0x0d | 0x1d | 0x2d | 0x3d | 0x4d | 0x5d | 0x6d | 0x7d |
| Color | 0x0e | 0x1e | 0x2e | 0x3e | 0x4e | 0x5e | 0x6e | 0x7e |
| Option | 0x0f | 0x1f | 0x2f | 0x3f | 0x4f | 0x5f | 0x6f | 0x7f |
| Reserve | 0x10 | 0x20 | 0x30 | 0x40 | 0x50 | 0x60 | 0x70 | 0x80 |

FIG. 13B

SUB HEADER CODES FOR ZONES AND EXTENDED LIGHTS

302

| | Nature of command (initial) | Acknowledge/status (response) |
|---|---|---|
| Zone #1 | 0x03 | 0xa3 |
| Zone #2 | 0x04 | 0xa4 |
| Zone #3 | 0x05 | 0xa5 |
| Zone #4 | 0x06 | 0xa6 |
| Zone #5 | 0x07 | 0xa7 |
| Zone #6 | 0x08 | 0xa8 |
| Zone #7 | 0x09 | 0xa9 |
| Zone #8 | 0x0a | 0xaa |
| Common | 0x0b | 0xab |

FIG. 14A
I-D CODE ←→ EXTENDED - CURTAINS #2 ~ #8 FOR ALL ROOMS/COMMON.
ZONES AND CURTAINS ARE LINKED BY SUB HEADER CODES OF FIG. 14B.

| Function | Curtain #2 | Curtain #3 | Curtain #4 | Curtain #5 option | Curtain #6 option | Curtain #7 option | Curtain #8 option | Curtain all #0 |
|---|---|---|---|---|---|---|---|---|
| Status | 0x01 | 0x11 | 0x21 | 0x31 | 0x41 | 0x51 | 0x61 | 0x71 |
| Open | 0x02 | 0x12 | 0x22 | 0x32 | 0x42 | 0x52 | 0x62 | 0x72 |
| Close | 0x03 | 0x13 | 0x23 | 0x33 | 0x43 | 0x53 | 0x63 | 0x73 |
| Spare | 0x04 | 0x14 | 0x24 | 0x34 | 0x44 | 0x54 | 0x64 | 0x74 |
| ↑Position | 0x05 | 0x15 | 0x25 | 0x35 | 0x45 | 0x55 | 0x65 | 0x75 |
| ↓Position | 0x06 | 0x16 | 0x26 | 0x36 | 0x46 | 0x56 | 0x66 | 0x76 |
| ↑Tilt | 0x07 | 0x17 | 0x27 | 0x37 | 0x47 | 0x57 | 0x67 | 0x77 |
| ↓Tilt | 0x08 | 0x18 | 0x28 | 0x38 | 0x48 | 0x58 | 0x68 | 0x78 |
| Position A | 0x09 | 0x19 | 0x29 | 0x39 | 0x49 | 0x59 | 0x69 | 0x79 |
| Position B | 0x0a | 0x1a | 0x2a | 0x3a | 0x4a | 0x5a | 0x6a | 0x7a |
| Position C | 0x0b | 0x1b | 0x2b | 0x3b | 0x4b | 0x5b | 0x6b | 0x7b |
| Position D | 0x0c | 0x1c | 0x2c | 0x3c | 0x4c | 0x5c | 0x6c | 0x7c |
| Spare | 0x0d | 0x1d | 0x2d | 0x3d | 0x4d | 0x5d | 0x6d | 0x7d |
| Spare | 0x0e | 0x1e | 0x2e | 0x3e | 0x4e | 0x5e | 0x6e | 0x7e |
| Option | 0x0f | 0x1f | 0x2f | 0x3f | 0x4f | 0x5f | 0x6f | 0x7f |
| Reserve | 0x10 | 0x20 | 0x30 | 0x40 | 0x50 | 0x60 | 0x70 | 0x80 |

FIG. 14B
SUB HEADER CODES FOR ZONES AND EXTENDED CURTAINS

|  | Nature of command (initial) | Acknowledge/status (response) |
|---|---|---|
| Zone #1 | 0x0c | 0xac |
| Zone #2 | 0x0d | 0xad |
| Zone #3 | 0x0e | 0xae |
| Zone #4 | 0x0f | 0xaf |
| Zone #5 | 0x10 | 0xb0 |
| Zone #6 | 0x11 | 0xb1 |
| Zone #7 | 0x12 | 0xb2 |
| Zone #8 | 0x13 | 0xb3 |
| Common | 0x14 | 0xb4 |

FIG. 15

I-D CODE ⟷ BASIC - TV, RADIO AND AUX.

| Function | | | Room/zone #1 | | | Room/zone #3 | | | Room/zone #5 | | | Room/zone #7 | | | Common #0 | | |
|---|---|---|---|---|---|---|---|---|---|---|---|---|---|---|---|---|---|
| TV | Radio | Aux. | TV | Radio | Aux. | TV | Radio | Aux. | TV | Radio | Aux. | TV | Radio | Aux. | TV | Radio | Aux. |
| Status | Status | Status | 0x01 | 0x51 | 0xa1 | 0x11 | 0x61 | 0xb1 | 0x21 | 0x71 | 0xc1 | 0x31 | 0x81 | 0xd1 | 0x41 | 0x91 | 0xe1 |
| On | On | Open | 0x02 | 0x52 | 0xa2 | 0x12 | 0x62 | 0xb2 | 0x22 | 0x72 | 0xc2 | 0x32 | 0x82 | 0xd2 | 0x42 | 0x92 | 0xe2 |
| Off | Off | Close | 0x03 | 0x53 | 0xa3 | 0x13 | 0x63 | 0xb3 | 0x23 | 0x73 | 0xc3 | 0x33 | 0x83 | 0xd3 | 0x43 | 0x93 | 0xe3 |
| In select | Band sele. | In select | 0x04 | 0x54 | 0xa4 | 0x14 | 0x64 | 0xb4 | 0x24 | 0x74 | 0xc4 | 0x34 | 0x84 | 0xd4 | 0x44 | 0x94 | 0xe4 |
| ←Ch. | ←Ch. | ←Ch. | 0x05 | 0x55 | 0xa5 | 0x15 | 0x65 | 0xb5 | 0x25 | 0x75 | 0xc5 | 0x35 | 0x85 | 0xd5 | 0x45 | 0x95 | 0xe5 |
| →Ch. | →Ch. | →Ch. | 0x06 | 0x56 | 0xa6 | 0x16 | 0x66 | 0xb6 | 0x26 | 0x76 | 0xc6 | 0x36 | 0x86 | 0xd6 | 0x46 | 0x96 | 0xe6 |
| ←Vol. | ←Vol. | ←Vol. | 0x07 | 0x57 | 0xa7 | 0x17 | 0x67 | 0xb7 | 0x27 | 0x77 | 0xc7 | 0x37 | 0x87 | 0xd7 | 0x47 | 0x97 | 0xe7 |
| →Vol. | →Vol. | →Vol. | 0x08 | 0x58 | 0xa8 | 0x18 | 0x68 | 0xb8 | 0x28 | 0x78 | 0xc8 | 0x38 | 0x88 | 0xd8 | 0x48 | 0x98 | 0xe8 |
| Function | | | Room/zone #2 | | | Room/zone #4 | | | Room/zone #6 | | | Room/zone #8 | | | Local #9 | | |
| TV | Radio | Aux. | TV | Radio | Aux. | TV | Radio | Aux. | TV | Radio | Aux. | TV | Radio | Aux. | TV | Radio | Aux. |
| Status | Status | Status | 0x09 | 0x59 | 0xa9 | 0x19 | 0x69 | 0xb9 | 0x29 | 0x79 | 0xc9 | 0x39 | 0x89 | 0xd9 | 0x49 | 0x99 | 0xe9 |
| On | On | Open | 0x0a | 0x5a | 0xaa | 0x1a | 0x6a | 0xba | 0x2a | 0x7a | 0xca | 0x3a | 0x8a | 0xda | 0x4a | 0x9a | 0xea |
| Off | Off | Close | 0x0b | 0x5b | 0xab | 0x1b | 0x6b | 0xbb | 0x2b | 0x7b | 0xcb | 0x3b | 0x8b | 0xdb | 0x4b | 0x9b | 0xeb |
| In select | Band sele. | In select | 0x0c | 0x5c | 0xac | 0x1c | 0x6c | 0xbc | 0x2c | 0x7c | 0xcc | 0x3c | 0x8c | 0xdc | 0x4c | 0x9c | 0xec |
| ←Ch. | ←Ch. | ←Ch. | 0x0d | 0x5d | 0xad | 0x1d | 0x6d | 0xbd | 0x2d | 0x7d | 0xcd | 0x3d | 0x8d | 0xdd | 0x4d | 0x9d | 0xed |
| →Ch. | →Ch. | →Ch. | 0x0e | 0x5e | 0xae | 0x1e | 0x6e | 0xbe | 0x2e | 0x7e | 0xce | 0x3e | 0x8e | 0xde | 0x4e | 0x9e | 0xee |
| ←Vol. | ←Vol. | ←Vol. | 0x0f | 0x5f | 0xaf | 0x1f | 0x6f | 0xbf | 0x2f | 0x7f | 0xcf | 0x3f | 0x8f | 0xdf | 0x4f | 0x9f | 0xef |
| →Vol. | →Vol. | →Vol. | 0x10 | 0x60 | 0xb0 | 0x20 | 0x70 | 0xc0 | 0x30 | 0x80 | 0xd0 | 0x40 | 0x90 | 0xe0 | 0x50 | 0xa0 | 0xf0 |

304

FIG. 16   I-D CODE ⟷ EXTENDED - TV, RADIO AND AUX.

304

| Function | | | Room/zone #1 | | | Room/zone #3 | | | Room/zone #5 | | | Room/zone #7 | | | Common #0 | | |
|---|---|---|---|---|---|---|---|---|---|---|---|---|---|---|---|---|---|
| TV | Radio | Aux. | TV | Radio | Aux. | TV | Radio | Aux. | TV | Radio | Aux. | TV | Radio | Aux. | TV | Radio | Aux. |
| Antena in | Preset 1 | Preset 1 | 0x01 | 0x51 | 0xa1 | 0x11 | 0x61 | 0xb1 | 0x21 | 0x71 | 0xc1 | 0x31 | 0x81 | 0xd1 | 0x41 | 0x91 | 0xe1 |
| Cable 1 in | Preset 2 | Preset 2 | 0x02 | 0x52 | 0xa2 | 0x12 | 0x62 | 0xb2 | 0x22 | 0x72 | 0xc2 | 0x32 | 0x82 | 0xd2 | 0x42 | 0x92 | 0xe2 |
| Cable 2 in | Preset 3 | Preset 3 | 0x03 | 0x53 | 0xa3 | 0x13 | 0x63 | 0xb3 | 0x23 | 0x73 | 0xc3 | 0x33 | 0x83 | 0xd3 | 0x43 | 0x93 | 0xe3 |
| DVD in | Preset 4 | Preset 4 | 0x04 | 0x54 | 0xa4 | 0x14 | 0x64 | 0xb4 | 0x24 | 0x74 | 0xc4 | 0x34 | 0x84 | 0xd4 | 0x44 | 0x94 | 0xe4 |
| B-ray in | AM | Spare | 0x05 | 0x55 | 0xa5 | 0x15 | 0x65 | 0xb5 | 0x25 | 0x75 | 0xc5 | 0x35 | 0x85 | 0xd5 | 0x45 | 0x95 | 0xe5 |
| DVD/B-ray in | FM | Spare | 0x06 | 0x56 | 0xa6 | 0x16 | 0x66 | 0xb6 | 0x26 | 0x76 | 0xc6 | 0x36 | 0x86 | 0xd6 | 0x46 | 0x96 | 0xe6 |
| PIP intercom | Spare | Spare | 0x07 | 0x57 | 0xa7 | 0x17 | 0x67 | 0xb7 | 0x27 | 0x77 | 0xc7 | 0x37 | 0x87 | 0xd7 | 0x47 | 0x97 | 0xe7 |
| Status | Status | Status | 0x08 | 0x58 | 0xa8 | 0x18 | 0x68 | 0xb8 | 0x28 | 0x78 | 0xc8 | 0x38 | 0x88 | 0xd8 | 0x48 | 0x98 | 0xe8 |
| Function | | | Room/zone #2 | | | Room/zone #4 | | | Room/zone #6 | | | Room/zone #8 | | | Local #9 | | |
| TV | Radio | Aux. | TV | Radio | Aux. | TV | Radio | Aux. | TV | Radio | Aux. | TV | Radio | Aux. | TV | Radio | Aux. |
| Antena in | Preset 1 | Preset 1 | 0x09 | 0x59 | 0xa9 | 0x19 | 0x69 | 0xb9 | 0x29 | 0x79 | 0xc9 | 0x39 | 0x89 | 0xd9 | 0x49 | 0x99 | 0xe9 |
| Cable 1 in | Preset 2 | Preset 2 | 0x0a | 0x5a | 0xaa | 0x1a | 0x6a | 0xba | 0x2a | 0x7a | 0xca | 0x3a | 0x8a | 0xda | 0x4a | 0x9a | 0xea |
| Cable 2 in | Preset 3 | Preset 3 | 0x0b | 0x5b | 0xab | 0x1b | 0x6b | 0xbb | 0x2b | 0x7b | 0xcb | 0x3b | 0x8b | 0xdb | 0x4b | 0x9b | 0xeb |
| DVD in | Preset 4 | Preset 4 | 0x0c | 0x5c | 0xac | 0x1c | 0x6c | 0xbc | 0x2c | 0x7c | 0xcc | 0x3c | 0x8c | 0xdc | 0x4c | 0x9c | 0xec |
| B-ray in | AM | Spare | 0x0d | 0x5d | 0xad | 0x1d | 0x6d | 0xbd | 0x2d | 0x7d | 0xcd | 0x3d | 0x8d | 0xdd | 0x4d | 0x9d | 0xed |
| DVD/B-ray in | FM | Spare | 0x0e | 0x5e | 0xae | 0x1e | 0x6e | 0xbe | 0x2e | 0x7e | 0xce | 0x3e | 0x8e | 0xde | 0x4e | 0x9e | 0xee |
| PIP intercom | Spare | Spare | 0x0f | 0x5f | 0xaf | 0x1f | 0x6f | 0xbf | 0x2f | 0x7f | 0xcf | 0x3f | 0x8f | 0xdf | 0x4f | 0x9f | 0xef |
| Status | Status | Status | 0x10 | 0x60 | 0xb0 | 0x20 | 0x70 | 0xc0 | 0x30 | 0x80 | 0xd0 | 0x40 | 0x90 | 0xe0 | 0x50 | 0xa0 | 0xf0 |

FIG. 17

I-D CODE ⟷ BASIC - MUSIC, DVD AND iPod

| Function | | | Room/zone #1 | | | Room/zone #3 | | | Room/zone #5 | | | Room/zone #7 | | | Common #0 | | |
|---|---|---|---|---|---|---|---|---|---|---|---|---|---|---|---|---|---|
| Music | DVD | iPod | Music | DVD | iPod | Music | DVD | iPod | Music | DVD | iPod | Music | DVD | iPod | Music | DVD | iPod |
| Status | Status | Status | 0x01 | 0x51 | 0xa1 | 0x11 | 0x61 | 0xb1 | 0x21 | 0x71 | 0xc1 | 0x31 | 0x81 | 0xd1 | 0x41 | 0x91 | 0xe1 |
| On | On | On | 0x02 | 0x52 | 0xa2 | 0x12 | 0x62 | 0xb2 | 0x22 | 0x72 | 0xc2 | 0x32 | 0x82 | 0xd2 | 0x42 | 0x92 | 0xe2 |
| Off | Off | Off | 0x03 | 0x53 | 0xa3 | 0x13 | 0x63 | 0xb3 | 0x23 | 0x73 | 0xc3 | 0x33 | 0x83 | 0xd3 | 0x43 | 0x93 | 0xe3 |
| In select | ▲Play | ▲Play | 0x04 | 0x54 | 0xa4 | 0x14 | 0x64 | 0xb4 | 0x24 | 0x74 | 0xc4 | 0x34 | 0x84 | 0xd4 | 0x44 | 0x94 | 0xe4 |
| ←Ch. | ↑Spare | ←Ch. | 0x05 | 0x55 | 0xa5 | 0x15 | 0x65 | 0xb5 | 0x25 | 0x75 | 0xc5 | 0x35 | 0x85 | 0xd5 | 0x45 | 0x95 | 0xe5 |
| →Ch. | →Spare | →Ch. | 0x06 | 0x56 | 0xa6 | 0x16 | 0x66 | 0xb6 | 0x26 | 0x76 | 0xc6 | 0x36 | 0x86 | 0xd6 | 0x46 | 0x96 | 0xe6 |
| ↑Vol. | ↑Vol. | ↑Menu | 0x07 | 0x57 | 0xa7 | 0x17 | 0x67 | 0xb7 | 0x27 | 0x77 | 0xc7 | 0x37 | 0x87 | 0xd7 | 0x47 | 0x97 | 0xe7 |
| ↓Vol. | ↓Vol. | →Enter | 0x08 | 0x58 | 0xa8 | 0x18 | 0x68 | 0xb8 | 0x28 | 0x78 | 0xc8 | 0x38 | 0x88 | 0xd8 | 0x48 | 0x98 | 0xe8 |
| Function | | | Room/zone #2 | | | Room/zone #4 | | | Room/zone #6 | | | Room/zone #8 | | | Local #9 | | |
| Music | DVD | iPod | Music | DVD | iPod | Music | DVD | iPod | Music | DVD | iPod | Music | DVD | iPod | Music | DVD | iPod |
| Status | Status | Status | 0x09 | 0x59 | 0xa9 | 0x19 | 0x69 | 0xb9 | 0x29 | 0x79 | 0xc9 | 0x39 | 0x89 | 0xd9 | 0x49 | 0x99 | 0xe9 |
| On | On | On | 0x0a | 0x5a | 0xaa | 0x1a | 0x6a | 0xba | 0x2a | 0x7a | 0xca | 0x3a | 0x8a | 0xda | 0x4a | 0x9a | 0xea |
| Off | Off | Off | 0x0b | 0x5b | 0xab | 0x1b | 0x6b | 0xbb | 0x2b | 0x7b | 0xcb | 0x3b | 0x8b | 0xdb | 0x4b | 0x9b | 0xeb |
| In select | Spare | Spare | 0x0c | 0x5c | 0xac | 0x1c | 0x6c | 0xbc | 0x2c | 0x7c | 0xcc | 0x3c | 0x8c | 0xdc | 0x4c | 0x9c | 0xec |
| ←Ch. | ↑Spare | ←Ch. | 0x0d | 0x5d | 0xad | 0x1d | 0x6d | 0xbd | 0x2d | 0x7d | 0xcd | 0x3d | 0x8d | 0xdd | 0x4d | 0x9d | 0xed |
| →Ch. | →Spare | →Ch. | 0x0e | 0x5e | 0xae | 0x1e | 0x6e | 0xbe | 0x2e | 0x7e | 0xce | 0x3e | 0x8e | 0xde | 0x4e | 0x9e | 0xee |
| ↑Vol. | ↑Vol. | ↑Menu | 0x0f | 0x5f | 0xaf | 0x1f | 0x6f | 0xbf | 0x2f | 0x7f | 0xcf | 0x3f | 0x8f | 0xdf | 0x4f | 0x9f | 0xef |
| ↓Vol. | ↓Vol. | →Enter | 0x10 | 0x60 | 0xb0 | 0x20 | 0x70 | 0xc0 | 0x30 | 0x80 | 0xd0 | 0x40 | 0x90 | 0xe0 | 0x50 | 0xa0 | 0xf0 |

FIG. 18     I-D CODE ⟷ EXTENDED- MUSIC, DVD AND iPod

| Function | | | Room/zone #1 | | | Room/zone #2 | | | Room/zone #3 | | | Room/zone #4 | | | Room/zone #5 | | | Room/zone #6 | | | Room/zone #7 | | | Room/zone #8 | | | Common #0 | | | Local #9 | | |
|---|---|---|---|---|---|---|---|---|---|---|---|---|---|---|---|---|---|---|---|---|---|---|---|---|---|---|---|---|---|---|---|
| Music | DVD | iPod | Music | DVD | iPod | Music | DVD | iPod | Music | DVD | iPod | Music | DVD | iPod | Music | DVD | iPod | Music | DVD | iPod | Music | DVD | iPod | Music | DVD | iPod | Music | DVD | iPod | Music | DVD | iPod |
| iPod in | ▼▼Rew | ▼▼Rew | 0x01 | 0x51 | 0xa1 | 0x11 | 0x61 | 0xb1 | 0x21 | 0x71 | 0xc1 | 0x31 | 0x81 | 0xd1 | 0x41 | 0x91 | 0xe1 |
| DVD in | ▼▼Skip | ▼▼Skip | 0x02 | 0x52 | 0xa2 | 0x12 | 0x62 | 0xb2 | 0x22 | 0x72 | 0xc2 | 0x32 | 0x82 | 0xd2 | 0x42 | 0x92 | 0xe2 |
| TV in | ▲▲Skip | ▲▲Skip | 0x03 | 0x53 | 0xa3 | 0x13 | 0x63 | 0xb3 | 0x23 | 0x73 | 0xc3 | 0x33 | 0x83 | 0xd3 | 0x43 | 0x93 | 0xe3 |
| Status | ▲▶FF | ▲▶FF | 0x04 | 0x54 | 0xa4 | 0x14 | 0x64 | 0xb4 | 0x24 | 0x74 | 0xc4 | 0x34 | 0x84 | 0xd4 | 0x44 | 0x94 | 0xe4 |
| ← Surround | ■Stop | ■Stop | 0x05 | 0x55 | 0xa5 | 0x15 | 0x65 | 0xb5 | 0x25 | 0x75 | 0xc5 | 0x35 | 0x85 | 0xd5 | 0x45 | 0x95 | 0xe5 |
| → Surround | ●Rec | Spare | 0x06 | 0x56 | 0xa6 | 0x16 | 0x66 | 0xb6 | 0x26 | 0x76 | 0xc6 | 0x36 | 0x86 | 0xd6 | 0x46 | 0x96 | 0xe6 |
| ↓ Balance L | ❙❙Pause | ❙❙Pause | 0x07 | 0x57 | 0xa7 | 0x17 | 0x67 | 0xb7 | 0x27 | 0x77 | 0xc7 | 0x37 | 0x87 | 0xd7 | 0x47 | 0x97 | 0xe7 |
| ↑ Balance R | Status | Status | 0x08 | 0x58 | 0xa8 | 0x18 | 0x68 | 0xb8 | 0x28 | 0x78 | 0xc8 | 0x38 | 0x88 | 0xd8 | 0x48 | 0x98 | 0xe8 |
| Function | | | | | | | | | | | | | | | | | | | | | | | | | | | | | | | | |
| Music | DVD | iPod | | | | | | | | | | | | | | | | | | | | | | | | | | | | | | |
| iPod in | ▼▼Rew | ▼▼Rew | 0x09 | 0x59 | 0xa9 | 0x19 | 0x69 | 0xb9 | 0x29 | 0x79 | 0xc9 | 0x39 | 0x89 | 0xd9 | 0x49 | 0x99 | 0xe9 |
| DVD in | ▼▼Skip | ▼▼Skip | 0x0a | 0x5a | 0xaa | 0x1a | 0x6a | 0xba | 0x2a | 0x7a | 0xca | 0x3a | 0x8a | 0xda | 0x4a | 0x9a | 0xea |
| TV in | ▲▲Skip | ▲▲Skip | 0x0b | 0x5b | 0xab | 0x1b | 0x6b | 0xbb | 0x2b | 0x7b | 0xcb | 0x3b | 0x8b | 0xdb | 0x4b | 0x9b | 0xeb |
| Status | ▲▶FF | ▲▶FF | 0x0c | 0x5c | 0xac | 0x1c | 0x6c | 0xbc | 0x2c | 0x7c | 0xcc | 0x3c | 0x8c | 0xdc | 0x4c | 0x9c | 0xec |
| ← Surround | ■Stop | ■Stop | 0x0d | 0x5d | 0xad | 0x1d | 0x6d | 0xbd | 0x2d | 0x7d | 0xcd | 0x3d | 0x8d | 0xdd | 0x4d | 0x9d | 0xed |
| → Surround | ●Rec | Spare | 0x0e | 0x5e | 0xae | 0x1e | 0x6e | 0xbe | 0x2e | 0x7e | 0xce | 0x3e | 0x8e | 0xde | 0x4e | 0x9e | 0xee |
| ↓ Balance L | ❙❙Pause | ❙❙Pause | 0x0f | 0x5f | 0xaf | 0x1f | 0x6f | 0xbf | 0x2f | 0x7f | 0xcf | 0x3f | 0x8f | 0xdf | 0x4f | 0x9f | 0xef |
| ↑ Balance R | Status | Status | 0x10 | 0x60 | 0xb0 | 0x20 | 0x70 | 0xc0 | 0x30 | 0x80 | 0xd0 | 0x40 | 0x90 | 0xe0 | 0x50 | 0xa0 | 0xf0 |

I-D CODE ⟷ LIGHTS, SHADES, GARDEN, ENVIRONMENT AND WATER - COMMON ZONE

| Function | \multicolumn{10}{c}{Common zone} | | | |
|---|---|---|---|---|---|---|---|---|---|---|---|---|---|
| Light & water equipment | Light #1 | Light #2 | Light #3 | Light #4 | Light #5 | Light #6 | Light #7 | Light #8 | Light all | Growth light1 | Growth light2 | Growth light3 | Boiler | Water purifier | Irrigation |
| Status | 0x01 | 0x11 | 0x21 | 0x31 | 0x41 | 0x51 | 0x61 | 0x71 | 0x81 | 0x91 | 0xa1 | 0xb1 | 0xc1 | 0xd1 | 0xe1 |
| On | 0x02 | 0x12 | 0x22 | 0x32 | 0x42 | 0x52 | 0x62 | 0x72 | 0x82 | 0x92 | 0xa2 | 0xb2 | 0xc2 | 0xd2 | 0xe2 |
| Off | 0x03 | 0x13 | 0x23 | 0x33 | 0x43 | 0x53 | 0x63 | 0x73 | 0x83 | 0x93 | 0xa3 | 0xb3 | 0xc3 | 0xd3 | 0xe3 |
| Spare | 0x04 | 0x14 | 0x24 | 0x34 | 0x44 | 0x54 | 0x64 | 0x74 | 0x84 | 0x94 | 0xa4 | 0xb4 | 0xc4 | 0xd4 | 0xe4 |
| Dim ↑ | 0x05 | 0x15 | 0x25 | 0x35 | 0x45 | 0x55 | 0x65 | 0x75 | 0x85 | 0x95 | 0xa5 | 0xb5 | | | |
| Dim ↓ | 0x06 | 0x16 | 0x26 | 0x36 | 0x46 | 0x56 | 0x66 | 0x76 | 0x86 | 0x96 | 0xa6 | 0xb6 | | | |
| Color select | 0x07 | 0x17 | 0x27 | 0x37 | 0x47 | 0x57 | 0x67 | 0x77 | 0x87 | 0x97 | 0xa7 | 0xb7 | | | |
| Option | 0x08 | 0x18 | 0x28 | 0x38 | 0x48 | 0x58 | 0x68 | 0x78 | 0x88 | 0x98 | 0xa8 | 0xb8 | | | |

| Function | \multicolumn{10}{c}{Common zone} | | | |
|---|---|---|---|---|---|---|---|---|---|---|---|---|---|
| Shade & garden | Shade #1 | Shade #2 | Shade #3 | Shade #4 | Shade #5 | Shade #6 | Shade #7 | Shade #8 | Shade all | Garden heater | Portable heater | Lawn mower | Air purifier | Humidifier | Others |
| Status | 0x09 | 0x19 | 0x29 | 0x39 | 0x49 | 0x59 | 0x69 | 0x79 | 0x89 | 0x99 | 0xa9 | 0xb9 | 0xc9 | 0xd9 | 0xe9 |
| Open/on | 0x0a | 0x1a | 0x2a | 0x3a | 0x4a | 0x5a | 0x6a | 0x7a | 0x8a | 0x9a | 0xaa | 0xba | 0xca | 0xda | 0xea |
| Close/off | 0x0b | 0x1b | 0x2b | 0x3b | 0x4b | 0x5b | 0x6b | 0x7b | 0x8b | 0x9b | 0xab | 0xbb | 0xcb | 0xdb | 0xeb |
| Spare | 0x0c | 0x1c | 0x2c | 0x3c | 0x4c | 0x5c | 0x6c | 0x7c | 0x8c | 0x9c | 0xac | 0xbc | 0xcc | 0xdc | 0xec |
| Option | 0x0d | 0x1d | 0x2d | 0x3d | 0x4d | 0x5d | 0x6d | 0x7d | 0x8d | 0x9d | 0xad | 0xbd | 0xcd | 0xdd | 0xed |
| Option | 0x0e | 0x1e | 0x2e | 0x3e | 0x4e | 0x5e | 0x6e | 0x7e | 0x8e | 0x9e | 0xae | 0xbe | 0xce | 0xde | 0xee |
| Pos. ↑ | 0x0f | 0x1f | 0x2f | 0x3f | 0x4f | 0x5f | 0x6f | 0x7f | 0x8f | | | | | | |
| Pos. ↓ | 0x10 | 0x20 | 0x30 | 0x40 | 0x50 | 0x60 | 0x70 | 0x80 | 0x90 | | | | | | |

304

FIG. 20A I-D CODE ←→ BASIC - KITCHEN #1 ~ #8    /304

| | kitchen equipment | | | | | | | | | Room select |
|---|---|---|---|---|---|---|---|---|---|---|
| Function | Fridge. | Freezer | Range | Oven | Dish washer | Dispo-ser | Micro-wave | Warmer | Cook top | |
| Status | 0x01 | 0x11 | 0x21 | 0x31 | 0x41 | 0x51 | 0x61 | 0x71 | 0x8a | #1~#8 |
| On | 0x02 | 0x12 | 0x22 | 0x32 | 0x42 | 0x52 | 0x62 | 0x72 | 0x8b | |
| Off | 0x03 | 0x13 | 0x23 | 0x33 | 0x43 | 0x53 | 0x63 | 0x73 | 0x8c | |

FIG. 20B I-D CODE ←→ BASIC - KITCHEN + LAUNDRY #1 ~ #8    /304

| | kitchen equipment | | | | | | | | | |
|---|---|---|---|---|---|---|---|---|---|---|
| Function | Fridge. | Freezer | Range | Oven | Dish washer | Dispo-ser | Micro-wave | Warmer | Cook top | Room select |
| Status | 0x01 | 0x11 | 0x21 | 0x31 | 0x41 | 0x51 | 0x61 | 0x71 | 0x8a | |
| On | 0x02 | 0x12 | 0x22 | 0x32 | 0x42 | 0x52 | 0x62 | 0x72 | 0x8b | |
| Off | 0x03 | 0x13 | 0x23 | 0x33 | 0x43 | 0x53 | 0x63 | 0x73 | 0x8c | |
| | Laundry equipment | | | | | | | | | #1~#8 |
| Function | Washer | Dryer | Iron | Others | | | | | | |
| Status | 0x04 | 0x14 | 0x24 | 0x34 | | | | | | |
| On | 0x05 | 0x15 | 0x25 | 0x35 | | | | | | |
| Off | 0x06 | 0x16 | 0x26 | 0x36 | | | | | | |

FIG. 20C I-D CODE ←→ BASIC - LAUNDRY #1 ~ #8

304

| | Laundry equipment | | | | Room select |
|---|---|---|---|---|---|
| Function | Washer | Dryer | Iron | Others | |
| Status | 0x04 | 0x14 | 0x24 | 0x34 | |
| On | 0x05 | 0x15 | 0x25 | 0x35 | #1~#8 |
| Off | 0x06 | 0x16 | 0x26 | 0x36 | |

FIG. 20D I-D CODE ←→ LAUNDRY + BATH #1~#8

304

| | Laundry equipment | | | | Room select |
|---|---|---|---|---|---|
| Function | Washer | Dryer | Iron | Others | |
| Status | 0x04 | 0x14 | 0x24 | 0x34 | |
| On | 0x05 | 0x15 | 0x25 | 0x35 | |
| Off | 0x06 | 0x16 | 0x26 | 0x36 | |
| | Bathroom equipment | | | | #1~#8 |
| Function | Bath heater | Towel dryer | Jacuzzi | Ohters | |
| Status | 0x07 | 0x17 | 0x27 | 0x37 | |
| On | 0x08 | 0x18 | 0x28 | 0x38 | |
| Off | 0x09 | 0x19 | 0x29 | 0x39 | |

FIG. 20E I-D CODE ←→ BASIC - BATH #1 ~ #8

| | Bathroom equipment | | | | Room select |
|---|---|---|---|---|---|
| Function | Bath heater | Towel dryer | Jacuzzi | Ohters | |
| Status | 0x07 | 0x17 | 0x27 | 0x37 | |
| On | 0x08 | 0x18 | 0x28 | 0x38 | #1~#8 |
| Off | 0x09 | 0x19 | 0x29 | 0x39 | |

FIG. 20F    /302

| SUB HEADER CODES FOR KITCHEN, LAUNDRY & BATH | | | |
|---|---|---|---|
| Equip-ment | Room select | Nature of com. | ACK |
| Kitchen | #1~#8 | 0x1a | 0xba |
| Kitchen + Laundry | #1~#8 | 0x1b | 0xbb |
| Laundry | #1~#8 | 0x1c | 0xbc |
| Laundry + Bath | #1~#8 | 0x1d | 0xbd |
| Bath 2nd | #1~#8 | 0x1e | 0xbe |
| Bath 3rd | #1~#8 | 0x1f | 0xbf |

FIG. 21A I-D CODE POWER OUTLET ⟷ STATUSES AUDIO/VIDEO & LIVING APPLIANCES

304

| Outlet & zone set | | | Portable light | | | Television | | | | Music | | | | DVD | | |
|---|---|---|---|---|---|---|---|---|---|---|---|---|---|---|---|---|
| Outlet | Zone | Status | Off-30W | 150W-350W | Over 350W | Status | Off-30W | 30W-180W | Over 180W | Status | Off | 30W-180W | Over 180W | Status | Off | On |
| Outlet 1~64 | #1~8 or 0 | 0x01 | 0x11 | 0x21 | 0x31 | 0x41 | 0x51 | 0x61 | 0x71 | 0x81 | 0x91 | 0xa1 | 0xb1 | 0xc1 | 0xd1 | 0xe1 |
| Outlet 1~64 | #1~8 or 0 | 0x02 | 0x12 | 0x22 | 0x32 | 0x42 | 0x52 | 0x62 | 0x72 | 0x82 | 0x92 | 0xa2 | 0xb2 | 0xc2 | 0xd2 | 0xe2 |
| Outlet 1~64 | #1~8 or 0 | 0x03 | 0x13 | 0x23 | 0x33 | 0x43 | 0x53 | 0x63 | 0x73 | 0x83 | 0x93 | 0xa3 | 0xb3 | 0xc3 | 0xd3 | 0xe3 |
| Outlet 1~64 | #1~8 or 0 | 0x04 | 0x14 | 0x24 | 0x34 | 0x44 | 0x54 | 0x64 | 0x74 | 0x84 | 0x94 | 0xa4 | 0xb4 | 0xc4 | 0xd4 | 0xe4 |
| | | | Printer | | | PC | | | | Charger | | | | Radio | | |
| Outlet 1~64 | #1~8 or 0 | 0x05 | 0x15 | 0x25 | 0x35 | 0x45 | 0x55 | 0x65 | 0x75 | 0x85 | 0x95 | 0xa5 | 0xb5 | 0xc5 | 0xd5 | 0xe5 |
| Outlet 1~64 | #1~8 or 0 | 0x06 | 0x16 | 0x26 | 0x36 | 0x46 | 0x56 | 0x66 | 0x76 | 0x86 | 0x96 | 0xa6 | 0xb6 | 0xc6 | 0xd6 | 0xe6 |
| Outlet 1~64 | #1~8 or 0 | 0x07 | 0x17 | 0x27 | 0x37 | 0x47 | 0x57 | 0x67 | 0x77 | 0x87 | 0x97 | 0xa7 | 0xb7 | 0xc7 | 0xd7 | 0xe7 |
| Outlet 1~64 | #1~8 or 0 | 0x08 | 0x18 | 0x28 | 0x38 | 0x48 | 0x58 | 0x68 | 0x78 | 0x88 | 0x98 | 0xa8 | 0xb8 | 0xc8 | 0xd8 | 0xe8 |
| | | | Facial care | | | Massager | | | | Massager chair | | | | iPod | | |
| Outlet 1~64 | #1~8 or 0 | 0x09 | 0x19 | 0x29 | 0x39 | 0x49 | 0x59 | 0x69 | 0x79 | 0x89 | 0x99 | 0xa9 | 0xb9 | 0xc9 | 0xd9 | 0xe9 |
| Outlet 1~64 | #1~8 or 0 | 0x0a | 0x1a | 0x2a | 0x3a | 0x4a | 0x5a | 0x6a | 0x7a | 0x8a | 0x9a | 0xaa | 0xba | 0xca | 0xda | 0xea |
| Outlet 1~64 | #1~8 or 0 | 0x0b | 0x1b | 0x2b | 0x3b | 0x4b | 0x5b | 0x6b | 0x7b | 0x8b | 0x9b | 0xab | 0xbb | 0xcb | 0xdb | 0xeb |
| Outlet 1~64 | #1~8 or 0 | 0x0c | 0x1c | 0x2c | 0x3c | 0x4c | 0x5c | 0x6c | 0x7c | 0x8c | 0x9c | 0xac | 0xbc | 0xcc | 0xdc | 0xec |
| | | | Vacuum cleaner | | | Option | | | | Unknown | | | | Other | | |
| Outlet 1~64 | #1~8 or 0 | 0x0d | 0x1d | 0x2d | 0x3d | 0x4d | 0x5d | 0x6d | 0x7d | 0x8d | 0x9d | 0xad | 0xbd | 0xcd | 0xdd | 0xed |
| Outlet 1~64 | #1~8 or 0 | 0x0e | 0x1e | 0x2e | 0x3e | 0x4e | 0x5e | 0x6e | 0x7e | 0x8e | 0x9e | 0xae | 0xbe | 0xce | 0xde | 0xee |
| Outlet 1~64 | #1~8 or 0 | 0x0f | 0x1f | 0x2f | 0x3f | 0x4f | 0x5f | 0x6f | 0x7f | 0x8f | 0x9f | 0xaf | 0xbf | 0xcf | 0xdf | 0xef |
| Outlet 1~64 | #1~8 or 0 | 0x10 | 0x20 | 0x30 | 0x40 | 0x50 | 0x60 | 0x70 | 0x80 | 0x90 | 0xa0 | 0xb0 | 0xc0 | 0xd0 | 0xe0 | 0xf0 |

FIG. 21B I-D CODE POWER OUTLET ←→ STATUSES KITCHEN & RELATED APPLIANCES

| Outlet & zone set | | | Garbage disposer | | | | | Refrigerator | | | | | Dish washer | | |
|---|---|---|---|---|---|---|---|---|---|---|---|---|---|---|---|
| Outlet | Zone | Status | Off-30W | 30W-250W | 250W-500W | Over 500W | Status | Off-30W | 30W-500W | 500W-750W | Over 750W | Status | Off-30W | 30W-750W | Over 750W | Over 1kW |
| Outlet 1~64 | #1~8 or 0 | 0x01 | 0x11 | 0x21 | 0x31 | 0x41 | 0x51 | 0x61 | 0x71 | 0x81 | 0x91 | 0xa1 | 0xb1 | 0xc1 | 0xd1 | 0xe1 |
| Outlet 1~64 | #1~8 or 0 | 0x02 | 0x12 | 0x22 | 0x32 | 0x42 | 0x52 | 0x62 | 0x72 | 0x82 | 0x92 | 0xa2 | 0xb2 | 0xc2 | 0xd2 | 0xe2 |
| | | | Warmer | | | | | Freezer | | | | | Microwave oven | | |
| Outlet 1~64 | #1~8 or 0 | 0x03 | 0x13 | 0x23 | 0x33 | 0x43 | 0x53 | 0x63 | 0x73 | 0x83 | 0x93 | 0xa3 | 0xb3 | 0xc3 | 0xd3 | 0xe3 |
| Outlet 1~64 | #1~8 or 0 | 0x04 | 0x14 | 0x24 | 0x34 | 0x44 | 0x54 | 0x64 | 0x74 | 0x84 | 0x94 | 0xa4 | 0xb4 | 0xc4 | 0xd4 | 0xe4 |
| | | | Mixer & juicer | | | | | Coffee maker | | | | | Bread maker & toaster | | |
| Outlet 1~64 | #1~8 or 0 | 0x05 | 0x15 | 0x25 | 0x35 | 0x45 | 0x55 | 0x65 | 0x75 | 0x85 | 0x95 | 0xa5 | 0xb5 | 0xc5 | 0xd5 | 0xe5 |
| Outlet 1~64 | #1~8 or 0 | 0x06 | 0x16 | 0x26 | 0x36 | 0x46 | 0x56 | 0x66 | 0x76 | 0x86 | 0x96 | 0xa6 | 0xb6 | 0xc6 | 0xd6 | 0xe6 |
| | | | Blender & grinder | | | | | Cooker & fryer | | | | | Kettle & pot | | |
| Outlet 1~64 | #1~8 or 0 | 0x07 | 0x17 | 0x27 | 0x37 | 0x47 | 0x57 | 0x67 | 0x77 | 0x87 | 0x97 | 0xa7 | 0xb7 | 0xc7 | 0xd7 | 0xe7 |
| Outlet 1~64 | #1~8 or 0 | 0x08 | 0x18 | 0x28 | 0x38 | 0x48 | 0x58 | 0x68 | 0x78 | 0x88 | 0x98 | 0xa8 | 0xb8 | 0xc8 | 0xd8 | 0xe8 |
| | | | Cooktop | | | | | Oven | | | | | Range | | |
| Outlet 1~64 | #1~8 or 0 | 0x09 | 0x19 | 0x29 | 0x39 | 0x49 | 0x59 | 0x69 | 0x79 | 0x89 | 0x99 | 0xa9 | 0xb9 | 0xc9 | 0xd9 | 0xe9 |
| Outlet 1~64 | #1~8 or 0 | 0x0a | 0x1a | 0x2a | 0x3a | 0x4a | 0x5a | 0x6a | 0x7a | 0x8a | 0x9a | 0xaa | 0xba | 0xca | 0xda | 0xea |
| | | | Option | | | | | Option | | | | | Option | | |
| Outlet 1~64 | #1~8 or 0 | 0x0b | 0x1b | 0x2b | 0x3b | 0x4b | 0x5b | 0x6b | 0x7b | 0x8b | 0x9b | 0xab | 0xbb | 0xcb | 0xdb | 0xeb |
| Outlet 1~64 | #1~8 or 0 | 0x0c | 0x1c | 0x2c | 0x3c | 0x4c | 0x5c | 0x6c | 0x7c | 0x8c | 0x9c | 0xac | 0xbc | 0xcc | 0xdc | 0xec |
| | | | Other | | | | | Other | | | | | Other | | |
| Outlet 1~64 | #1~8 or 0 | 0x0d | 0x1d | 0x2d | 0x3d | 0x4d | 0x5d | 0x6d | 0x7d | 0x8d | 0x9d | 0xad | 0xbd | 0xcd | 0xdd | 0xed |
| Outlet 1~64 | #1~8 or 0 | 0x0e | 0x1e | 0x2e | 0x3e | 0x4e | 0x5e | 0x6e | 0x7e | 0x8e | 0x9e | 0xae | 0xbe | 0xce | 0xde | 0xee |
| | | | Unknown | | | | | Unknown | | | | | Unknown | | |
| Outlet 1~64 | #1~8 or 0 | 0x0f | 0x1f | 0x2f | 0x3f | 0x4f | 0x5f | 0x6f | 0x7f | 0x8f | 0x9f | 0xaf | 0xbf | 0xcf | 0xdf | 0xef |
| Outlet 1~64 | #1~8 or 0 | 0x10 | 0x20 | 0x30 | 0x40 | 0x50 | 0x60 | 0x70 | 0x80 | 0x90 | 0xa0 | 0xb0 | 0xc0 | 0xd0 | 0xe0 | 0xf0 |

304

FIG. 21C  I-D CODE POWER OUTLET ←→ STATUSES LAUNDRY, GARDEN & COMMON APPLIANCES

304

| Outlet & zone set | | | Portable heater | | | | | Towel dryer | | | | | Washer | | | |
|---|---|---|---|---|---|---|---|---|---|---|---|---|---|---|---|---|
| Outlet | Zone | Status | Off-30W | 30W-250W | 250W-500W | Over 500W | Status | Off-30W | 30W-500W | 500W-750W | Over 750W | Status | Off-30W | 30W-750W | Over 750W | Over 1KW |
| Outlet 1~64 | #1~8 or 0 | Status | 0x01 | 0x11 | 0x21 | 0x31 | 0x41 | Status | 0x51 | 0x61 | 0x71 | 0x81 | 0x91 | Status | 0xa1 | 0xb1 | 0xc1 | 0xd1 | 0xe1 |
| Outlet 1~64 | #1~8 or 0 | | 0x02 | 0x12 | 0x22 | 0x32 | 0x42 | | 0x52 | 0x62 | 0x72 | 0x82 | 0x92 | | 0xa2 | 0xb2 | 0xc2 | 0xd2 | 0xe2 |
| | | | Jacuzzi | | | | | Bath heater | | | | | Dryer | | | | |
| Outlet 1~64 | #1~8 or 0 | | 0x03 | 0x13 | 0x23 | 0x33 | 0x43 | | 0x53 | 0x63 | 0x73 | 0x83 | 0x93 | | 0xa3 | 0xb3 | 0xc3 | 0xd3 | 0xe3 |
| Outlet 1~64 | #1~8 or 0 | | 0x04 | 0x14 | 0x24 | 0x34 | 0x44 | | 0x54 | 0x64 | 0x74 | 0x84 | 0x94 | | 0xa4 | 0xb4 | 0xc4 | 0xd4 | 0xe4 |
| | | | Bath option | | | | | Iron | | | | | Other | | | | |
| Outlet 1~64 | #1~8 or 0 | | 0x05 | 0x15 | 0x25 | 0x35 | 0x45 | | 0x55 | 0x65 | 0x75 | 0x85 | 0x95 | | 0xa5 | 0xb5 | 0xc5 | 0xd5 | 0xe5 |
| Outlet 1~64 | #1~8 or 0 | | 0x06 | 0x16 | 0x26 | 0x36 | 0x46 | | 0x56 | 0x66 | 0x76 | 0x86 | 0x96 | | 0xa6 | 0xb6 | 0xc6 | 0xd6 | 0xe6 |
| | | | Water purifier | | | | | Humidifier | | | | | Air purifier | | | | |
| Outlet 1~64 | #1~8 or 0 | | 0x07 | 0x17 | 0x27 | 0x37 | 0x47 | | 0x57 | 0x67 | 0x77 | 0x87 | 0x97 | | 0xa7 | 0xb7 | 0xc7 | 0xd7 | 0xe7 |
| Outlet 1~64 | #1~8 or 0 | | 0x08 | 0x18 | 0x28 | 0x38 | 0x48 | | 0x58 | 0x68 | 0x78 | 0x88 | 0x98 | | 0xa8 | 0xb8 | 0xc8 | 0xd8 | 0xe8 |
| | | | Irrigation valve | | | | | Growth light | | | | | Lawn mower | | | | |
| Outlet 1~64 | #1~8 or 0 | | 0x09 | 0x19 | 0x29 | 0x39 | 0x49 | | 0x59 | 0x69 | 0x79 | 0x89 | 0x99 | | 0xa9 | 0xb9 | 0xc9 | 0xd9 | 0xe9 |
| Outlet 1~64 | #1~8 or 0 | | 0x0a | 0x1a | 0x2a | 0x3a | 0x4a | | 0x5a | 0x6a | 0x7a | 0x8a | 0x9a | | 0xaa | 0xba | 0xca | 0xda | 0xea |
| | | | Boiler | | | | | Option | | | | | Option | | | | |
| Outlet 1~64 | #1~8 or 0 | | 0x0b | 0x1b | 0x2b | 0x3b | 0x4b | | 0x5b | 0x6b | 0x7b | 0x8b | 0x9b | | 0xab | 0xbb | 0xcb | 0xdb | 0xeb |
| Outlet 1~64 | #1~8 or 0 | | 0x0c | 0x1c | 0x2c | 0x3c | 0x4c | | 0x5c | 0x6c | 0x7c | 0x8c | 0x9c | | 0xac | 0xbc | 0xcc | 0xdc | 0xec |
| | | | Unknown | | | | | Unknown | | | | | Other | | | | |
| Outlet 1~64 | #1~8 or 0 | | 0x0d | 0x1d | 0x2d | 0x3d | 0x4d | | 0x5d | 0x6d | 0x7d | 0x8d | 0x9d | | 0xad | 0xbd | 0xcd | 0xdd | 0xed |
| Outlet 1~64 | #1~8 or 0 | | 0x0e | 0x1e | 0x2e | 0x3e | 0x4e | | 0x5e | 0x6e | 0x7e | 0x8e | 0x9e | | 0xae | 0xbe | 0xce | 0xde | 0xee |
| | | | Unknown | | | | | Unknown | | | | | Other | | | | |
| Outlet 1~64 | #1~8 or 0 | | 0x0f | 0x1f | 0x2f | 0x3f | 0x4f | | 0x5f | 0x6f | 0x7f | 0x8f | 0x9f | | 0xaf | 0xbf | 0xcf | 0xdf | 0xef |
| Outlet 1~64 | #1~8 or 0 | | 0x10 | 0x20 | 0x30 | 0x40 | 0x50 | | 0x60 | 0x70 | 0x80 | 0x90 | 0xa0 | | 0xb0 | 0xc0 | 0xd0 | 0xe0 | 0xf0 |

FIG. 22

I-D CODE ⟷ HARD WIRED ALARM SENSORS  /304

| Function | Room/zone #1 | | | | | | Room/zone #3 | | | | | | Room/zone #5 | | | | | | Room/zone #7 | | | | | | Common #0 | | | | |
|---|---|---|---|---|---|---|---|---|---|---|---|---|---|---|---|---|---|---|---|---|---|---|---|---|---|---|---|---|---|
| | Smok fire | Gas | Panic | Water leak | | | Smok fire | Gas | Panic | Water leak | | | Smok fire | Gas | Panic | Water leak | | | Smok fire | Gas | Panic | Water leak | | | Smok fire | Gas | Panic | Water leak | |
| Status | 0x01 | 0x51 | 0xa1 | 0x0d | | | 0x11 | 0x61 | 0xb1 | 0x4d | | | 0x21 | 0x71 | 0xc1 | 0x8d | | | 0x31 | 0x81 | 0xd1 | 0xcd | | | 0x41 | 0x91 | 0xe1 | 0xe7 | |
| Armed | 0x02 | 0x52 | 0xa2 | 0x0e | | | 0x12 | 0x62 | 0xb2 | 0x4e | | | 0x22 | 0x72 | 0xc2 | 0x8e | | | 0x32 | 0x82 | 0xd2 | 0xce | | | 0x42 | 0x92 | 0xe2 | 0xe8 | |
| Triggered | 0x03 | 0x53 | 0xa3 | 0x0f | | | 0x13 | 0x63 | 0xb3 | 0x4f | | | 0x23 | 0x73 | 0xc3 | 0x8f | | | 0x33 | 0x83 | 0xd3 | 0xcf | | | 0x43 | 0x93 | 0xe3 | 0xe9 | |
| Cleared | 0x04 | 0x54 | 0xa4 | 0x1d | | | 0x14 | 0x64 | 0xb4 | 0x5d | | | 0x24 | 0x74 | 0xc4 | 0x9d | | | 0x34 | 0x84 | 0xd4 | 0xdd | | | 0x44 | 0x94 | 0xe4 | 0xea | |
| ACK | 0x05 | 0x55 | 0xa5 | 0x1e | | | 0x15 | 0x65 | 0xb5 | 0x5e | | | 0x25 | 0x75 | 0xc5 | 0x9e | | | 0x35 | 0x85 | 0xd5 | 0xde | | | 0x45 | 0x95 | 0xe5 | 0xeb | |
| Spare | 0x06 | 0x56 | 0xa6 | 0x1f | | | 0x16 | 0x66 | 0xb6 | 0x5f | | | 0x26 | 0x76 | 0xc6 | 0x9f | | | 0x36 | 0x86 | 0xd6 | 0xdf | | | 0x46 | 0x96 | 0xe6 | 0xec | |

| Function | Room/zone #2 | | | | Room/zone #4 | | | | Room/zone #6 | | | | Room/zone #8 | | | | Common #0 | |
|---|---|---|---|---|---|---|---|---|---|---|---|---|---|---|---|---|---|---|
| | Smok fire | Gas | Panic | Water leak | Smok fire | Gas | Panic | Water leak | Smok fire | Gas | Panic | Water leak | Smok fire | Gas | Panic | Water leak | Function | Entry |
| Status | 0x07 | 0x57 | 0xa7 | 0x2d | 0x17 | 0x67 | 0xb7 | 0x6d | 0x27 | 0x77 | 0xc7 | 0xad | 0x37 | 0x87 | 0xd7 | 0xed | Status | 0xf1 |
| Armed | 0x08 | 0x58 | 0xa8 | 0x2e | 0x18 | 0x68 | 0xb8 | 0x6e | 0x28 | 0x78 | 0xc8 | 0xae | 0x38 | 0x88 | 0xd8 | 0xee | Armed Off | 0xf2 |
| Triggered | 0x09 | 0x59 | 0xa9 | 0x2f | 0x19 | 0x69 | 0xb9 | 0x6f | 0x29 | 0x79 | 0xc9 | 0xaf | 0x39 | 0x89 | 0xd9 | 0xef | | 0xf3 |
| Cleared | 0x0a | 0x5a | 0xaa | 0x3d | 0x1a | 0x6a | 0xba | 0x7d | 0x2a | 0x7a | 0xca | 0xbd | 0x3a | 0x8a | 0xda | 0xfd | Triggered | 0xf4 |
| ACK | 0x0b | 0x5b | 0xab | 0x3e | 0x1b | 0x6b | 0xbb | 0x7e | 0x2b | 0x7b | 0xcb | 0xbe | 0x3b | 0x8b | 0xdb | 0xfe | Cleared | 0xf5 |
| Spare | 0x0c | 0x5c | 0xac | 0x3f | 0x1c | 0x6c | 0xbc | 0x7f | 0x2c | 0x7c | 0xcc | 0xbf | 0x3c | 0x8c | 0xdc | 0xff | Option | 0xf6 |
| | | | | | | | | | | | | | | | | | ACK | 0xf7 |
| | | | | | | | | | | | | | | | | | Spare | 0xf8 |

FIG. 23

I-D CODE ⟷ BUS LINE CONNECTED ALARM SENSORS (ACTIVE ALL TIME) — 304

| Function | Room/zone #1 | | | | | Room/zone #3 | | | | | Room/zone #5 | | | | | Room/zone #7 | | | | | Common #0 | | | | |
|---|---|---|---|---|---|---|---|---|---|---|---|---|---|---|---|---|---|---|---|---|---|---|---|---|---|
| | Smoke fire | Gas | Panic | Water leak | | Smoke fire | Gas | Panic | Water leak | | Smoke fire | Gas | Panic | Water leak | | Smoke fire | Gas | Panic | Water leak | | Smoke fire | Gas | Panic | Water leak | |
| Status | 0x01 | 0x51 | 0xa1 | 0x0d | | 0x11 | 0x61 | 0xb1 | 0x4d | | 0x21 | 0x71 | 0xc1 | 0x8d | | 0x31 | 0x81 | 0xd1 | 0xcd | | 0x41 | 0x91 | 0xe1 | 0xe7 | |
| Armed | 0x02 | 0x52 | 0xa2 | 0x0e | | 0x12 | 0x62 | 0xb2 | 0x4e | | 0x22 | 0x72 | 0xc2 | 0x8e | | 0x32 | 0x82 | 0xd2 | 0xce | | 0x42 | 0x92 | 0xe2 | 0xe8 | |
| Triggered | 0x03 | 0x53 | 0xa3 | 0x0f | | 0x13 | 0x63 | 0xb3 | 0x4f | | 0x23 | 0x73 | 0xc3 | 0x8f | | 0x33 | 0x83 | 0xd3 | 0xcf | | 0x43 | 0x93 | 0xe3 | 0xe9 | |
| Cleared | 0x04 | 0x54 | 0xa4 | 0x1d | | 0x14 | 0x64 | 0xb4 | 0x5d | | 0x24 | 0x74 | 0xc4 | 0x9d | | 0x34 | 0x84 | 0xd4 | 0xdd | | 0x44 | 0x94 | 0xe4 | 0xea | |
| ACK | 0x05 | 0x55 | 0xa5 | 0x1e | | 0x15 | 0x65 | 0xb5 | 0x5e | | 0x25 | 0x75 | 0xc5 | 0x9e | | 0x35 | 0x85 | 0xd5 | 0xde | | 0x45 | 0x95 | 0xe5 | 0xeb | |
| Spare | 0x06 | 0x56 | 0xa6 | 0x1f | | 0x16 | 0x66 | 0xb6 | 0x5f | | 0x26 | 0x76 | 0xc6 | 0x9f | | 0x36 | 0x86 | 0xd6 | 0xdf | | 0x46 | 0x96 | 0xe6 | 0xec | |

| Function | Room/zone #2 | | | | | Room/zone #4 | | | | | Room/zone #6 | | | | | Room/zone #8 | | | | |
|---|---|---|---|---|---|---|---|---|---|---|---|---|---|---|---|---|---|---|---|---|
| | Smoke fire | Gas | Panic | Water leak | | Smoke fire | Gas | Panic | Water leak | | Smoke fire | Gas | Panic | Water leak | | Smoke fire | Gas | Panic | Water leak | |
| Status | 0x07 | 0x57 | 0xa7 | 0x2d | | 0x17 | 0x67 | 0xb7 | 0x6d | | 0x27 | 0x77 | 0xc7 | 0xad | | 0x37 | 0x87 | 0xd7 | 0xed | |
| Armed | 0x08 | 0x58 | 0xa8 | 0x2e | | 0x18 | 0x68 | 0xb8 | 0x6e | | 0x28 | 0x78 | 0xc8 | 0xae | | 0x38 | 0x88 | 0xd8 | 0xee | |
| Triggered | 0x09 | 0x59 | 0xa9 | 0x2f | | 0x19 | 0x69 | 0xb9 | 0x6f | | 0x29 | 0x79 | 0xc9 | 0xaf | | 0x39 | 0x89 | 0xd9 | 0xef | |
| Cleared | 0x0a | 0x5a | 0xaa | 0x3d | | 0x1a | 0x6a | 0xba | 0x7d | | 0x2a | 0x7a | 0xca | 0xbd | | 0x3a | 0x8a | 0xda | 0xfd | |
| ACK | 0x0b | 0x5b | 0xab | 0x3e | | 0x1b | 0x6b | 0xbb | 0x7e | | 0x2b | 0x7b | 0xcb | 0xbe | | 0x3b | 0x8b | 0xdb | 0xfe | |
| Spare | 0x0c | 0x5c | 0xac | 0x3f | | 0x1c | 0x6c | 0xbc | 0x7f | | 0x2c | 0x7c | 0xcc | 0xbf | | 0x3c | 0x8c | 0xdc | 0xff | |

FIG. 24

I-D CODE ⟷ BUS LINE CONNECTED ALARM SENSORS (OFF SWITCHABLE) — 304

| Function | Room/zone #1 Motion | Glass break | Entry | Room/zone #3 Motion | Glass break | Entry | Room/zone #5 Motion | Glass break | Entry | Room/zone #7 Motion | Glass break | Entry | Common #0 Motion | Glass break | Entry |
|---|---|---|---|---|---|---|---|---|---|---|---|---|---|---|---|
| Status | 0x01 | 0x51 | 0xa1 | 0x11 | 0x61 | 0xb1 | 0x21 | 0x71 | 0xc1 | 0x31 | 0x81 | 0xd1 | 0x41 | 0x91 | 0xe1 |
| Armed/active | 0x02 | 0x52 | 0xa2 | 0x12 | 0x62 | 0xb2 | 0x22 | 0x72 | 0xc2 | 0x32 | 0x82 | 0xd2 | 0x42 | 0x92 | 0xe2 |
| Option | 0x03 | 0x53 | 0xa3 | 0x13 | 0x63 | 0xb3 | 0x23 | 0x73 | 0xc3 | 0x33 | 0x83 | 0xd3 | 0x43 | 0x93 | 0xe3 |
| Triggered | 0x04 | 0x54 | 0xa4 | 0x14 | 0x64 | 0xb4 | 0x24 | 0x74 | 0xc4 | 0x34 | 0x84 | 0xd4 | 0x44 | 0x94 | 0xe4 |
| Cleared | 0x05 | 0x55 | 0xa5 | 0x15 | 0x65 | 0xb5 | 0x25 | 0x75 | 0xc5 | 0x35 | 0x85 | 0xd5 | 0x45 | 0x95 | 0xe5 |
| Option | 0x06 | 0x56 | 0xa6 | 0x16 | 0x66 | 0xb6 | 0x26 | 0x76 | 0xc6 | 0x36 | 0x86 | 0xd6 | 0x46 | 0x96 | 0xe6 |
| Acknowledge | 0x07 | 0x57 | 0xa7 | 0x17 | 0x67 | 0xb7 | 0x27 | 0x77 | 0xc7 | 0x37 | 0x87 | 0xd7 | 0x47 | 0x97 | 0xe7 |
| Spare | 0x08 | 0x58 | 0xa8 | 0x18 | 0x68 | 0xb8 | 0x28 | 0x78 | 0xc8 | 0x38 | 0x88 | 0xd8 | 0x48 | 0x98 | 0xe8 |

| Function | Room/zone #2 Motion | Glass break | Entry | Room/zone #4 Motion | Glass break | Entry | Room/zone #6 Motion | Glass break | Entry | Room/zone #8 Motion | Glass break | Entry | Common #0 Spare 1 | Spare 2 | Spare 3 |
|---|---|---|---|---|---|---|---|---|---|---|---|---|---|---|---|
| Status | 0x09 | 0x59 | 0xa9 | 0x19 | 0x69 | 0xb9 | 0x29 | 0x79 | 0xc9 | 0x39 | 0x89 | 0xd9 | 0x49 | 0x99 | 0xe9 |
| Armed/active | 0x0a | 0x5a | 0xaa | 0x1a | 0x6a | 0xba | 0x2a | 0x7a | 0xca | 0x3a | 0x8a | 0xda | 0x4a | 0x9a | 0xea |
| Option | 0x0b | 0x5b | 0xab | 0x1b | 0x6b | 0xbb | 0x2b | 0x7b | 0xcb | 0x3b | 0x8b | 0xdb | 0x4b | 0x9b | 0xeb |
| Triggered | 0x0c | 0x5c | 0xac | 0x1c | 0x6c | 0xbc | 0x2c | 0x7c | 0xcc | 0x3c | 0x8c | 0xdc | 0x4c | 0x9c | 0xec |
| Cleared | 0x0d | 0x5d | 0xad | 0x1d | 0x6d | 0xbd | 0x2d | 0x7d | 0xcd | 0x3d | 0x8d | 0xdd | 0x4d | 0x9d | 0xed |
| Option | 0x0e | 0x5e | 0xae | 0x1e | 0x6e | 0xbe | 0x2e | 0x7e | 0xce | 0x3e | 0x8e | 0xde | 0x4e | 0x9e | 0xee |
| Acknowledge | 0x0f | 0x5f | 0xaf | 0x1f | 0x6f | 0xbf | 0x2f | 0x7f | 0xcf | 0x3f | 0x8f | 0xdf | 0x4f | 0x9f | 0xef |
| Spare | 0x10 | 0x60 | 0xb0 | 0x20 | 0x70 | 0xc0 | 0x30 | 0x80 | 0xd0 | 0x40 | 0x90 | 0xe0 | 0x50 | 0x9g | 0xf0 |

FIG. 25

I-D CODE ⟵⟶ OPERATING VIDEO INTERPHONE

| Code | Video interphone | Code | Help medical/emergency |
|---|---|---|---|
| 0x01 | Status | 0x31 | Switch on bed camera |
| 0x02 | System standby | 0x32 | Switch off bed camera |
| 0x03 | Activate talk on | 0x33 | Respond to communication |
| 0x04 | Cut talk | 0x34 | Cut talk |
| 0x05 | Open door | 0x35 | Activate blood pressure tester |
| 0x06 | Suspend call | 0x36 | Send blood pressure figures |
| 0x07 | Restore call | 0x37 | Send hart beat figure |
| 0x08 | Call elevator | 0x38 | Blood pressure tester cut |
| 0x09 | Call concierge | 0x39 | Measure temperature |
| 0x10 | Cancel concierge call | 0x40 | Send temperature figure |
| 0x11 | Help/emergency call | 0x41 | Remove temperature tester |
| 0x12 | Cancel help/emergency call | 0x42 | Option |
| 0x13 | Volume ↑ | 0x43 | Option |
| 0x14 | Volume ↓ | 0x44 | Option |
| 0x15 | Call Volume ↑ | 0x45 | Option |
| 0x16 | Call Volume ↓ | 0x46 | Option |
| 0x17 | Send elevator to lobby | 0x47 | Option |
| 0x18 | Call door camera to TV | 0x48 | Option |
| 0x19 | Door camera switch off | 0x49 | Option |
| 0x20 | Option | 0x50 | Option |

FIG. 26   I-D CODE ←→ DOWNLOAD AND UPDATES APPLIANCES — 304

| Function | Room/zone #1 | | | | Room/zone #3 | | | | Room/zone #5 | | | | Room/zone #7 | | | | Common #0 | | | |
|---|---|---|---|---|---|---|---|---|---|---|---|---|---|---|---|---|---|---|---|---|
| Appliance | Music | DVD | iPod | Aux. | Music | DVD | iPod | Aux. | Music | DVD | iPod | Aux. | Music | DVD | iPod | Aux. | Music | DVD | iPod | Aux. |
| Download | 0x01 | 0x51 | 0xa1 | | 0x21 | 0x61 | 0xb1 | | 0x71 | 0xc1 | | | 0x31 | 0x81 | 0xd1 | | 0x41 | 0x91 | 0xe1 | |
| Update | 0x02 | 0x52 | 0xa2 | | 0x22 | 0x62 | 0xb2 | | 0x72 | 0xc2 | | | 0x32 | 0x82 | 0xd2 | | 0x42 | 0x92 | 0xe2 | |
| Appliance | TV | Radio | | | TV | Radio | | | TV | Radio | | | TV | Radio | | | TV | Radio | | |
| Download | 0x03 | 0x53 | 0xa3 | | 0x23 | 0x63 | 0xb3 | | 0x73 | 0xc3 | | | 0x33 | 0x83 | 0xd3 | | 0x43 | 0x93 | 0xe3 | |
| Update | 0x04 | 0x54 | 0xa4 | | 0x24 | 0x64 | 0xb4 | | 0x74 | 0xc4 | | | 0x34 | 0x84 | 0xd4 | | 0x44 | 0x94 | 0xe4 | |
| Appliance | Light | HVAC | Curtn. | | Light | HVAC | Curtn. | | Light | HVAC | Curtn. | | Light | HVAC | Curtn. | | Light | HVAC | Curtn. | |
| Download | 0x05 | 0x55 | 0xa5 | | 0x25 | 0x65 | 0xb5 | | 0x75 | 0xc5 | | | 0x35 | 0x85 | 0xd5 | | 0x45 | 0x95 | 0xe5 | |
| Update | 0x06 | 0x56 | 0xa6 | | 0x26 | 0x66 | 0xb6 | | 0x76 | 0xc6 | | | 0x36 | 0x86 | 0xd6 | | 0x46 | 0x96 | 0xe6 | |
| Appliance | Spare | Spare | Spare | | Spare | Spare | Spare | | Spare | Spare | | | Spare | Spare | Spare | | Spare | Spare | Spare | |
| Download | 0x07 | 0x57 | 0xa7 | | 0x27 | 0x67 | 0xb7 | | 0x77 | 0xc7 | | | 0x37 | 0x87 | 0xd7 | | 0x47 | 0x97 | 0xe7 | |
| Update | 0x08 | 0x58 | 0xa8 | | 0x28 | 0x68 | 0xb8 | | 0x78 | 0xc8 | | | 0x38 | 0x88 | 0xd8 | | 0x48 | 0x98 | 0xe8 | |

| Function | Room/zone #2 | | | | Room/zone #4 | | | | Room/zone #6 | | | | Room/zone #8 | | | |
|---|---|---|---|---|---|---|---|---|---|---|---|---|---|---|---|---|
| Appliance | Music | DVD | iPod | Aux. | Music | DVD | iPod | Aux. | Music | DVD | iPod | Aux. | Music | DVD | iPod | Aux. |
| Download | 0x09 | 0x59 | 0xa9 | | 0x29 | 0x69 | 0xb9 | | 0x79 | 0xc9 | | | 0x39 | 0x89 | 0xd9 | |
| Update | 0x0a | 0x5a | 0xaa | | 0x2a | 0x6a | 0xba | | 0x7a | 0xca | | | 0x3a | 0x8a | 0xda | |
| Appliance | TV | Radio | | | TV | Radio | | | TV | Radio | | | TV | Radio | | |
| Download | 0x0b | 0x5b | 0xab | | 0x2b | 0x6b | 0xbb | | 0x7b | 0xcb | | | 0x3b | 0x8b | 0xdb | |
| Update | 0x0c | 0x5c | 0xac | | 0x2c | 0x6c | 0xbc | | 0x7c | 0xcc | | | 0x3c | 0x8c | 0xdc | |
| Appliance | Light | HVAC | Curtn. | | Light | HVAC | Curtn. | | Light | HVAC | Curtn. | | Light | HVAC | Curtn. | |
| Download | 0x0d | 0x5d | 0xad | | 0x2d | 0x6d | 0xbd | | 0x7d | 0xcd | | | 0x3d | 0x8d | 0xdd | |
| Update | 0x0e | 0x5e | 0xae | | 0x2e | 0x6e | 0xbe | | 0x7e | 0xce | | | 0x3e | 0x8e | 0xde | |
| Appliance | Spare | Spare | Spare | | Spare | Spare | Spare | | Spare | Spare | | | Spare | Spare | Spare | |
| Download | 0x0f | 0x5f | 0xaf | | 0x1f | 0x6f | 0xbf | | 0x7f | 0xcf | | | 0x3f | 0x8f | 0xdf | |
| Update | 0x10 | 0x60 | 0xb0 | | 0x20 | 0x70 | 0xc0 | | 0x80 | 0xd0 | | | 0x40 | 0x90 | 0xe0 | |

FIG. 27A

SUB HEADER CODE - NATURE OF COMMAND

| Code | Description |
|---|---|
| 0x01 | Basic light, AC & curtain Fig.11B |
| 0x02 | Extended light Fig.12 |
| 0x03 | Extended light #2~#8 Fig.13A/B #1 |
| 0x04 | Extended light #2~#8 Fig.13A/B #2 |
| 0x05 | Extended light #2~#8 Fig.13A/B #3 |
| 0x06 | Extended light #2~#8 Fig.13A/B #4 |
| 0x07 | Extended light #2~#8 Fig.13A/B #5 |
| 0x08 | Extended light #2~#8 Fig.13A/B #6 |
| 0x09 | Extended light #2~#8 Fig.13A/B #7 |
| 0x0a | Extended light #2~#8 Fig.13A/B #8 |
| 0x0b | Extended light #2~#8 Fig.13A/B common |
| 0x0c | Extended curtain #2~#8 Fig.14A/B #1 |
| 0x0d | Extended curtain #2~#8 Fig.14A/B #2 |
| 0x0e | Extended curtain #2~#8 Fig.14A/B #3 |
| 0x0f | Extended curtain #2~#8 Fig.14A/B #4 |
| 0x10 | Extended curtain #2~#8 Fig.14A/B #5 |
| 0x11 | Extended curtain #2~#8 Fig.14A/B #6 |
| 0x12 | Extended curtain #2~#8 Fig.14A/B #7 |
| 0x13 | Extended curtain #2~#8 Fig.14A/B #8 |
| 0x14 | Extended curtain #2~#8 Fig.14A/B common |
| 0x15 | Basic TV, radio & aux. Fig.15 |
| 0x16 | Extended TV, radio & aux. Fig.16 |
| 0x17 | Basic music, DVD & iPod Fig.17 |
| 0x18 | Extended music, DVD & iPod Fig.18 |
| 0x19 | Lights, shades, garden, enviro. & water common Fig.19 |
| 0x1a | Basic kitchen equipment room #1~#8 Fig.20A |
| 0x1b | Basic kitchen + laundry equipment room #1~#8 Fig.20B |
| 0x1c | Basic laundry equipment room #1~#8 Fig.20C |
| 0x1d | Basic laundry + bath equipment room #1~#8 Fig.20D |
| 0x1e | Basic bath equipment room #1~#8 Fig.20E |
| 0x1f | Outlets status request A/V & living room #1~#8 Fig.21A |
| 0x20 | Outlets status request kitchen & related room #1~#8 Fig.21B |

SUB HEADER CODE - ACKNOWLEDGE AND STATUS

| Code | Description |
|---|---|
| 0xa1 | ACK basic operation Fig. 11B |
| 0xa2 | ACK extended operation Fig. 12 |
| 0xa3 | ACK extended light #2~#8 Fig.13A/B #1 |
| 0xa4 | ACK extended light #2~#8 Fig.13A/B #2 |
| 0xa5 | ACK extended light #2~#8 Fig.13A/B #3 |
| 0xa6 | ACK extended light #2~#8 Fig.13A/B #4 |
| 0xa7 | ACK extended light #2~#8 Fig.13A/B #5 |
| 0xa8 | ACK extended light #2~#8 Fig.13A/B #6 |
| 0xa9 | ACK extended light #2~#8 Fig.13A/B #7 |
| 0xaa | ACK extended light #2~#8 Fig.13A/B #8 |
| 0xab | ACK extended light #2~#8 Fig.13A/B common |
| 0xac | ACK extended curtain #2~#8 Fig.14A/B #1 |
| 0xad | ACK extended curtain #2~#8 Fig.14A/B #2 |
| 0xae | ACK extended curtain #2~#8 Fig.14A/B #3 |
| 0xaf | ACK extended curtain #2~#8 Fig.14A/B #4 |
| 0xb0 | ACK extended curtain #2~#8 Fig.14A/B #5 |
| 0xb1 | ACK extended curtain #2~#8 Fig.14A/B #6 |
| 0xb2 | ACK extended curtain #2~#8 Fig.14A/B #7 |
| 0xb3 | ACK extended curtain #2~#8 Fig.14A/B #8 |
| 0xb4 | ACK extended curtain #2~#8 Fig.14A/B common |
| 0xb5 | ACK basic TV, radio & aux. Fig.15 |
| 0xb6 | ACK extended TV, radio & aux. Fig.16 |
| 0xb7 | ACK basic music, DVD & iPod Fig.17 |
| 0xb8 | ACK extended music, DVD & iPod Fig.18 |
| 0xb9 | ACK lights, shades, garden, enviro. & water common Fig.19 |
| 0xba | ACK basic kitchen equipment room #1~#8 Fig.20A |
| 0xbb | ACK basic kitchen + laundry equipment room #1~#8 Fig.20B |
| 0xbc | ACK basic laundry equipment room #1~#8 Fig.20C |
| 0xbd | ACK basic laundry + bath equipment room #1~#8 Fig.20D |
| 0xbe | ACK basic bath equipment room #1~#8 Fig.20E |
| 0xbf | ACK outlets status A/V & living room #1~#8 Fig.21A |
| 0xc0 | ACK outlets status kitchen & related room #1~#8 Fig.21B |

FIG. 27B

SUB HEADER CODE - NATURE OF COMMAND | SUB HEADER CODE - ACKNOWLEDGE AND STATUS

302

| Code | Nature of Command | Code | Acknowledge and Status |
|---|---|---|---|
| 0x21 | Outlets status request laundry, garden & common #1~#8 Fig.21C | 0xc1 | ACK outlets status laundry, garden & common room #1~#8 Fig.21C |
| 0x22 | Hard wired alarm sensors room #1~#8/common Fig.22 | 0xc2 | ACK hard wired alarm sensors room #1~#8/common Fig.22 |
| 0x23 | RF or bus linked alarm sensor room #1~#8/common Fig.23 | 0xc3 | ACK RF or bus linked sensor room #1~#8/common Fig.23 |
| 0x24 | RF or bus linked alarm sensor room #1~#8/common Fig.24 | 0xc4 | ACK RF or bus linked sensor room #1~#8/common Fig.24 |
| 0x25 | Video interphone & emergency Fig.25 | 0xc5 | ACK video interphone & emergency Fig.25 |
| 0x26 | Download & updates to appliances Fig.26 | 0xc6 | ACK by appliance - confirm download & updates Fig.26 |
| 0x27 | Download & updates request to appliances Fig.26 | 0xc7 | ACK by appliance - sending download & updates Fig.26 |
| 0x28 | Download & updates request from appliance Fig.26 | 0xc8 | ACK by controller - start download & updates Fig.26 |
| 0x29 | Download & updates request to electrical device Fig.26 | 0xc9 | ACK by electrical device - confirm download & updates Fig.26 |
| 0x2a | Download & updates request from electrical device Fig.26 | 0xca | ACK by electrical device - sending download & updates Fig.26 |
| 0x2b | Download & updates from electrical device Fig.26 | 0xcb | ACK by controller - start download & updates Fig.26 |
| 0x2c | | 0xcc | |
| 0x2d | | 0xcd | |
| 0x2e | | 0xce | |
| 0x2f | | 0xcf | |
| 0x31 | | 0xd1 | |
| 0x32 | | 0xd2 | |
| 0x33 | | 0xd3 | |
| 0x34 | | 0xd4 | |
| 0x35 | | 0xd5 | |
| 0x36 | | 0xd6 | |
| 0x37 | | 0xd7 | |
| 0x38 | | 0xd8 | |
| 0x39 | | 0xd9 | |
| 0x3a | | 0xda | |
| 0x3b | | 0xdb | |
| 0x3c | | 0xdc | |
| 0x3d | | 0xdd | |
| 0x3e | | 0xde | |
| 0x3f | | 0xdf | |
| 0x40 | | 0xe0 | |

METHOD AND APPARATUS FOR CODING AND LINKING ELECTRICAL APPLIANCES FOR CONTROL AND STATUS REPORT

FIELD OF INVENTION

The present invention relates to AC or DC powered products and appliances including illuminators operated via bus lines, IR, RF and via optical signals propagated by lightguide or fiber optic network and devices of home automation system.

BACKGROUND OF THE INVENTION

The current state of residence, home and office automation is a stagnation and difficulties. At present time there is a growing need for energy saving, wherein electrical appliances need to be remotely operated and controlled, moreover lighting systems are in a period of interim change from incandescent light to fluorescent and to be replaced in the short term with LED illuminators and with other new lighting technologies of the future.

Despite all this, the many attempts to move ahead with home automation do not seem to be successful. The major difficulties involved with the electrical systems in premises and with the electrical and A/V appliances are far from being solved, the issues are:

Every manufacturer of electrical and A/V appliances uses an individually allotted address in its IR remote control signal for operating any of its appliances. This by itself prevents the use of a simple automation control standard for all currently produced appliances. It mandates custom designs and complicated integration and/or the introduction of universal remote controls, that are non friendly and are complicated to set and operate, and are one of the sources for frustration, incompatibility and operational errors.

Other limitations with IR remote control are the line of sight and control distance, wherein the practical limit for currently produced IR remote controls is 3 meters in line of sight, with a maximum control distance is between 5~7 meters from the appliance. Most of known appliances will not respond to a command from 5 meters distance.

The strict electrical and building codes governing electrical switches and power outlets, the different voltages, frequencies, sockets and plugs that vary from one country or one region to another are the every reason to maintain old traditions and standards.

The approvals for electrical devices covering each and every electrical element and material are costly and time consuming.

It is prohibited to mingle the fundamental low voltage bus lines into the electrical system. Consumer A/V appliances are rarely provided with bus line control.

The many introductions of wireless RF control, attempted time and again, are too complicated to integrate into automation systems and repeatedly failed.

The control via the AC lines is troublesome and it offers no solution for the future, it is another failed concept as well.

IR is used for most of the appliances and must be included in residence automation, but as stated above, because of the non compatibility and the line of sight limitations, the IR is not trouble free.

To overcome such difficulties and problems and to move forward with residence, home, office, business, public and other premises automation the use of lightguide was introduced. The lightguide known as a Plastic Fiber Optic or POF is applied to AC devices for home automation as disclosed in U.S. patent application Ser. Nos. 12/236,656 filed on Sep. 24, 2008, 12/725,808 filed on Mar. 17, 2010 and 12/761,484 filed on Apr. 16, 2010.

An improved IR control system for the home automation, with increased operational reliability via IR drivers with individual adjustments of the line of sight, by a plurality of IR transmitters and receivers were introduced and disclosed in U.S. Pat. Nos. 7,639,907 and 7,649,727.

Other major obstacles impeding the automation systems for residence, home, offices, business and other work places or public premises are the lack of coding and addressing concept for the wiring devices and elements such as AC light switches and the AC outlets, plugs and sockets. The above explained incompatibility of the different signaling, commands, protocols and systems, including the inherent drawback with the unique addresses allotted to each individual manufacturer of A/V and electrical appliances and the manufacturers use of non compatible code for each of the functions. A coding and addressing concept that offer no benefit to the manufacturers.

To conclude, the unique IR addresses and the non compatible function codes should be abolished, or an interim new protocols and codes to enable simple integration of electrical appliances into home automation should be appended to all electrical and A/V appliances. Moreover a system to propagate addresses, optical commands, communication and control signals via lightguides or fiber optic cable in parallel, along with a simplified addressing and coding of the electrical wiring devices and elements, including the addressing of the premises interiors, are needed.

SUMMARY OF THE INVENTION

A solution for controlling AC or DC powered product, appliances and illuminators are achieved by the present invention through the use of lightguide and/or fiber optic cables that can be directly connected or attached to the elements or the electrical elements of the wired electrical systems, known as wiring devices such as standard AC switches, AC outlets, AC socket, AC plugs, power wires and power cables including the conduits, boxes and accessories.

The lightguide can be mixed and mingled with AC power lines in plenum, conduits and other tracks for AC wires and cables connected to the electrical elements, to light bulbs, and to other AC products such as air conditioners, heaters, water boilers, fans, curtains and other appliances for propagating control and command signals through an optical receiving access or transmitting access or two way access incorporated through the elements, devices and appliances. The use of lightguide and/or fiber optic cables for operating AC appliances, including lighting appliances and semiconductor packaged switches are disclosed in the U.S. application Ser. Nos. 12/236,656, 12/761,484 and 12/725,808 and PCT/US2009/048376 and are incorporated herein by reference.

The transmission of a visual light signal, such as a signal generated by a transmitting LED of a control device, to a light receiver of an A/V and electrical appliances via lightguides or optical fibers for switching the appliances on and off is one main object of the present invention. This including the connection simplicity of lightguides to appliances via their power cables, plugs and sockets and/or in a simple attachment process for feeding the on-off and more elaborated commands for operating the appliances via communicating optical signals comprising visual light, UV or IR signals, thereby introducing new medium for the automation and control, and for communicating in reverse direction the appliances and the electrical systems statuses.

The lightguides and the fiber optic cables offer the most efficient communication solutions and immunity to Electro Magnetic Interference (EMI), unlike the need to insulate and shield control signals in copper cables from EMI, or cross talk noises and disturbances within the electrical boxes and system, is the another objective.

The need to electrically insulate the signal cables from the power lines, elements and devices that feed AC and/or DC power to appliances, including power switches, light dimmers, AC outlets, AC socket and other AC and/or DC power devices is an absolute must and a major obstacle in mixing or mingling low voltage control wires with power wires and devices. Such mingling is prohibited by the building and the electrical codes and the use of lightguides, being a non flammable perfect insulator, is yet another major advantage of the present invention and the referenced pending applications.

Further such power devices may include an AC or DC current sensor or sensing circuit including optical transceivers for outputting optical signal of a given current drain and state, such as on-off state, stand-by state or provide current drain levels data, such as disclosed in the referenced U.S. patent application Ser. Nos. 12/236,656 and 12/614,468 and the U.S. Pat. Nos. 7,639,907 and 7,649,727.

Yet, another object of the present invention is to operate and monitor the state of lights and appliances including the real time monitoring of the entire electrical consumption within the residence or office or other premises through a video interphones and/or "shopping terminals" and/or via a communication network including the generating of control codes and signals by the video interphones and shopping terminals or by other dedicated controllers for the different lighting and appliances, using an IR driver circuits as described in the U.S. Pat. No. 7,649,727 or other driver circuits. "Shopping terminals" are disclosed in the U.S. Pat. No. 7,290,702. Video interphones systems are disclosed in U.S. Pat. Nos. 5,923,363, 6,603,842 and 6,940,957.

The term appliance refers to any and all AC or DC operated appliances, products and machines, such as A/V appliances including television, A/V recorders, music, and peripherals; PC and peripherals such as printer, a hub and a router; air condition, heater, environment equipment and sensors; water boilers, kitchen appliances, laundry appliances and garden appliances; curtains, shutters and blinds; lights including incandescent, fluorescent and LED; security devices including cameras, recorders, access control, fire, gas and intruder sensors and peripherals; any other AC or DC powered products that can be remotely operated or that respond to and can communicate their operating status, including propagating data of current drain and statuses through their power cable, power plug, power socket and power outlet.

The terms photo, or opto, or optical relating to elements, parts, structure and techniques in the following description are one of the same.

The term lightguide coupler refers to a semiconductor circuit structure incorporating optical transmitter and/or optical receiver and/or photovoltaic cell including an optical access aligned with the optical receiver, or the optical transmitter or both that is termed hereafter as optoport. The structure may include (built-in) lightguide holder structure for introducing the lightguide or an optical fiber to the optical access, or such lightguide holder maybe a separate structure for attachment to the coupler circuit.

The term live AC refers to the "hot line" of the AC power or mains, as opposed to the neutral line of the AC power or mains.

The term transmitter refers to an LED, laser or other optical emitting devices that transform electric signals into UV, IR or visual light signals.

The term transmitting refers to a UV, IR or visual light emission from a transmitter, in air such as from hand held remote control or into lightguides or optical fibers.

The term receiver refers to a photo diode, pin diode, photo transistor, CMOS, CCD or other photovoltaic or photoelectric receivers that convert UV, IR or visual light into electrical signals or electrical charge.

The term receiving refers to the receiving of UV, IR or visual light, in air in line of sight, such as from an hand held IR remote control, or via lightguides or optical fibers onto a bare surface of the receiver or via a transparent materials including prisms, half mirrors, lenses, filters and other optical structures.

The term transceiver refers to a combined transmitter and receiver including a transceiver embedded into a semiconductor package or attached to an optical prism for propagating two way optical signals through a single optical cable such as the lightguides or the optical fibers by deflecting or directing a received optical signal to the receiver and allowing the transmitted optical signal to pass into the optical cable. The term transceiver includes a transceiver that propagates two way optical signals via two optical cables.

The term optical prism refers to a structure for deflecting and/or separating two way optical signals (the received and the transmitted optical signals) propagated via the prism and via a single lightguide or optical fiber. Said prism comprises an optical device selected from a group of polarizing optical filters, given visual wave length pass filters, visual band pass filters, given wave length UV pass filters, given wave length IR pass filters, given wave length UV cut filters, given wave length IR cut filters, half mirrors with a given reflectance values and combinations thereof, wherein said filters and/or said half mirrors form said prism or are attached to said prism and/or are coated onto said prism and/or are introduced into the prism material in the form of a tint, particles or a process. Further details of a prism structure disclosed in the U.S. patent application Ser. Nos. 12/236,656 and 12/632,108 are incorporated herein by reference.

Even though an UV, IR or visual light is recited individually in the following descriptions, the UV, IR and the visual light term may refer to all. The term light, UV, IR or visual light is used alternately to an optical signal and should not be restrictive to the one or the other, unless it is so described.

The terms bus line controller, bus line distributor or bus line device refer to a bus line or low voltage system components that control light switches, appliances and other devices via a control line, known as low voltage or bus line, for propagating one way or two way commands and communications. The bus line may feed a low power such as 12VDC to the devices and components.

The bus line controller or bus line distributor also feeds low power to and/or exchanges commands and communication signal with bus line to optical signal converters covering UV, IR or visual light signals, for interfacing and communicating with the AC or DC switches, AC or DC outlets, AC or DC sockets, AC or DC plugs, illuminator sockets and directly to AC or DC appliances and illuminators via optical signals.

The term combined controller or combined distributor propagates bus lines and one or two way optical signals via optical transmitter, receiver and/or transceiver circuits including optical accesses and holders for lightguides or optical fiber cables.

The term low voltage line refers to the controller's bus line, with or without DC power feed.

The term current sensor refers to a DC current sensor for detecting a DC current drain through a DC power line and/or an AC current sensor for detecting the AC current drained through an AC power line wire or through power switches, including detection by induction such as disclosed in the above referred to U.S. Pat. No. 7,649,727 and U.S. patent application Ser. Nos. 11/939,785, 12/236,656, 12/614,468 and 12/632,108 and/or other current detection methods, such as magnetic hall and other semiconductor current detection devices for generating current drain statue via one way or two way optical signal.

The method and apparatus for coding and addressing electrical appliances, illuminator and electrical devices and products for remotely operating AC or DC powered products and appliances including LED illuminators and other objects of the present invention are attained by using a lightguide or optical fiber cables between the optical transmitters and receivers or between optical transceivers included in the devices, products and appliances of the present invention. Such as between a low voltage controller that receives and transmits electrical command and communication signals and uses a lightguide coupler or a lightguide converter of the referenced pending patent applications for converting the electrical signals into optical signals, for communicating one or two way UV, IR or visual light signals, including on-off commands to operate the appliances and illuminators via a lightguide or optical fiber cables.

The lightguide coupler of the referenced pending patent applications can be introduced to any type of appliances, lighting and LEDs illuminators used in homes, residences, offices, shops, restaurants, halls, factories and other establishments, indoors or outdoors, for controlling the lighting and the appliances via a lightguide or optical fiber cable. And to receive optical signal confirming the power current drain from the connected appliance through a returned optical signals, such as on or off state or standby state or a given ongoing illumination program from the lighting appliance.

The current drain data or the on-off state is sent in response to the received operational command, such as on-off, or in response to an inquiry command (a request for data) on the basis of the current sensor output, thereby providing error free remote controlling of lighting and appliances.

The introduction of lightguide and/or fiber optic cables directly to LED lighting and appliances applies to a whole range of lighting devices and their sockets or holders and to power sockets and plugs including power cable assemblies of the different electrical appliances including televisions and other A/V appliances. The example of the long over 100 years well established Edison screw type light bulb base, that became the global standard bulb base and socket, is one of the problems that is solved by the referenced pending patent applications and is operated by the communication protocols of the present invention.

Once the optical signals for illuminators control are common and standard, any future LED illuminator structure, be it bulbs, illumination panels, embedded boxes or other structures and assemblies, can all be incorporating a low cost lightguide coupler and be addressed and controlled by commands and protocols of the present invention and propagated via optical signals via wholly insulated cables and fire free solution disclosed by the referenced patents and application and provide the basic infrastructure and the environment for future lighting and electrical appliances control medium, at low cost.

Further, the current drain and other data that are fed in return to a power-on command to confirm that the illuminator or other appliance is switched on, is a perfect solution for real time controlling of energy consumption, and for providing energy management. By such return confirmation the home automation controller, the video interphone or the shopping terminal are updated at all times with the illuminators and other appliance's "on state", or "off state" when the command was to switch off the appliance.

The remote control by IR propagated signals in accordance to the present invention should be incorporated in the automation programs of the present invention, it is preferable to have the IR addressing and commands changed or appended to provide standard codes that are common with wired commands via bus lines, and with the optical signals propagated via lightguides and also with RF wireless remote control signals.

The IR signals use low frequency clock, with 38.5 KHz being the most popular clock frequency even though other frequencies such as 40 KHz~100 KHz should be standardized as well. The disclosed U.S. Pat. No. 7,639,907 referred to above, generate different clock frequencies and unique addresses, protocols and commands for controlling literally every remote controlled appliance. This is achieved by providing memory and circuits for learning and storing the commands from the original IR or RF remote control unit, supplied with the appliance. Another method is the direct downloading of the many openly published protocols and commands over the Internet.

The very important aspect of the present invention is the integration or the combining of the IR and some of the RF remote control signals into the addressing and coding program.

The other very important object of the present invention is the need to provide simple means to set and record the location of appliances within the premises or the location "addresses" and other particulars into the appliances. The simple means includes manual set digital switches or loading the commands through a program embedded into of the original remote control unit of the appliance, or using loading adaptors provided for the purpose of setting addresses and other particulars to the appliances and to the lighting fixtures, the associated AC outlets, the AC switches, the AC sockets, the AC plugs, the in wall controllers, the sensors and other wiring devices, elements and peripherals.

The very important aspect of providing error free, reliable system is the addressing. It is clearly advantageous to have simplified method to set the addresses without error and provide simple detection method to identify errors, particularly at time of installation.

The reference to home automation controller hereafter is to a panel with control keys or touch screen and/or remote control devices, or keypads and circuits similar to the video interphone and/or the shopping terminal disclosed in the US patents and the pending US applications referred to above.

BRIEF DESCRIPTION OF THE DRAWINGS

FIGS. 5A~5E are perspective views of the downloading of upgrades and programs including, addresses and other particulars of appliances, using optical signals of the preferred embodiment of the present invention via remote control unit and lightguide;

FIGS. 6A and 6B show a perspective view of the downloading of addresses and illumination programs into light bulbs via their socket accesses of the preferred embodiment of the present invention;

FIG. 6C is a perspective view of a commercial loading addresses machine, for enabling retail shops to download addresses and programs as per shoppers request, including label printer for attaching identifying labels to the LED container box and onto the LED, listing the programs and the address;

FIG. 10A illustrates the 5 bytes of the command/reply structure;

FIG. 10B is a table showing examples of pre-defined link codes;

FIG. 11A illustrates the header signals structure and timing;

FIG. 11B is a table showing examples of ID codes for basic light, HAVC and curtains commands;

FIG. 12 is a table showing examples of ID codes commands for extending functions of FIG. 11B;

FIGS. 13A and 13B are tables showing examples of ID codes and link codes for extending the control to 8 lights per zone;

FIGS. 14A and 14B are tables showing examples of ID codes and link codes for extending the control to 8 curtains per zone;

FIG. 15 is a table showing examples of ID codes for basic TV, radio and auxiliary commands;

FIG. 16 is a table showing examples of ID code commands for extending the functions of FIG. 15;

FIG. 17 is a table showing examples of ID codes for basic music, DVD and iPod commands;

FIG. 18 is a table showing examples of ID code commands for extending the functions of FIG. 17;

FIG. 19 is a table showing examples of ID codes for lights, shades, garden, environment and water commands for the common zone;

FIGS. 20A~20F are tables showing examples of ID codes and sub header codes for kitchen, laundry and bathroom equipment commands;

FIG. 21A is a table showing examples of ID code commands for status and current drain reports for audio/video and living appliances;

FIG. 21B is a table showing examples of ID code commands for status and current drain reports for kitchen and related appliances;

FIG. 21C is a table showing examples of ID code commands for status and current drain reports for laundry, garden and common appliances;

FIG. 22 is a table showing examples of ID code commands for hard wired alarm sensors;

FIG. 23 is a table showing examples of ID code commands for bus line connected alarm sensors, active all time;

FIG. 24 is a table showing examples of ID code commands for bus line connected alarm sensors, switchable on-off by the ID code commands;

FIG. 25 is a table showing examples of ID code commands for operating video interphone and emergency;

FIG. 26 is a table showing examples of two way ID code commands for download and updates between a controller and appliances; and FIGS. 27A and 27B are tables showing examples of sub header codes for the nature of command, acknowledge and status.

DETAILED DESCRIPTION THE PREFERRED EMBODIMENTS

Figure 1:
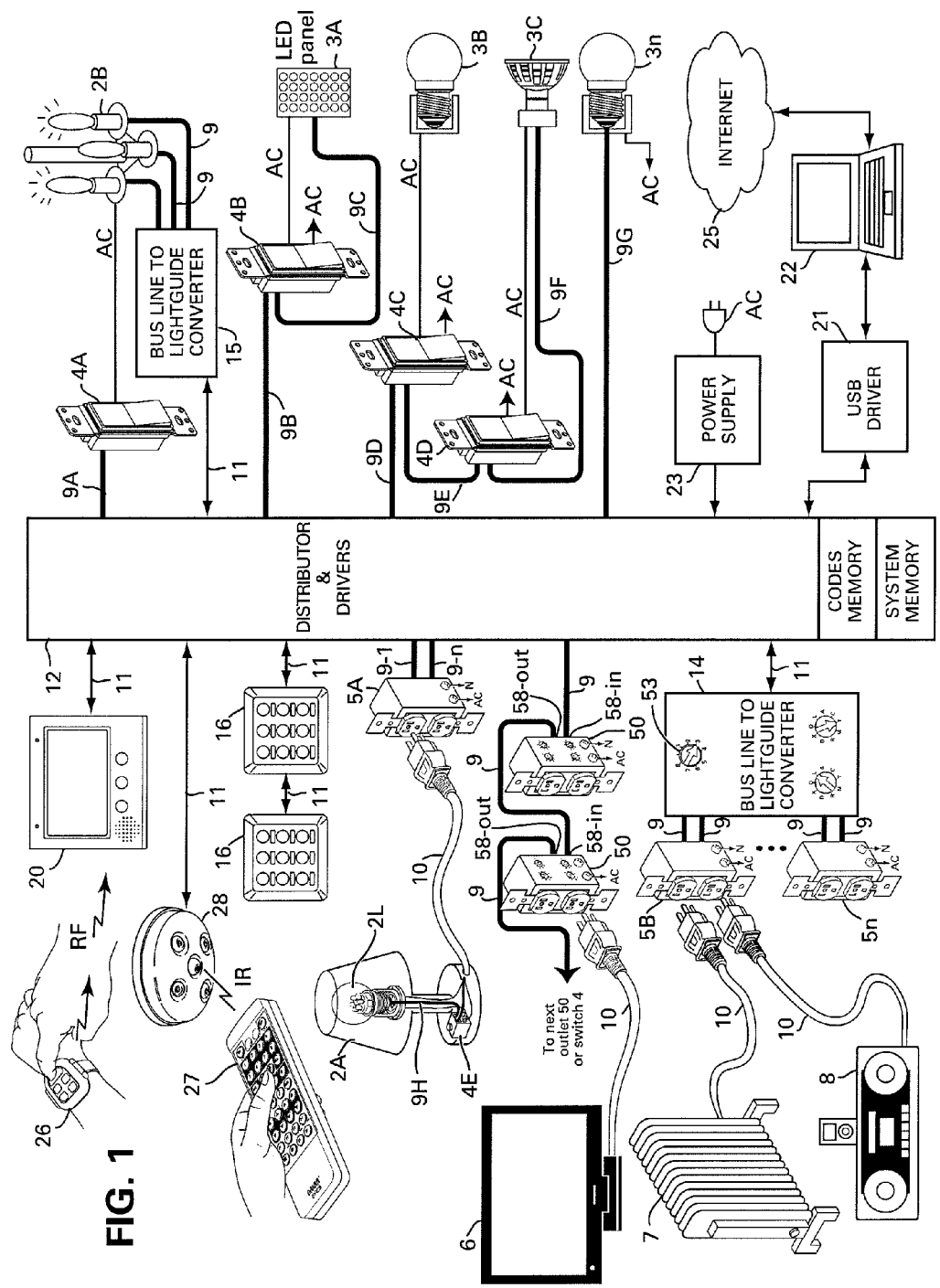
FIG. 1 is an illustrative block diagram representing a residence automation system of the preferred embodiment of the present invention.

FIG. 1 shows a basic automation system for residences or other premises, wherein the appliances such as a television 6, a space heater 7, an iPod player 8, a table top lamp 2A, a chandelier 2B and four LED illuminators 3A, 3B, 3C and 3n are AC powered and are controlled and operated via lightguide or fiber optic cable 9. The shown table top lamp 2A, the television 6, the space heater 7 and the iPod player 8 are connected to the AC outlets 5 and 50 via power cable assembly 10 or 10Y that includes the lightguide 9 as shown in FIG. 2B. The AC outlets 5 and 50 with lightguide accesses or optoports are also shown in FIG. 2B.

Figure 2A:
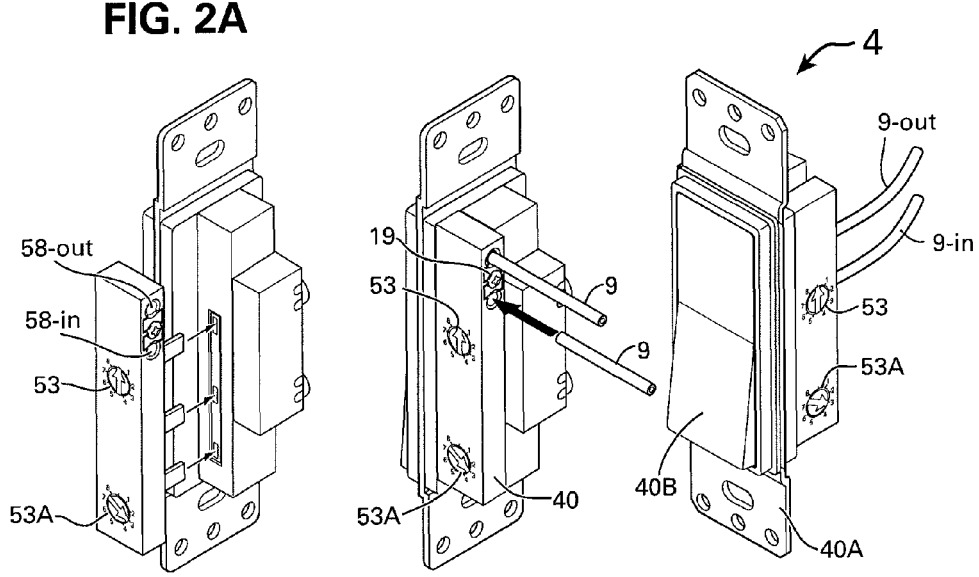
FIG. 2A shows perspective views the opto-mechanical combination switch used for the automation program of the present invention.
Figure 2B:
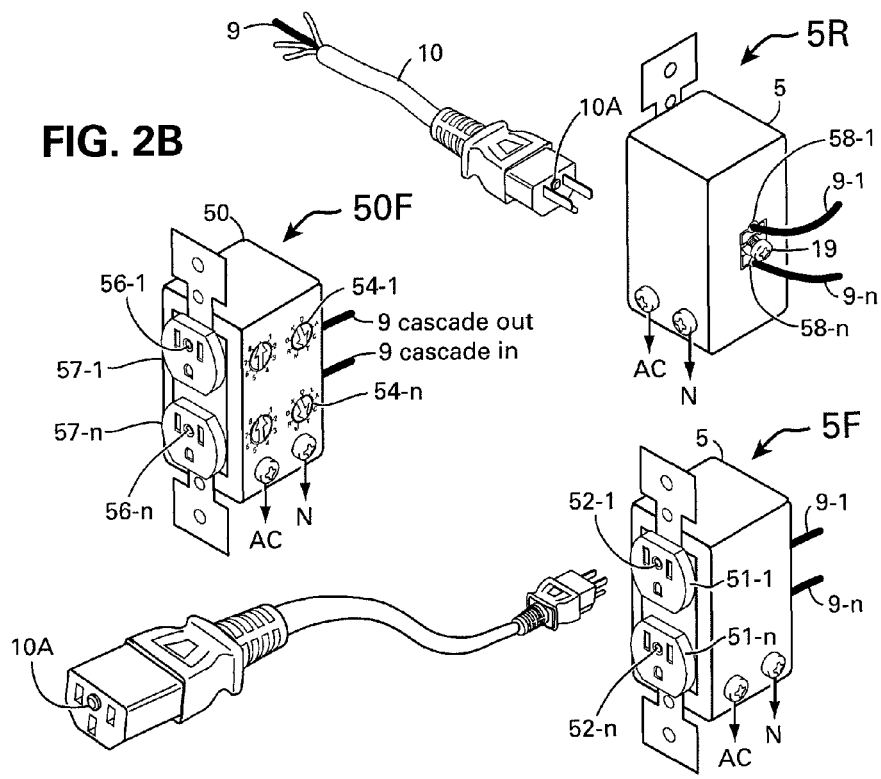
FIG. 2B shows perspective views of AC outlets and AC cable assemblies including optoports for accommodating propagation of optical signals via the lightguides and fiber optic cables mingled with AC power line.

The power switches 4A, 4B, 4C, 4D and 4E are all connected to AC power line, similar to the switch shown in FIG. 2A, and to lighting appliances, i.e., to the chandelier 2B, the table top lamp 2A, the LED panel 3A and to the LED light bulbs 3B and 3C. Each shown switch 4 is differently connected, to demonstrate the many options and variations possible when applying the optical control and command signals via the lightguides of the present invention.

The optical commands to the power switch 4A via the lightguide 9A can be limited to the basic switch on and off and it can be via one way command to switch the AC power on or off.

Each individual LED light bulb of the chandelier shown as candle light bulb however, is connected individually to one lightguide 9 for controlling the illumination program of each individual bulb via propagated optical signals. In this instance the shown optical signal are converted from electrical signals communicated via the bus line 11 to the lightguide converter 15. The direct attachment of the lightguide or fiber optic cable to the base of an LED bulb is fully disclosed in the U.S. application Ser. No. 12/725,808 incorporated herein by reference. The opto-mechanical switch is disclosed in U.S. application Ser. No. 12/761,484 incorporated herein by reference.

By this arrangement it should be clear that the power to the chandelier 2B is switched on-off by the opto-mechanical power switch 4A via the lightguide 9A, while each individual bulb can be controlled to illuminate for example via a candle lighting program, or change color, or dim the light, or colorful flashing light program and any other lighting program embedded into the LED bulbs. The shown lightguide converter 15 exchanges electrical signals via the bus line 11 and converts the two way electrical commands into optical signals for exchanging the optical signals through the converter's optoports and the optoports of the three bulbs via the three lightguides 9.

The optical signals route, initiated at the lightguide 9B for propagating the command and control signal to the switch 4B and in a cascading order through to the lightguide 9C, which is next in the cascade order, for re-propagating the control signal to the LED panel 3A. The same apply with reverse propagation, for reporting the statuses, such as on-off status report, or the operating program or dimming level status, fed in return through the lightguide 9C via the cascading optoports of the switch 4B and through the lightguide 9B back to the distributor driver 12 for processing the status data.

The term optoport hereafter refers to an optical and physical access for the lightguide or fiber optic cable, provided in the electrical devices, plugs and sockets, as well as in appliances, light bulb and other elements, made to control and transmit and/or receive and respond to optical signals propagated via lightguides or fiber optic cable.

The opto-mechanical switch 4C switches the AC power fed to bulb 3B on-off, manually or via an optical on-off command, propagated via the lightguide 9D. A command propagated via lightguide 9D to operate the light bulb 3C will switch on the opto-mechanical switch 4D via the cascading lightguide 9E and will further control the light program of the bulb 3C directly via the next cascading lightguide 9F.

The table top lamp 2A connected via cable assembly 10 to the AC outlet 5A incorporating optoport for feeding AC power and for propagating two way optical signals via the cable assembly 10 or 10Y shown in FIG. 2B, to and from the switch 4E. The switch 4E having functions similar to or same as that of switch 4B, is constructed to mechanically fit the base of the lamp 2A. Both switches 4B and 4E however switch on-off the power to the LED panel 3A and to the LED light bulb 2L of the lamp 2A respectively, and are propagating operational commands via the cascading optoports, such as the lightguide 9H included inside the lamp stand of the LED bulb 2L.

The dual function or the dual connections such as shown by the switches 4E and 4B, i.e., to provide for power on-off switching and direct control of the illumination program, such as dimming, flashing, change of color and other lighting programs to the LED bulbs, enhances the flexibility provided by the lightguide or fiber optic cable control capabilities of AC power elements.

The difference between the switch 4E and 4B are in their structure wherein 4B is a well known wiring device, fixedly connected to the AC or DC line and can be, as will be explained later, set to a fixed address while switch 4E is attached to a cable assembly 10 and can be disconnected by the user and reconnected in another room or zone of the premises.

The status data of the bulb 3C, such as on-off, dim or color state, will be propagated in reverse direction via a lightguide 9F through the cascading lightguide 9E and through the lightguide 9D back to the distributor driver 12 for processing the data.

The on-off status of the bulb 3B is fed to the distributor driver 12 from the current sensor circuit included in the opto-mechanical switch 4C which feeds only AC power to the bulb 3B.

The LED bulb 3n is shown connected to AC or DC power line fixedly and is switched on and off via the lightguide 9G by the optical commands fed from the distributor driver 12.

The direct fed optical commands can include any lighting program, such as dim, color change and other programs referred to above. The commands can be generated as programmed by the residence automation controller, or the shown video interphone monitor 20 in accordance with a selected pre-program, or it can be initiated via the keys or the touch screen monitor of the video interphone 20 that feed the command via the bus line 11 to the distributor driver and to the bulb 3D via the lightguide 9G.

The command can be generated also by one or more keypads 16, by the IR remote control 27 via the IR repeater 28, or the RF remote control 26 via the RF receiver inside the video interphone 20, or via the Internet 25, through the PC 22 and the USB driver 21 that feeds the commands to the distributor driver 12.

The ability to operate such variety of light fixtures and illuminators through a simple setting method, is one example of the preferred embodiment of the present invention discussed later.

Each of the electrical powered appliances or products such as the heater 7, the iPod player 8 and the desk top lamp 2A is shown in FIG. 1 connected to a power cable assembly 10 for attaching its power plug to an AC power outlet 5. The power cable assembly 10 of the television 6 is shown as ready for attachment to AC power outlet 50.

The AC power outlets 5A and 50 are shown connected via lightguides 9 to the automation distributor driver 12, while the AC power outlets 5B and 5n are shown connected via lightguides 9 to a lightguide converter 14 including setting switches 53 and 54, which is similar to the converter 15 discussed above. Both bus line to lightguide converters 14 and 15 are powered by a low voltage DC fed via the bus line, a non polar twisted pair disclosed in the referenced patents and applications, and convert the electrical signals to optical signals and the optical signals to electrical signals for integrating two way or bidirectional optical signals with two way or bidirectional electrical signals, propagated between the twisted pair copper wires 11 and the lightguide 9 to provide bidirectional propagation links between the AC outlets 5 and 50 with the distributor driver 12 in both directions.

The AC outlet 50, similar to the power switches 4A-4E, provides for cascading optoports 58, such as shown in FIGS. 1 and 2B, wherein a cascading lightguides can be introduced into n number of AC outlets 50 and/or to n number of AC switches and vice versa, n cascading AC or DC power switches 4 can be cascaded, mixed and mingled with n cascading power outlets 50.

Such simplicity in building an optical automation infrastructure, that is mixed and mingled with the premises power grid, to become a control and status information grid to the electrical products, appliances, devices and lighting within the premises, for propagating two way optical signals, status from any and all the electrical connected products, devices and elements to the automation distributor 12 and commands and control from the automation distributor. The further objective of the present invention is the integration of the lightguide grid with the low voltage bus line 11 and the IR propagation drivers 28.

A whole range of low voltage devices including IR or RF remote control drivers cascaded or individually connected via twisted pairs, for propagating statuses, commands and control signals in parallel with or appended, to the optical network via the distributor driver 12 and as explained above via converters such as the converters 14 and 15.

The shown low voltage devices include the video interphone monitor 20 that includes an RF receiver or transceiver for exchanging wireless commands and statuses, the adjustable IR repeater 28, the keypads 16, the USB driver 21, the PC 22 and the Internet 25. All the low voltage communication and control devices are disclosed in the referenced patents and applications and are incorporated herein by reference.

Other low voltage devices disclosed in the referenced patents and applications are security and alarm sensors such as motion detectors (PIR), glass break detectors, magnetic door switches, fire, gas and smoke detectors, as well as other sensors such as temperature, environmental and humidity for controlling heaters, air conditioners, water treatment and other devices, most of which can be connected via the low voltage bus lines, or via lightguides or fiber optic cables or communicate via RF or IR signals.

All such sensors, detectors and environmental devices along with the electrical outlets, the light switches, the other electrical products and appliances, including the controllers, keypads, repeaters and other low voltage or wireless devices, powered and/or operated, within the premises must be identified and such identification must include the location within the premises where the device, the appliance and hard wired electrical product that is fixedly connected to the electrical grid is located or installed and/or operated.

The appliances, the electrical products and devices referred to above can include setting switches, such as digital alpha-numerical rotary or DIP switches, which are well known switches, providing for binary setting of numbers and addresses, or rotary switches that are set via a screw driver for selecting a number or character representing, in this invention, a room and/or zone number of the premises 53 and/or a device or the appliance type 54, which are disclosed in the referenced patents and patent applications. The other method for installing the room or zone number or an address and other particular is the downloading of such data via an optoport, or via a wired connector, into a memory devices or a memory portion of an existing memory circuit of the electrical product and/or of an appliance and/or of a light fixture and/or, for example, the light bulb itself.

Figure 3A:
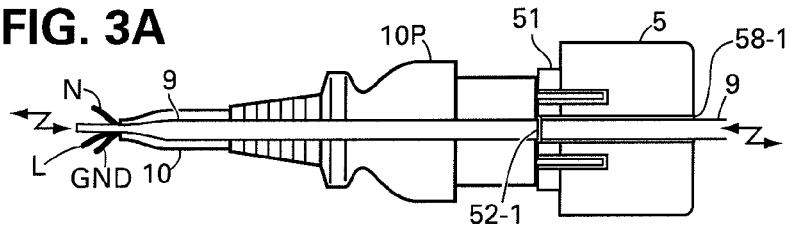
FIGS. 3A~3D show perspective and cross section views of the different optoports embedded in AC cables, plugs, current sensing adaptor, AC outlets and the recording of addresses into them.
Figure 3B:
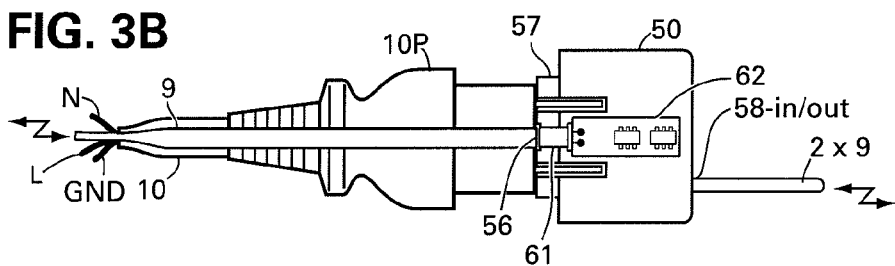
Figure 3C:
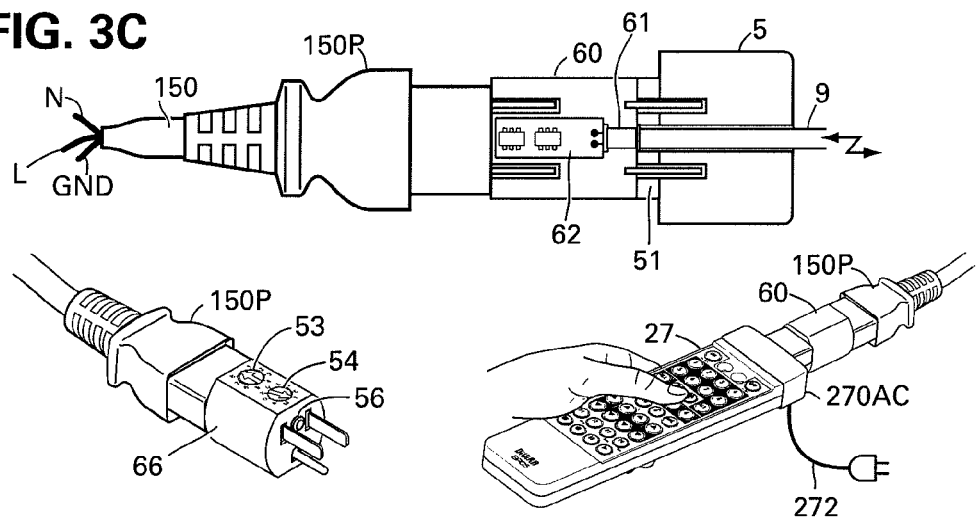
Figure 3D:
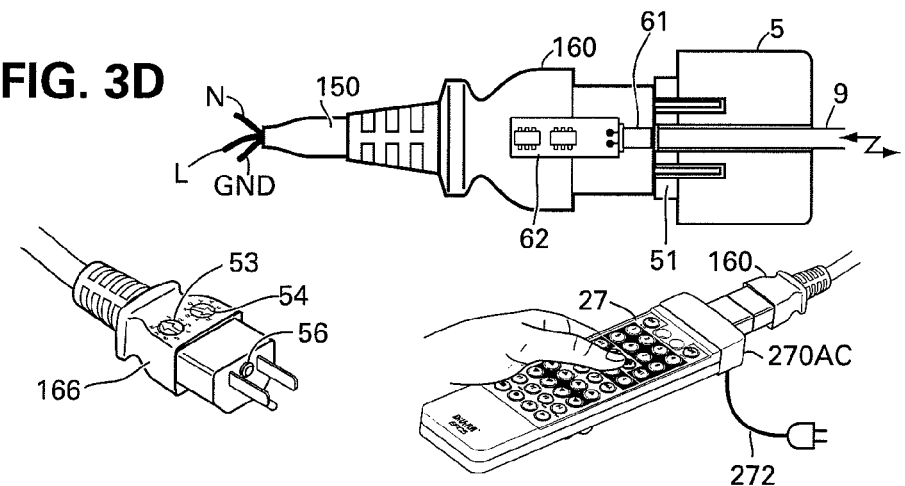

FIGS. 3A~3D, 4A~4D, 5A~5E, 6A~6C and 8C illustrate the devices for loading addresses and the digital switches 53 and 54 of the preferred embodiment of the present invention in a variety of forms, including the use of plugged in-line current sensors adaptors 60 and 66 of FIG. 3C. The current sensor circuit 62 of the power outlet 50 of FIGS. 2B, 3B and 8C, and of the AC power plugs 160 and 166 of FIG. 3D are similar circuits using common parts, packages and ICs in different combinations shown in FIG. 7A. The loading adaptors such as 270AC of FIGS. 3C and 3D, 227 of FIGS. 5C and 5D, 228 of FIG. 8C and the light bulbs loading adaptors 430, 440 and 401~405 shown in FIGS. 6A~6C are mechanical adaptors for directing the optical signal while the adaptors 270AC and 401~404, 430 and 440 feed power to the current sensors and the light bulbs during the loading.

Another loading of addresses and particulars of the devices or appliances are processed by the original remote control units, such as the original IR or RF remote control 6EIR supplied with the television 6H shown in FIG. 5E, can be used for introducing an address into the IR or RF remote control signals, commensurate with the programmed premises automation, such as in an apartment of a large apartment building, an office in an office building, or in an individual self standing independent house, a unit of a town house, or of an housing complex, or a shop, a garage, a bar or a restaurant in a shopping street or mall, and any other similar establishment or business or public entity, such as school, or a unit of a dormitory, or a room or a suite in a hotel and similar.

Moreover, the particular of using IR remote control that confines its signals within the line of sight, and more particularly such that is operated via a wall or a ceiling IR repeater 28 shown in FIG. 1 and disclosed in the referenced patents, provide a clear advantage by limiting or confining the generated commands to within the room or zone of the premises and moreover, as adjusted and aimed via the wall and ceiling IR repeaters, to a specific appliance or switch 4 and/or other IR operated devices. Such arrangement makes it possible to use an identical hand held IR remote control for operating without error only the appliances and other AC operated products and lights in the "local" room or "local" zone as defined by the automation program and the addresses that are explained later.

FIG. 2A shows the opto-mechanical switches similar to the switches disclosed in the referenced application Ser. Nos. 12/236,656, 12/761,484 and 12/725,808 and include two accesses 58-in and 58-out for the cascading in-out lightguide and their locking screw 19. FIG. 2A also illustrates two rotary switches 53 and 53A with 9 step each, numbered 1~8 and blank 9 position. The switches are set via a screw driver wherein switch 53, as an example, is the room or zone number and the switch 53A selects the light number. In this set up the total rooms or zones in one dwelling unit is limited to 8, but any number, for example, 64 rooms or zones can be set and provided for. In such a case the room number may be set via 6 pole DIP switch, or two rotary 53 switches.

Same apply to the number of lights per one room or zone that are set via the rotary switch 53A from 1 to 8 and a blank position. Here too, any number of light per one room or zone can be introduced, for example, such as 64. However, the preferred embodiment discussing residential or apartment applications, the limited number of 8 rooms or zones and up to 8 lights per room or zone are disclosed, even though as stated above the number is non exhaustive or limited, and n number can replace the digit 8 in the description hereafter.

FIG. 2B shows the rear 5R and the front 5F of the AC outlets 5, wherein the terminated cut end of a lightguide 9-1 and 9-$n$ are inserted into the AC outlet via its rear accesses 58-1 and 58-$n$ and locked into position by the locking screw 19 that applies force onto two tabs for securing the lightguides into place. Even though only two AC sockets 51 are shown, one or three or five or n number of sockets 51 can be incorporated in one AC power outlet 5 or 50. The shown access entries numbered 58-1 and 58-$n$ of the power outlet 5 can be a single entry or a pair of entries, and the power outlet 5 may include multiple such single or pair entries 58, to match the number of socket 51-$n$ with 58-$n$ access entries in one power outlet 5.

The front surface of FIG. 5F shows the optoports 52-1 and 52-$n$, with each optoport is positioned against the optoport 10A of the AC power plug 10P, for propagating optical signals between the lightguide 9 included in the AC power cable 10 connected to an appliance, an electric operated product, an illuminator or other electrical device and between the lightguides 9-1 or 9-$n$ connected to the automation distributor driver 12 of FIG. 1 directly, or via a converter such as 14 or 15 of FIG. 1.

FIG. 2B also shows the front side 50F of the AC power outlet 50, which differs from the power outlet 5. The optoports 52 of the AC power outlet 5 are terminated end of the lightguide 9-1 or 9-$n$ exposed to mated terminated ends 10A of the lightguide 9 of the AC power cables 10 for propagation optical signals between the two mated terminated ends of two lightguides.

Figure 7B:
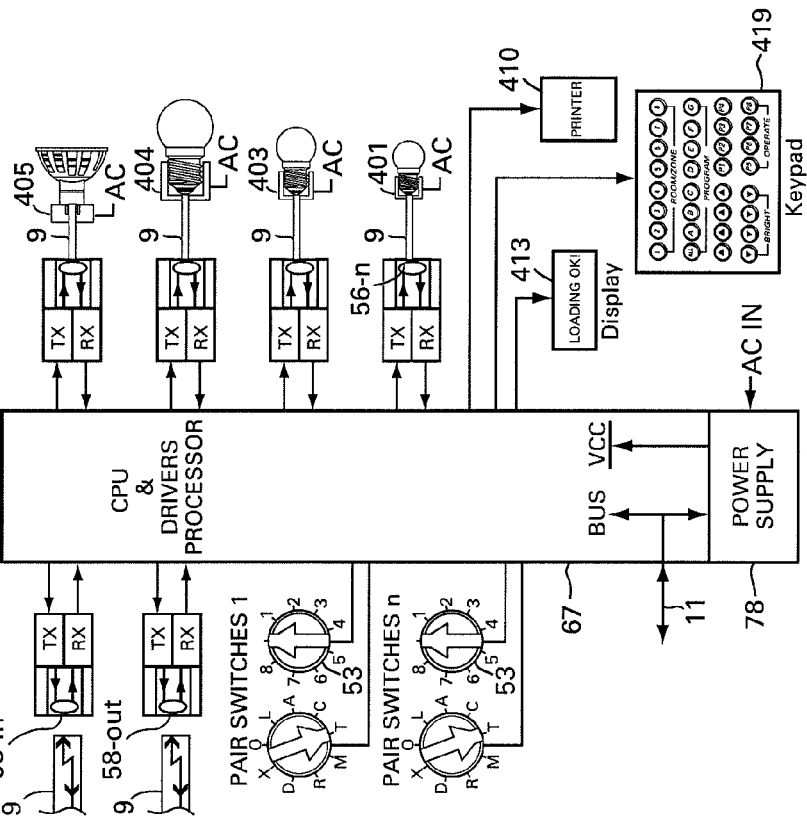
FIGS. 7A and 7B are electrical block diagram of the plug-in current sensors and other circuits of the preferred embodiment of the present invention.
Figure 7A:
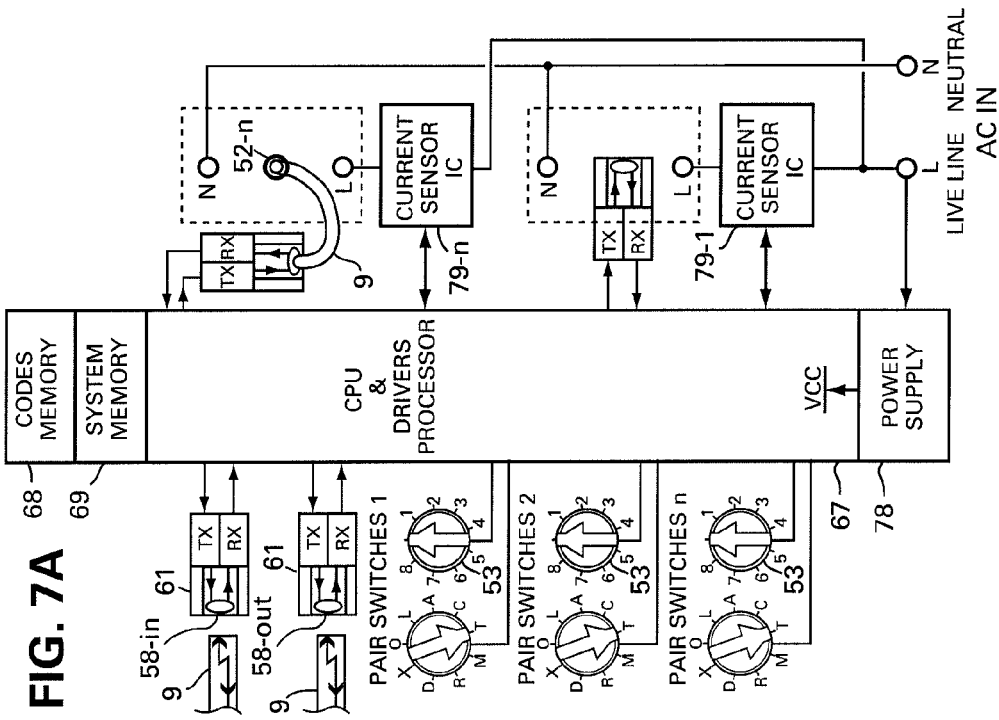

The optoports 56-1 and 56-n of the power outlet 50 are the optical accesses of an optical transceiver 61, such as disclosed in the referenced patent applications and shown in the block diagram of the electrical circuit, including a current drain sensor circuit using magnetic hall sensor IC in FIG. 7A.

The power outlet 50 is used for powering appliances and electrical products that do not include or provide status data and/or addresses, and for this reason it must be addressed by itself. Two switches 53 and 54 of the two pairs of the shown rotary switches, 53 for setting the room or zone number and 54 for setting the appliance type or particulars, are provided for each of the power sockets 57.

Appliances and other electrical consuming products and devices without addressing and coding or optoport for communicating optical signals via lightguides of the present invention can be interfaced or integrated into the automation system via the power outlet 50. This is because the power outlet 50 communicate the current drain status on the basis of the current drain via each of its power sockets 57, and thus will enable the system to switch on-off without error the device connected to it via other control network, for example, via the IR ceiling or wall repeater disclosed in the referenced patents and applications. The power outlet 50 will provide current drain data from each of its sockets 57, including those outlets connected at random to unknown or not defined appliances, the data of the current drain through each power socket 57 is propagated through the lightguide network directly or via lightguide converter to the distributor driver 12.

FIGS. 3A to 3D show the different variations and options to provide for simple interfacing of the electrical outlets using the preferred embodiment of the present invention in a whole range of solutions. FIG. 3A illustrates the attachment of the power cable assembly 10 that includes the lightguide 9 which is connected to an appliance with optoport, and which is provided for the installing of room or zone address and other particulars of the appliance (not shown) for propagating the two ways optical signal. For such appliance no addressing or setting is necessary through the AC socket 51 and the AC power cable assembly can be freely plugged into the socket 51 of the AC outlet 5.

FIG. 3B illustrates the same setup shown in FIG. 3A but with the AC power outlet 50 and the AC socket 57. In this setup the appliance at the end of the cable 10 may be provided with optical receiver only for receiving commands and control, while the addressing and status data is provided by the AC power outlet 50. The appliance may be provided with optical transceiver 61 and will communicate two way with the transceiver 61 of the power socket 57, including its current drain status and other statuses as programmed for re-propagation of the statuses to the distributor driver 12.

FIG. 3C shows the use of a plugged in-line current sensors 60 or 66 between the power socket 51 and the power plug 150P connecting an appliance (not shown) via a standard power cable 150 that does not include lightguide or fiber optic cable. The power cable 150 is a well known power cable or power cord assembly, used with appliances that are powered via a power outlet, but are not fixedly attached to the electrical wires grid, such as water boiler.

The referenced patents and applications disclose a similar current sensor for such power cable 150 shown in FIG. 3C, but the prior disclosed current sensors teach the use of an optoport for propagating the current drain status via a lightguide to a separate status data receiver. Another current sensor disclosed in the referenced patents and appliances uses a passage for a power wire to enable the detection by induction of a current drained through the passing power wire for propagating the current statuses via communication lines, including bus line, optical, IR or RF.

However none of current sensor disclosed in the referenced patent and applications is an in-line plugged current sensors with in-line optical propagation of current drain status and with addressing capabilities within the current sensor itself. The address and appliance particulars of the disclosed current sensors are set through the associated elements of the electrical grid or through the status receivers 75 of the low voltage bus line network shown in FIG. 5A.

The in-line plugged current sensing adaptor 66 includes setting switches 53 for the address and 54 for the appliance particulars, while the current sensing adaptors 60 of FIG. 3D and 80 of FIG. 5A, are provided with a memory to download, record and store such address and appliance particulars, enabling to address and communicate two way optical of the present invention, this was not disclosed in the referenced patents and applications.

FIG. 3D shows similar current sensors embedded in the power plugs 160 and 166, wherein the plug 166 includes address setting switch 53 and appliance particulars setting switch 54. The power plug 160 is provided with a memory to download, record and store the appliance address and particulars. The other end of the power cable assembly 150 is not shown, but it can be any type of product, device and appliance that is hooked to the power socket 51 or 57. The product, appliance or the device can be connected fixedly to the cable 150 or connect to a cable assembly via standard in-line AC cable socket, such as the cable socket 10S shown in FIGS. 2B and 4C, but without the lightguide and the optoport.

The address loading adaptor 270AC shown in FIG. 3C attached to the remote control unit 27 is feeding AC or DC power to the appliance (not shown) via the loading adaptor 270AC and through the power cable and plug 272, the current sensor 60 and the power plug 150P for downloading address and the appliance particulars through an optoport (not shown) to the current sensor 60.

The remote control unit includes optical receiver and transmitter for receiving statuses and other returned data from the current sensor. Further, the remote control unit 27 is programmed for and it is used to verify that the downloading is successfully completed and that the current sensing status data is accurately verified when the current sensor 60 is installed and put into operation.

The address loading adaptor 270AC of FIG. 3D operates the same way with the power plug 160 incorporating the same current sensor circuit 62 as explained above for the current sensor 60 and the downloading, recording, storing, testing and verifying procedures are identical with the procedure explained above for installing the room or zone number or address and the appliance particulars into the power plug 160.

The power plug 166 is set, similar to the current sensor 66, with the room or zone number or address is set via the digital switch 53 and the appliance particulars via the digital switch 54.

Figure 4A:
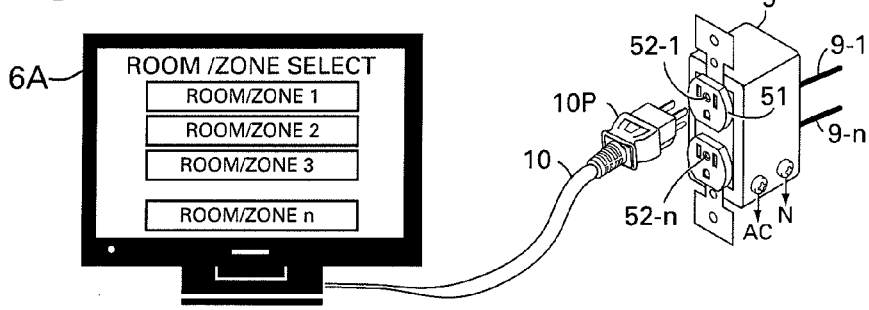
FIGS. 4A and 4B show a perspective view of the televisions and their connection to AC outlets including optoports via power cable assemblies of the present invention.
Figure 4B:
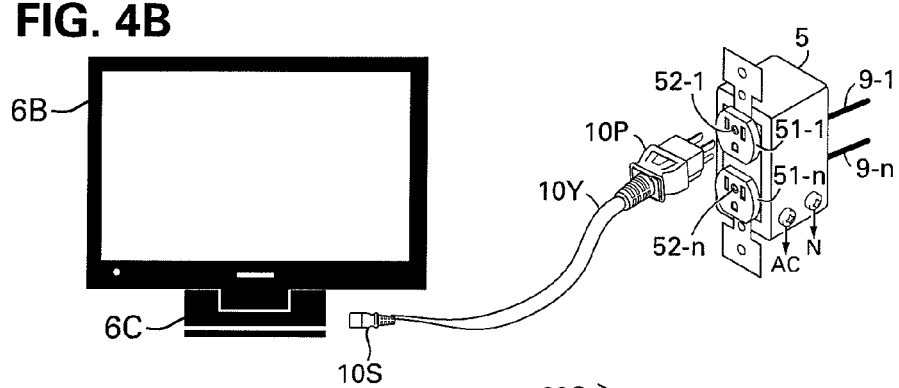
Figure 4C:
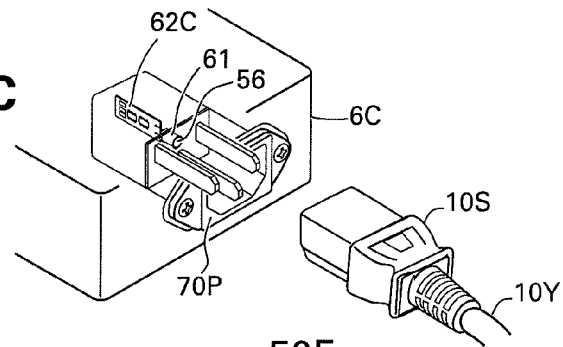
FIG. 4C is an illustrative perspective of mating an AC socket with an AC plug of an appliance incorporating optical transceiver and optoport of the present invention.

FIGS. 4A, 4B and 4C further illustrate intelligent appliances such as connecting a television via the cable assembly 10 and 10Y, providing for the loading and/or exchanging path for the optical signals via the power cable assembly 10 including the lightguide 9 shown in FIGS. 3A and 3B and with the cable assembly 10Y including the optical path via the assembled power socket 10S and its mated plug 70 embedded into the base 6C of the television 6B of FIG. 4B.

The power plug 70P embedded into the television base 6C includes the optical transceiver 61 and with its optical access 56 forms the optoport, that matches the optoport 10A, which is formed by the cut end of the lightguide 9 included in the power cable assembly 10Y of FIG. 2B. The circuit 62C shown inside the plug 70P assembly is a modified circuit from the circuit 62 shown in FIGS. 3B~3D, because the television such as 6A and 6B can provide for current status and operational data via variety of intelligent circuits of the television set, such that the circuit 62C can include only the minimal circuits needed for communicating the optical signals. Alternatively, a terminated end of a short cut jumper lightguide is attached to the optoport 58 of the plug 70P and the other end of the lightguide is directly attached to an optical transceiver 61 mounted within the television PCB and not within the plug 70P, such direct connection via jumper lightguide is advantageous for noise reduction.

The non intelligent heater 7 that is connected to the power outlet 50 provide for improved communication between the non intelligent appliance that indicate that the appliance is switched on but do not presently consume power, such as a thermostat of the heater 7 is activated (the heater reached a selected temperature). Such improved statuses reporting may require additional copper wire in the cable 150 to identify the power switch position or the thermostat status, but it will provide error free reporting and identifying the connectivity and usage of each of the power outlets 5 or 50 of the premise and the usage and connectivity of each of its power sockets 51 or 57. Such statuses reporting are fundamental for maintaining energy and electrical control in homes, apartments, offices, businesses, public places, factories, shops, restaurants and every other structured premises.

The shown screen of the television 6A in FIG. 4A includes an example menu for setting or selecting the room or the zone in which the television 6A is operated. This provides for error free controlling of, in this example, operating a selected television in a given room of the residence. A simple command generated via the residence automation, such as switch on or off the power, must identify which television set is commanded to switch on or off, or increase volume or change channel.

In all present automation systems, such command is segmented or partitioned, structured to communicate back and forth to confirm the address such as IP address, complicating the automation system and one (major) reason for the non successful home automation market until now. The present invention and the addressing of the preferred embodiment are discussed later.

FIGS. 5A to 5D illustrate the many setups for loading, recording and storing the room or zone number or address and other particulars via low voltage bus line, via a lightguide transceiver and digital switch included in a television set, or via lightguide transceiver for receiving download commands and data from remote control unit with adaptor or by the original remote control unit supplied by the television or other appliance manufacturer.

FIG. 5A shows a setup disclosed in the patent application Ser. No. 12/761,484 for propagating optical signals to the television via the current sensor 70, this is explained above to be the disclosed current sensor that feeds the status via the lightguide 9 through the separate low voltage bus line converter 75 and that such disclosure does not suggest the loading or the installing of an address into the current sensor itself. Accordingly, the address setting and other particulars of the appliance are stored in the converter and the status receiver 75 shown in FIG. 5A via digital switches not shown or as disclosed in the patent application Ser. No. 12/761,484 via the remote control unit 227 and the adaptor 27 shown in FIG. 5C.

The shown bus line to lightguide converter 75 includes four status receivers and optoports 73 for receiving up to four lightguides 9 that are locked via a snap on lock button 72. The current sensor 70 is connected to the lightguide 9 via optoport 73 and identical button 72. Each of the four status receivers include a circuit such as the circuit shown in FIG. 7B but without the loader 400 items and without the AC power. The address and the appliance particulars of the status receivers may be set via the shown digital switches such as 53 and 54, or as explained above via their optoports using the remote control unit 27 with the adaptor 227 shown in FIG. 5C.

Further the in-line current sensor 80 shown in FIG. 5A is a modified current sensor 70 having two optoports, one optoport 73 for connecting the current sensor 80 to a status receiver 75 or 76 and the other is an optoport 56 for propagating two way controls, commands and statuses via the optoport 10A of the cable assembly 10 or 10Y with the plug 10p shown in FIG. 2B. The current sensor 76 provides for operating appliance and reporting the appliance status via a circuit shown in FIG. 7A, exactly as the power outlet with a single AC socket 57 is.

The current sensor 80 offers a solution to enable the introduction of the automation system of the present invention into premises without the infrastructure or the network of lightguide or fiber optic cables installed into the walls. The lightguide 9 shown attached to the optoport 73 of the current sensor 80, to be locked by the button 72 can be attached to an optoport 73 of the status receiver 75 or 76 or directly to the distributor driver 12 of FIG. 1.

The current sensor 80 may include the switches 53 and 54 discussed above for setting the room or zone address and the appliance particular, or provide for installing the address and the appliance particulars via its optoport 56 the same way the power outlet 50 or 50S are installed.

FIG. 5B shows the television 6E including an optoport 73 and room or zone address setting switch 53 accessed at the rear of the television set, where the television connectors are positioned. The television 6E is therefore provided with optical transceiver for exchanging optical commands and statuses via lightguide 9 through the shown converter 76 or directly with the distributor driver 12 shown in FIG. 1. The television 6E address is set via the digital switch 6R and therefore the converter 76 does not need to be set or installed with an address.

Both televisions 6G of FIGS. 5C and 6F of FIG. 5D include an optoport 73A in the front and rear respectively and will record and store the address and other particulars installed into them via the remote control unit 27 via the install adaptor 227. The installing details will be explained later. The optoports 73A differ from the optoports 73 by the access size and structure, 73A provides for installing data via lightguide, but it does not provide for locking the lightguide, such as the use of the locking button 72 shown in FIGS. 5A and 5B.

The television 6H of FIG. 5E is shown loading the room/zone select menu using the supplied original remote control unit 6EIR with appended program for operating the television 6H via the home automation IR network. The appended program provides for addresses and appliances particulars setting via the originally supplied remote control unit 6EIR.

FIGS. 6A to 6C illustrate the simple loading processes capability of LED and other illuminators via an optoport included in the illuminators base as disclosed in the pending patent application Ser. No. 12/725,808 referred to above. FIG. 6A shows the same setup shown in FIGS. 3C and 3D, using the remote control unit 27 with the loading adaptor 270AC attached to illuminator adaptor socket 430, for installing into the LED bulb 420 the room or zone address, the illuminator number within the room or zone, and/or the bulb own number within a chandelier including plurality of bulbs such as 2B shown in FIG. 1. For example in a room number 8 and chandelier number 8 having 8 bulbs, the bulb number 8 will be given an address 888. Addressing particulars will be explained later, but it is possible to address, for example, three bulbs of a 24 bulbs chandelier to the same address and operate the three bulbs simultaneously.

FIG. 6B shows a similar setup to the shown in FIG. 6A using adaptor socket 440 for loading addresses and programs into LED base of a halogen shaped bulb. The remote control 27 is also programmed to read the loaded address and identify the programs loaded into the LED bulbs.

FIG. 6C shows an address and program loader 400 for retail outlets, shops and commercial supply houses, over the counter sales, e-commerce facility over the Internet and other supply chain, such as catalog orders by mail or telephone and similar. The loader 400 shown includes range of bulb base sockets 401~405 represented by the well known E11, E14, E17, E27 screw type bulb bases and the two pin or bi-pin of the well known halogen lamp 422 base.

The loading of addresses and illumination programs including color selection, candle light simulation, flashing, color shifting programs, dimming, preset illumination levels, sequential illumination programs and others which can be recorded and stored into individual LED bulbs that provide for the programmed illumination. The loading is processed via set of select keys or keypad, such as the shown keys 415 for addresses, 416 for programs, 417 for levels such as dimming and brightness setting and 418 for a preset programs in sequence. The above are only examples of the endless programs being conceived for the future illuminators, all of which can be incorporated into the loader 400 and to the remote control unit 27 of FIGS. 6A and 6B.

Shown also in FIG. 6C is a label printer 410 connected to the loader 400 for printing labels for attachment to the bulb itself and to the outer individual package and/or to a large carton known as master carton, listing the enclosed bulbs with their loaded addresses and programs as ordered by the user, including the printing of barcodes and other particulars.

From all the explanations above it is clear that appliances, electrical powered products, electrical devices and illuminators can be programmed in a simple very low cost process to include addresses and other particular by the users themselves, the retail shops and/or via the e-commerce suppliers and/or catalog sales, delivery houses and similar wholesale and retail outlets.

FIG. 7A shows a conceptual electrical block diagram covering the many devices and elements of the automation system of the present invention, some of which are also disclosed through the referenced patents and patent applications. FIG. 7A shows the main central processing unit (CPU) or a digital signal processor (DSP) 67, or other processing circuits 67, widely available in a low cost IC packages, the memories 68 for storing codes and 69 for storing addresses, appliance particulars, system operations and others, the memories can be individual memories or partitioned memories of a memory IC, or included in the CPU 67, optical transceivers 61 including RX and TX drivers, the n optical accesses 56 and the cascade in-out optical accesses 58, wherein the communications between the devices and the distributor driver 12 are propagated via the optical access or optoport 58, while the control, command, status, downloading addresses into the appliances and other optical signals are propagated via the optical access or optoport 56n for communicating with the appliance via the lightguide 9 included in the cable assembly 10 shown in FIG. 3B.

FIG. 7A further shows current sensing IC 79 using magnetic hall sensor or other well known current sensors including current sensors disclosed in the referenced patents and patent applications. The shown power supply circuit 78 is used for the power outlet 50, the current sensors 60 and 66, and the power plugs 160 and 166. The digital setting switches 53 for addresses and 54 for appliances particulars are used in the power outlet 50 and 50S of FIGS. 2B, 4D, 8A and 8B, the in-line plugged current sensor 66 and the power plug 166 of FIGS. 3C and 3D.

The block diagram of FIG. 7A covers most of the circuits explained above, including the power switches 4, the power outlets 50, the current sensors 60, 66, 160, 166 and the circuit 62C enclosed in the television power plug 70P of FIG. 4C.

The in-out accesses or optoports 58 are used in the power outlet 50 and the power switches 4, they are not needed and are not used in the current sensors. The optical access or optoport 56 of the transceiver 61 with its RX and TX circuits are used by the current sensors. The current sensor circuit 79 is used by the power switches 4, the power outlet 50, the plug-in current sensor adaptor 60 and 66, including the current sensing plugs 160 and 166. The CPU, DSP or other processing circuit 67 including the memories 68 and 69 are used by the referred above devices.

The power outlet 50 is fixedly connected to the power grid via its terminals L and N and feed the power through n number of power sockets 57n. Each Live AC line connecting each of the sockets 57 passes through one current sensor 79, with up to 79-n sensors can be provided, one for each socket 57. Each of the current sensors feeds its measured current data to an I/O port of the CPU 67 for processing. The data processed by the CPU is fed through the drivers and the optical transceiver 61 of the cascade 58-in optoport for propagation, for example, to the distributor driver 12, upon receiving request for status or upon a detected current drain change at random by any of the current sensors 79.

The cascaded in-out optoports 58 are operated and controlled by the CPU 67 such that the first transceiver 61 receiving an optical command or other optical data or status through its lightguide 9 (in or out) will mute its transmitter or LED, while the other transceiver of the optoport 58 will mute its receiver or photo transistor and re-transmit the received command, data or status through the other cascading lightguide 9.

The n number of optoports 56, each positioned within the front surface of the power socket 57, communicate optical signals including control and command to the appliance and status reporting from the appliance, with the CPU 67 controlling the traffic between each of the optoports 58 in-out and the optoports 56 directly in both directions. Further, as explained in connection with the switch 4, a received switch-on command from the optoport 58-in will be processed by the CPU 67 of the switch 4 to operate the switch 4 itself and simultaneously propagate the command via the cascade out optoport 58 to the LED bulb for controlling the lighting program.

From the above explanation it is clear that the commands and statuses can be propagated two way from the cascading optoports 58 in-out to the optoports 56 connecting the appliance, and between the optoports 58 to other switches and power outlets and that the current drain can be measured and reported to the distributor 12 for each of the AC sockets 57. It is also clear that commands fed to a switch 4 having similar circuit to the circuit shown in FIG. 7A will operate the switch and will propagate the commands via the cascading lightguide 58 out to a light bulb or a switch 4, or to an AC outlet 50.

The circuit shown in FIG. 7A can be equated to an optical matrix selector for propagating optical signals through the CPU from any to any of the transceivers 61 as programmed, execute a processed command, process and propagate current statuses detected by the current sensors 79n to the distributor 12 and operate all above simultaneously or in a sequenced order.

The last issue is the addressing of the transceivers optoports and identifying to which appliance they are connected to.

The shown pair of two switches 53 and 54 of the n pairs of the rotary digital switches are provided for each AC socket 57, with the switch 53 is for setting the room or zone address from one to eight and a blank representing common area of the premises. The switch 54 provides for setting the appliance such as L is for light; A is for air condition; C is for curtains; T is for television; M is for music; R is for radio; D is for DVD; X is for auxiliary and the zero or blank is for a single appliance not limited to a room or zone of the premises, such as water boiler.

The switches 53 and 54 are not included in the current sensor 60 and the plug 160, because the addresses and appliances particulars are installed to it by downloading the data via the optoport 56 of the transceiver 61 as shown in FIGS. 3C and 3D. The power outlet 50S is shown to be downloaded with addresses and/or appliance particulars into each of the AC sockets 57 via the optoport 56 shown in FIG. 8C, wherein each socket 57 is downloaded with individual address and with the particulars of the appliance to be connected to the given socket 57.

Further, the installing of the appliance particulars is possible through self updating program by an appliance that is programmed to download its particulars when the CPU 67 generated a particulars request in response to a detected current drain from an AC socket 57 that is not recorded with the appliance particulars, and is not provided with the switch 54.

The multiple address switches 53 one for each of the sockets 57, may not be necessary and only one switch or a single download of the room or zone address should be sufficient to record the location of the AC outlet 50 and 50S, however, this limits the appliances plugged into the socket 57 of the outlet 50 or 50S to operate only in the same room or zone. Otherwise the using of long power AC cable and placing the appliance itself in another room or zone may cause confusion and operating errors. The downloading of addresses and appliance particulars and/or the setting of the switches 53 and 54 provide the needed addressing for exchanging commands and statuses between the different optoports for a flawless communication and data propagation within the matrix structured power outlet 50.

The circuit 62C shown in FIG. 4C may include only the transceiver 61 with its RX and TX circuits for propagating the optical signals two way via the optoport 56 and the optoport 10A of the power socket 10S shown in FIG. 2B, but only if the appliance includes a CPU for its operation and is programmed to communicate with the TX and RX circuits of the transceiver 61. If the appliance is not programmed and does not include CPU (central processing unit) or DSP (digital signal processor) or other control devices and memories for its own operation, the circuit 62C may include the CPU 67, the memories 68 and 69, the current sensor 79 and possibly the power supply 78, for operating the same way the current sensor 60 or 160 explained above are operating.

Figure 4D:
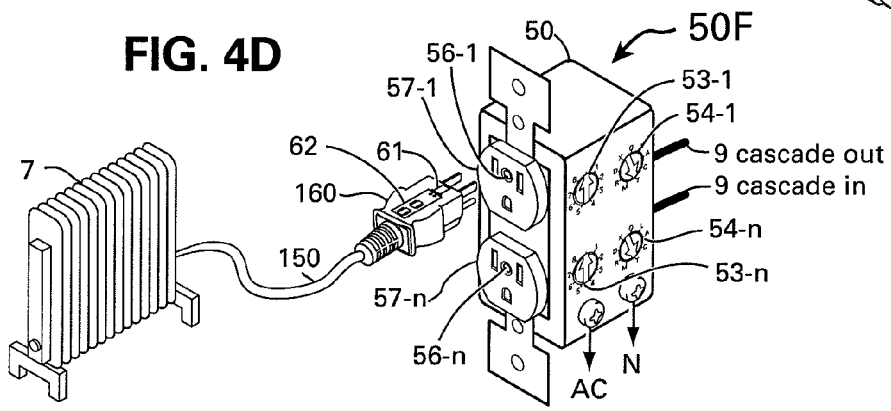
FIG. 4D is a perspective view of the connection between a space heater and an AC outlet including optoport via a plug of a power cable assembly including current sensor and a transceiver with optoport of the present invention.

The power outlet 50 in FIGS. 2B and 4D show one structure, wherein the rotary switches 53 and 54 are mounted on the side of the outlet, not accessible, when the outlet is mounted inside the wall box and not in its front, where the switches are accessible. Further, the optoport 56 which is the optical accesses of the transceiver 61 is positioned and adjusted to be in line with the front surface of the sockets 57 which complicates the power outlet structure.

Figure 8A:
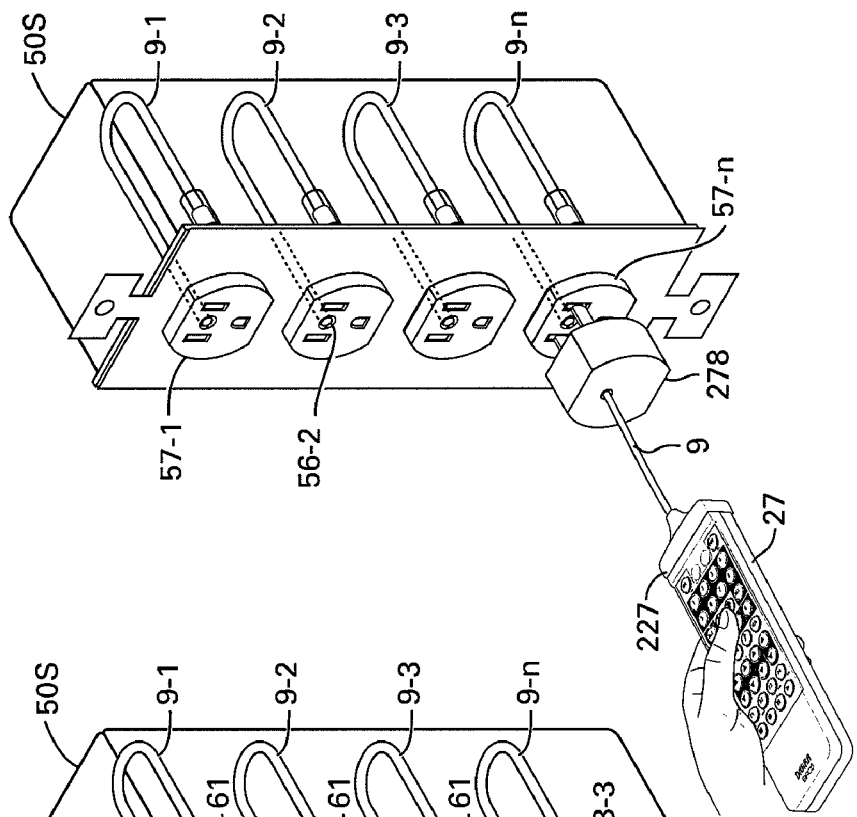
FIGS. 8A and 8B are front and perspective views of another structure for the AC power outlet shown in FIG. 2B.
Figure 8B:
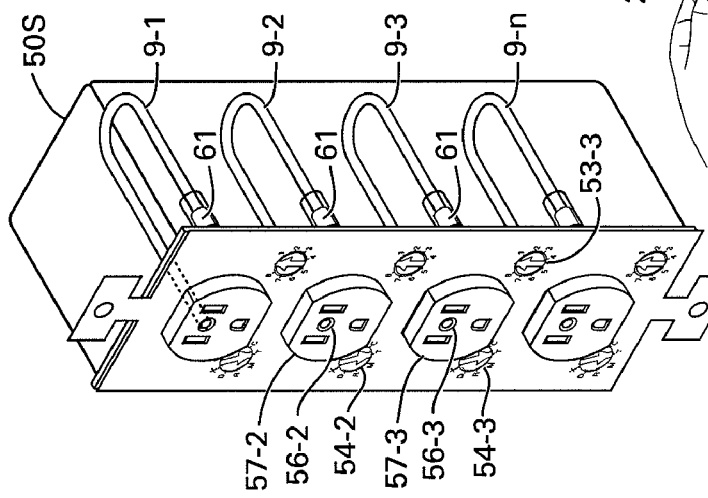
Figure 8C:
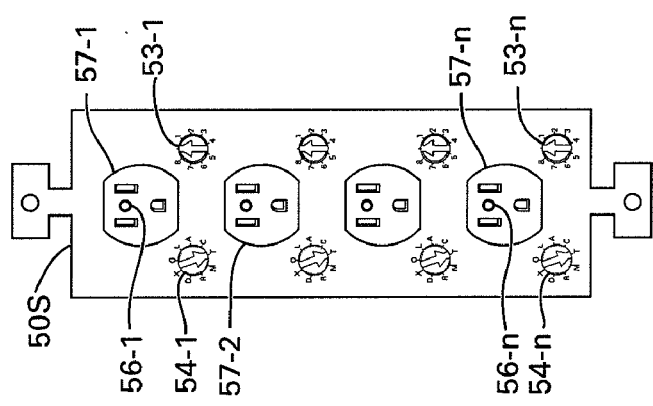
FIG. 8C illustrates the installing of addresses and other particulars through the power sockets of the power outlets of FIG. 8B.

Another power outlet structure is shown in FIGS. 8A and 8B wherein the rotary switches 53 and 54 are positioned in the front of the power outlet 50S and the transceivers 61 are away from the front surface. FIG. 8B illustrates a front mounted PCB assembly with the accesses 56 being terminated ends of short cuts or jumpers lightguides 9J, linking the optoports 56 with the optical accesses of the transceivers 61 mounted on the rear of a PCB. The optoport 56 of the power outlet 50S are therefore the same cut ends of the lightguides 9, exactly as provided in the power outlets 5 with the power sockets 51 and optoports 52, shown in FIGS. 2B and 3A. Otherwise the above explanation of the circuit combinations of FIG. 7A cover the power outlets 50 and 50S.

FIG. 7B is a combined block diagram employed for the bus line to lightguide converters 14 and 15 shown in FIG. 1 and for the lightguide converters and/or status receiver and driver 75 and 76 shown in FIGS. 5A and 5B and the address and program loader 400 of FIG. 6C.

The bus line 11 of FIG. 7B connects the CPU, or the DSP or other processing circuit IC 67 with the distributor driver 12 of FIG. 1 to exchange electrical signals and feed low voltage power to the lightguide converters 14, 15, 75 and 76 including the status receiver and driver. The fed power is separated from the bus line signal by filters and the separated power is applied to the power supply regulator 82 for powering the CPU circuits, the drivers and the transceivers 61 with a regulated VCC. The electrical signals are fed via I/O ports of the CPU 67 for communicating the two way commands, control and statuses with the distributor driver 12. The feed of power via the bus line including the power and signals separation via filters are disclosed in the referenced patents and patent applications.

The converters 14 and 15, and the converters with status receiver and driver 75 and 76 include n number of transceivers 61 with each of the transceiver optical access 56 is provided with locking and attaching lightguide or fiber optic cable 9 facilities. Since all the transceivers 61 can communicate and drive two way optical signals and propagate command and receive statuses and/or download programs or upgrade the converter program, n number of transceiver shown in FIG. 7B can be used as a driver for lighting switches, relays and other electrical devices of the electrical grid, while n number of transceiver 61 with accesses 73 termed status receivers shown in FIGS. 5A and 5B can be provided for linking the status receiver to appliances directly and/or via the current sensors 70 or 80 shown in FIG. 5A.

The need to identify each appliance that connects to access 73 remains and each such access must be either downloaded with addresses and particulars such as shown in FIG. 5C by the remote control 27 and the adaptor 227, or by a pair of digital switches 53 and 54 discussed above included for each transceiver 61 and shown connected to I/O ports of the CPU 67 of FIG. 7B.

For the converters such as 14, or 75 that are installing the address and the appliance particulars by download via the optoport 56, the switches 53 and 54 are not needed and are not used. Similarly no AC power is applied to all the explained above converters and the AC power shown fed to the power supply 78 of FIG. 7B is only for powering the loader 400 shown in FIG. 6C, but not to the converter 14, 15 and/or to the status receivers 75 and 76 of FIGS. 5A and 5B. Similarly the keypad 419, the display 413, the printer 410 and the adaptor 401, 403, 404 and 405 are used for the loader 400 only.

The loader does not require and does not use the switches 53 and 54, nor the cascading transceivers with optoports 58 in-out. Similarly, the loader is a stand alone equipment and it does not require to connect to the bus line 11 and the bus line input including the filters used for separating the signal and the power feed are not included in the loader 400 circuit, however the loader can be connected to a bus line, but does not require the power feed.

Otherwise the loader via its CPU 67 and memories 68 and 69 is programmed and stores at least one download program for propagating via the optoport 56 and the lightguides 9 the addresses, the illumination programs, the dimming, and other programs to the LEDs and other illuminators via the shown adaptors 401, 402, 403, 404 and 405, or any other adaptors to fit light bulbs and other illuminators.

The programs of the loader 400 include the operating of the label printer 410 for printing labels, for identifying the bulbs with their addresses and the loaded programs. The display 413 is used for program selection and for verifying the downloading process and other operational details, including warning and completion displays.

From all the above explanations it should be clear that the circuits shown in FIGS. 7A and 7B cover all the devices used in the present invention to address, identify and report statuses particularly, the current statuses drained via power outlets throughout the premises or the residence, enabling the control and operation of A/V and other appliances and devices without errors. To correctly command and receive statuses from a device or appliance there is an absolute need to identify first where the appliance is within the premises or the residence.

Figure 9:
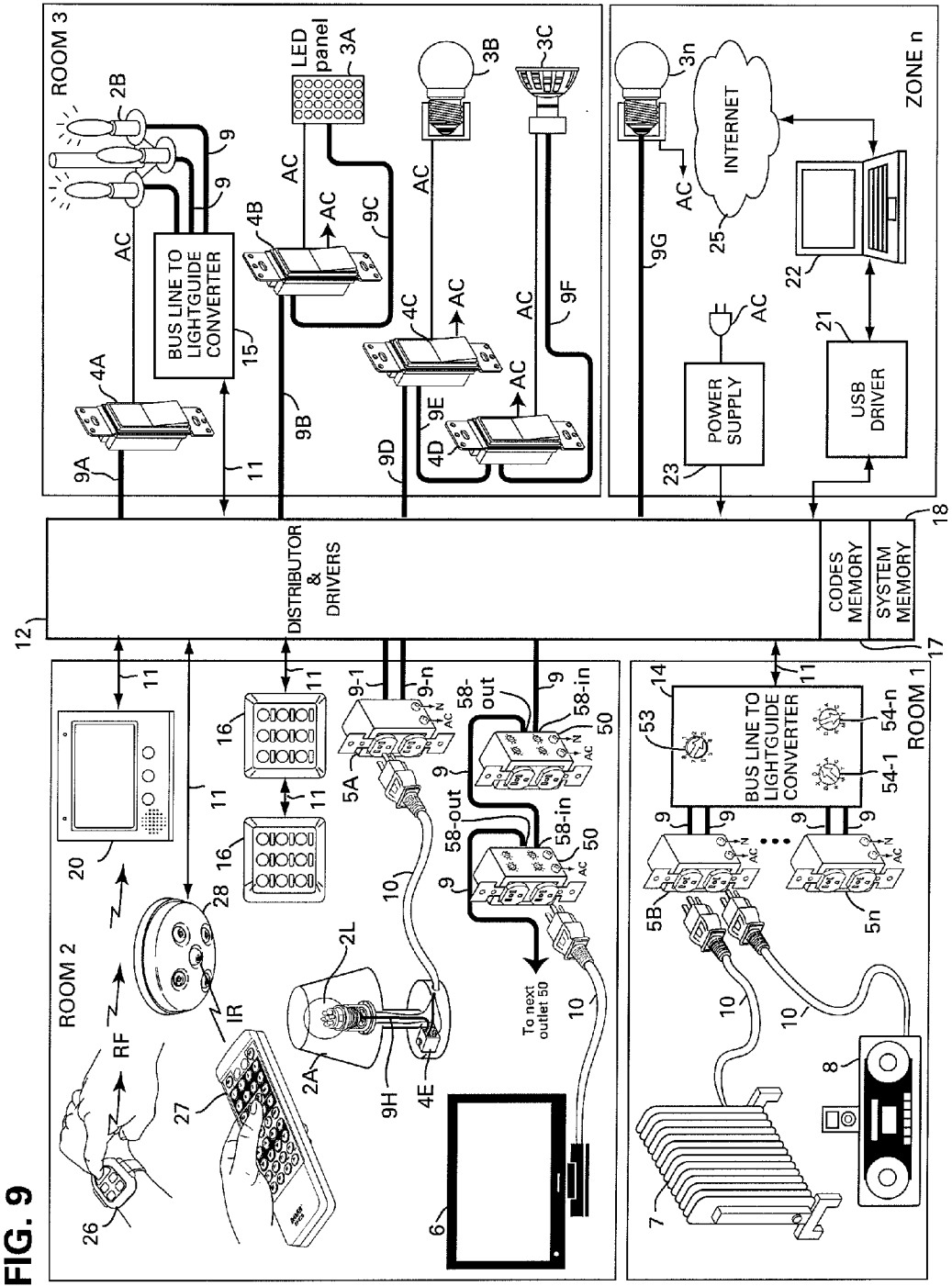
FIG. 9 shows a modified version of FIG. 1 divided into room or zones of a premise or residence of the preferred embodiment of the present invention.

FIG. 9 is a parceled automation system shown in FIG. 1, wherein the basis for addressing the electrical devices, the electrical operating products, the AC and A/V appliances, the lights and others are based on room or zone assignment. The assignment can be arbitrary, but it is preferred to address rooms such as kitchen, corridor, entrance, living, bedroom, bathroom etc, particularly in residence applications. The shown system of FIG. 9 is an arbitrary parceled system into four non identified rooms. Otherwise the rooms are numbered 1 to n and accordingly the appliances inside the rooms will be addressed.

As explained above the electrical systems in residences and other premises are bound by building and electrical codes that are well trenched and are difficult to change. Electricians are well trained to install the systems in compliance with the codes, rules and the very long tradition. They are not experts in handling IP or IT technologies, coding, setting and similar. IP and IT experts are not permitted to install electricals in buildings and even if they were, such experts are simply not available to install the many apartments. To move ahead with the automation of homes, residences, other premises, businesses and public buildings mandates the simplifying of appliances addressing and coding, such that the appliances can be addressed and coded by the users themselves.

The reasons are many for such conclusion and to start with, the electrician installing the electricals cannot possibly know what appliance will be connected to a given outlet, or to most of the outlets. The electricians may be tasked to provide outlets for washer and dryer, and/or for dishwasher and oven, or provide loose wires outlet in a wall box for HVAC (air conditioner) or heater and/or water boiler that are fixedly attached to the power grid, but commonly this will be the limit for the electrician tasks and specifications.

The electrical system drawings and specification for the residences include n number of power outlets, n number of light switches but no light fixtures, outside the commonly installed few light fixtures, such as bathroom, entrance and balcony. For all other lights the electricians provide loose wires for connecting the light fixtures that will be purchased at the will of the residence's buyer, and well after the electricians have completed their work.

The needed basic data, as explained above, comprise of the room or zone where the appliance is, the type of the appliance, the operating program in process, the current drain and/or the on-off status. Such data will cover the basics needed for maintaining error free operated automation system for the electrical and the A/V appliances and will provide the basic means to generate reliable and accurate consumption data, and for outputting the data via the internal communication lines of the video interphone or the shopping terminal system and/or via a dedicated controller, disclosed in the referenced patents and applications, to a server or other interface unit for a real time reporting of power consumption of a whole condominium or apartment building, or the power consumption of an individual house, or the power consumption of any other facility or premises discussed above via the Internet to the electric power company.

The data is also fundamental for the remote controlling of the appliances and should be appended to the program of the remote controlled appliance be it IR, RF, bus line or visual optical signals via an optoport. This will enable a simple integration and operation of all the electrical devices via the automation system of the present invention without custom integration, reducing substantially the cost the automation system.

Further, optical signals such as IR, UV and/or visual light operate at a low speed rate. The time units of the serial command pulses propagated by the IR remote control signal (in air) including the pulse train of the visual light through the lightguide is mSec. units, and therefore the basic optical commands structure or protocol must be as short as possible. Long optical command may well stretch to a whole second or more and such delays cannot meet the user expectation (or patience). Delays of 300 mSec.~500 mSec. (0.3 Sec.~0.5 Sec.) are the acceptable delays, which are the delays similar to the current IR remote control signals propagated for most A/V appliances.

There are differences between the optical IR in air and the visual light signals via lightguide, wherein the IR remote control signal is a modulated carrier of a 30 KHz to 100 KHz clock, with most appliances operate on 38 KHz carrier frequency. The visual light transceiver can be operated and respond to via the modulated IR signal or to a modulated visual signals, but the lightguide enables the simplifying of the light signaling by a simple on-off (timed) light pulses, with no carrier. Regardless of the different signals structure, speed of transmission and other differences, the present invention provides the simplified needed addressing and coding to process and propagate the control signals and operate the appliances be it via IR, RF, bus line signals and visual light signals via the lightguides.

The preferred embodiment of the present invention further simplifies the codes by limiting the operating and reporting codes to the minimum bit count. Moreover, by realizing that large and complex keypads or IR remote control units with too many keys and/or requiring multi keying for a single operation are not helpful and are not appreciated by the users. The number of keys of the keypads and the simplicity of their function, similar to the keys of the IR remote control unit should be minimized and simplified. The simplest way to reduce keying is by limiting the automation to a single digit numbers for literally covering almost all of the residential systems. The use of multi digits, such as two digits for zones and appliances for larger premises should be compatible with the programs for a single digit keying. Because residence automation can be summed up to cover listed appliances in a clear confinement of a summed up premises, the limiting of the commands to a given pre-defined protocols is the answer.

Shown in FIG. 10A is the conceptual 5 Bytes 301~305 of the command/reply structure 300 or protocol of the preferred embodiment of the present invention. As explained above, even though the shown structure is based on limiting the room or zones to eight plus common zone, with three electrical appliances—lights, HVAC (Heating, Ventilation, Air Condition) and curtain, and five A/V appliances—TV, DVD, music, radio and iPod, one of which can be replaced by an Auxiliary appliance, the extended programs listed in FIGS. 13A, 13B, 14A and 14B of the preferred embodiment provide for up to eight lights and four+four optional curtains per each of the rooms and the common zone.

The preferred embodiment program provides for the optional curtains to be configured as eight individual curtains, each for a single window, or as second curtain for covering four windows with dual curtains and/or a mix of a single curtain, for example, four windows with single curtains each and dual curtains for two windows with dual curtains combination. This programmed extension covers literally almost all sizes and structures of houses, apartments or condominiums, including offices, hotel rooms and suits, restaurants, small businesses and workshops.

Regardless, the I-D codes shown in FIGS. 11B~14B can be expanded for example to cover 32 rooms or zones with 16 lights and 8 curtains per each room, along with an expanded number of appliances and outlets of the present invention by increasing the code bit count by two, for example from 8 bit to 10 bit codes, or by increasing the whole command and reply structure 300 to 6 or 7 Bytes.

It is also possible and simple to split larger apartments into two or three individual automation systems of the present invention, and integrate the individual systems into one, for which standard integration programs are provided through the distributor driver 12, the video interphone, the shopping terminal or the dedicated controller disclosed in the referenced patents and applications.

The advantages of the short command structure, based on limited number of rooms or zones and the limited types of electrical and A/V appliances, coupled with the practical need to control only one appliance type per room or zone, excluding lights and windows covering, emphases the need for a simplified solution for controlling the electrical consumption and the operation of the appliances of the present invention. The simpler task is also achieved by the simplification and standardization of a limited code structures, within the 8 bit or the single byte limitation of the preferred embodiment.

A key importance in operating the system is the ability to link any appliance or a given electrical switch or electrical outlet of the automation system with a control device, such as hand held remote control unit 27 or a wall mounted keypad 11 shown in FIG. 1, anywhere within a residence or a unit of a building. The identifying the location of the control generating device such as the IR remote control unit 27 propagating its IR signals via the IR repeater 28, shown in FIG. 1 and disclosed in the referenced patents and applications, and the location of the keypad 11 is a fundamental to the creation of data pertaining to the meaning of the local zone or local room.

To improve and simplify the controls via the keypads and particularly via the IR remote control units 27, the number of key strokes and the issue of how many keys need to be operated for a single command is fundamental. The users and the public at large expect to control the television in front of them without selecting a room number first. For the smooth and simple operation in the local room, it is necessary to create a location data such as room number or codes, or alphanumeric data, covering the appliances and the control devices.

It is similarly important to identify the location of any appliance for operating and/or receiving statuses from the appliance via a touch screen, such as the touch screen of the video interphone or the shopping terminal and/or via the Internet to other control devices. The simplified controlling ability will become clearer from the explanation in the following pages, including the innovative use of the link code. Termed link code hereafter, the link code is a pre-defined code, linking the control devices with the defined rooms or zones shown in FIG. 9 above.

Further, the link code of the preferred embodiment is propagated two ways, applying identical link code to the reply response, ensuring an accurate, error free response to a given command, such as a return status or confirmation using the same link code that is explained below. Furthermore, the command generating device such as wall mounted keypad 16 or a bus line switch and its location must be identified, including the linking of the IR remote control unit 27 and the room from which the IR command was sent. All the commands generated by the control and command devices and equipment must be coded and form the link code shown in FIG. 10B.

FIG. 10B shows the single Byte (8 bits) link codes 304 of the preferred embodiment, combining the command initiating device and the room/zone 1~8, the common zone and the local room or zone, into a fixed link code for each of the two way propagations. The preferred embodiment of the present invention uses no destination address, such as addressing each appliance with an IP address. The transmitting and the receiving devices are not programmed to exchange addresses for verification, such as mandated for IP network. The generated code is a onetime command to operate a device, in which the IR signals, the visual light signals, the electrical signals via the bus line and the RF wireless signals (with a residence code) are transmitted to all the nodes of the system and only the coded device or appliance in the linked room or zone will respond, using the same link code to confirm the execution of the command.

If two or more identical coded devices or appliances are installed or operated in the same room or zone, the two or all will respond, and confirm their status in a programmed order of sequence. An exchanged command includes a transmitted change in current drain, detected by an appliance or the current sensors, to a controller and the controller uses the same link code in its response/command or reply to acknowledge the change in the current drain or in the status.

The header 301 of the preferred embodiment provide for detecting the start of the command 300 and the identification of the propagated RS422 or RS485 signals via the bus line, the IR signals in air, the visual light signals via the lightguides and the RF signals, with all, or any combinations of, can be transmitted simultaneously. The RF signal need to address the apartment or the premises number, this is to block stray RF commands from reaching and operating automation devices of neighboring apartments or houses by error and to prevent the receiving and acting upon stray RF signal propagated in other apartments or units. The wired bus line, the IR (in line of sight) and the visual light signals via the lightguides propagations are confined to the apartment or the house and cannot be extended beyond the premises of the individual enclosed automation system.

The header 301 of the preferred embodiment shown in FIG. 10A generates a single 3 mSec. long visual light pulse (via the lightguide), or three sequential IR pulses, each with 3.0 mSec. time duration and with 1.0 mSec. interval, or five negative going RS485 pulses, each having a length equivalent to one byte time duration, using 9,600 Baud or other rate. The modulated RF signal using ASK or other modulation is provided with a start pulse and a three digit code (one byte) assigned to each apartment, a house, a hotel room, an office, a shop or simply a unit of a building.

Shown in FIG. 11 are the header signals of the preferred embodiment, three of which, the IR, the visual light and the bus line wired electrical contain no code, only repeated pulses or a single pulse for enabling varying time delays for the receiving of the command, for providing a precise start time at the end of the header to process the sub-header code followed by the link code, the I-D-CODE commands or repsonse and closing the command with the checksum trailer 305.

FIG. 11A lists the basic operational/reply codes, hereafter termed I-D CODES which combines the operation of the light #1, the HVAC and of the curtain or blind #1, for each room or zone of a residence, a house or a unit of a building, fora range of operational functions including their status reply or confirmation from each linked appliance (light, HAVC and curtain) in any of the room or zone (or all) exchanged with the control units or devices. Each eight bit ID code of the preferred embodiment therefore combines the principal operating commands including on-off, status request and report (via same ID code and same link code).

The basic ID code for operating electrical appliances covers light dimming and selected light programs, such as color selection. For the HVAC it covers on-off commands, status request, the setting of the air condition temperature and/or the ventilation equipment by controlling the fan speed. The ID code similarly provide for closing and opening a curtain, a blind or a shutter and adjusting their slats pitch and/or the slats tilt or rotation, all of which are needed for the operation of lights, air condition and curtains in every or any or all of the rooms or zones of a given residence or a unit of a building.

The listed I-D codes of FIG. 12 for the extending of light #1, the HVAC and curtain #1 functions include four presets, options and extended programs to select from, are the same codes shown in FIG. 11B. The differences are in the listed functions, or the nature of the operational command. The first two sub header codes of the nature of command table in FIG. 27A of the sub header 302 list refers.

The command or the protocol 300 comprising the combinations of the nature of command byte 302, the link code byte 303 and the ID code byte 304 support the needs of an entire residence unit or other units of a building or a house, including remote operation, confirmation and acknowledgement of status and report, to the video interphone, the shopping terminal or the dedicated controller. This include the current drain of each individual appliance or other power consuming products and devices, fully complying with the needs and rules for energy reporting or saving, including the real time reporting of the power consumption to the local or national power grid.

To further illustrate the literal limitless capabilities, many of which will most probablynot be used, FIGS. 13A and 13B list together the extended light control functions to eight lights per room or zone for the remaining room #2~8 and the common zone location or area shown as #0. Since 128 ID codes are needed to cover a single room with the extended functions for the 8 lights, each room or zone are assigned with a specific sub header code 302 shown in FIG. 13B.

The exact same applies to the extended functions of up to eight curtains in each room or zone shown in FIG. 14A. The listed ID codes 304 are identical with the ID codes 304 shown in FIG. 13A, the only differences between the two are found in the sub header codes 302 which are listed for the extended curtain functions in FIG. 14B.

The same is repeated again in FIGS. 15, 16, 17 and 18. The ID codes 304 for the basic and the extended functions of all the A/V (Audio/Video) devices listed are all identical with the listed ID codes in FIGS. 11B and 12 for the basic light, HAVC and curtain's functions. The differences are listed in the sub header codes 302 of FIG. 27A. The maintaining of identical ID codes for the preferred embodiment limitation of eight appliances type with optional Auxiliary appliance is for simplifying and standardizing the codes to the maximum extent possible. However, different ID codes can be introduced to each or any of the tables, shown in FIGS. 11B to 18 and as stated above, 10 bits instead of the 8 bits can be used to expand the codes, enabling to increase the ID code number to 1024 and provide for additional functions, rooms and appliances, or for differentiating between the ID codes assigned to different appliances and their functions.

FIG. 19 lists the ID codes 304 for operating and receiving statuses from appliances located within the common zone which include up to eight lights, growth lights used in garden and in shaded gardens or balcony. It also cover water equipment such boiler, water purifier, irrigation valves, garden heaters, lawnmower and up to eight garden shades. The other appliances assigned to the common zone are environmental appliances such as air purifier, humidifier and others. Here too the list can be modified and/or amended to cover other appliances and other functions. The shown table of FIG. 19 is to illustrate the extent the preferred embodiment provides for a cover to any and all appliances and functions that can practically be conceived to be installed or used in homes, apartment or any other unit of a building.

FIGS. 20A to 20E lists ID codes for the basic on-off and status request, acknowledgment or report functions, for a whole range of kitchen, laundry and bathroom appliances for the #1~8 rooms of the premises. The listed appliances in FIGS. 20A~20E are the basic commonly used appliances including a refrigerator, a freezer, a cooking/baking range, an oven, a dish washer, a garbage disposer, a microwave oven, a warming tray or drawer and a cooktop plate. The laundry includes a washer, a dryer, an iron and other unnamed optional appliance and the bathroom includes bath heater, towel dryer, Jacuzzi, hair dryer and other optional unnamed appliance.

According to the preferred embodiment the kitchen, the bathroom or a plurality of bathrooms and the laundry are assigned to one or a plurality of the rooms 1~8, wherein the single kitchen can be assigned to a room number by itself, or include the laundry. A bathroom can be assigned to a room number by itself or combined with the laundry to an assigned room number, the laundry can also be assigned to a room number by itself.

As explained above, the partitions of the rooms or zones need not be physical, the room and zones numbers 1~8 and common can be arbitrarily assigned to a room or a zone. This arbitrary assignment can combine bedroom with a bathroom that are linked as one with the appliances jointly operated by sharing the eight lights, eight curtains and the HAVC of the combined, for example, the master bed room.

Even though up to seven bathrooms plus kitchen can be assigned, the preferred embodiment limits the bathrooms to three plus one kitchen and one laundry room. The laundry room can be combined with the kitchen or with any of the bathrooms. A guest toilet is not considered as a bathroom by the preferred embodiment, even though it could as stated above. A guest toilet room need not be part of a bathroom, it does not need to be assigned at all and use the lights and the fan of the common zone or of any assigned rooms including its curtains and HAVC.

To operate and request a status of a kitchen, a bathroom or a laundry appliance the sub header codes recalled by the preferred embodiment program are shown in the table of FIGS. 20F and 26A only for the selected one or more rooms as selected via the select table of FIG. 20F.

The preferred embodiment program limits the remote control to the kitchen, laundry and bathroom to wall mounted keypads 16 and/or to the touch screen of the controller 20, and to the automation programs via select menus, such as on-off switching via relays or semiconductor switches, but not via hand held remote control units, such as the remote control unit 27 shown in FIG. 1.

Reviewing the kitchen, laundry and bathroom appliances, none of the listed appliance, not the towel dryer of the bathroom or the warmer or the warming drawer of the kitchen list, will operate beyond the time set by a timer included in the appliance itself. Appliances, such as refrigerator or freezer are rarely or sort of never switched off. All other cooking and baking, washing, drying, heating and hand held or table top appliances are operated by the users manually and therefore, outside the remotely operated relays as programmed, and/or via wall mounted keypads, the kitchen, laundry and bathroom appliances commands are limited to the on-off and status reporting.

Same applies to the different portable or other appliances that are connected at random to the power outlets 5 or 50, some common appliances are listed, in FIGS. 21A~21C, all of which will only provide status and/or identify the type of appliance directly via their power cable assembly 10 and 10Y, their power plug assembly 160 and 166, via the current sensors 60, 66, 73 and 80, via the power outlets 50 or the power outlets 5 in combination with the bus line to lightguide converters explained above, or from the appliances themselves, installed or set with the location data such as room or zone number and provide the appliance type or particulars of the present invention via the power cable assemblies 10 or 10Y through the lightguide 9 included in the power cable.

FIGS. 21A~21C lists three groups of appliances powered via the power outlets 1-64 in the entire premises, in any of the rooms or zones #1~8 and the common zone #0. The power outlets can be assigned an outlet number per each room or zone or they can be numbered for all the residence. The arbitrary numbering of the power outlets is for providing references to the automation programs only, because the power statuses of the different appliances within the rooms or zones need to be listed for control and scanning purposes. Power outlets themselves are never switched on-off, nor are they operated. The need for using the power outlets according to present invention is for the controlling of the current drain and statuses of the appliances fed through the outlets.

The appliances that are connected via the cable assemblies 10 or 10Y and communicate controls and/or their statuses via the power outlets 5 communicate directly to the distributor 12, or via the converters 14 or 15. An appliance communicating via the power outlet 50, use the outlet as a relay station with their data repeated by the outlet 50. The power outlet 50 will take over and communicate the off status of a switched off appliance. It is also expected that the communication with the power outlets may involve current drain by unknown appliances and that the program controlling the outlets must be designed for different scenarios and many unknown or unclear statuses, but the current drain via the power outlets will be accurately measured, within the tolerances of the current drain measurement in Ampere or Consumption in Watt units.

The statuses and current drain or power consumption values shown in FIGS. 21A~21C are communicated to the controller, such as the video interphone 20 via the distributor driver 12 using the same link code, with the ID codes representing the unit values as listed in the examples shown in tables of FIGS. 21A~21C. Here too the change in the sub header codes shown in FIGS. 27A and 27B transforms the communication to the reporting of statuses and current drain exchanges via the power outlet 50 direct, or via the different current sensors explained above and/or via the power outlet 5 powering appliances fitted with the circuits to respond to status request and/or acknowledge the communications via the lightguides.

FIGS. 22~24 lists the ID codes for a variety of alarm devices and their functions. The alarm devices current drain is insignificant and they are included here to show the limitless capabilities of the preferred embodiment of the present invention. The motion detector alarm sensor can be incorporated in the program to switch off the lights when no movement is detected for a period of time, or automatically switch on the light when movement is detected. Similarly the door alarm sensor can switch-on the lights when the door is opened. The alarm sensors are not shown in FIG. 1 or 9, but are disclosed in the referenced patents and applications. The alarm devices can be downloaded with room and zone numbers or codes and include the particulars of the alarm device providing the alarm devices and system to be commanded, respond and acknowledge two ways, the same as the appliances discussed above are operated.

FIG. 25 lists a range of commands for operating the video interphone via the automation circuit using the ID codes of FIG. 25. The audio and the video signals will be routed via the music system disclosed in the patent application Ser. No. 12/484,321 and via the television in a local room or zone from where the command is propagated, i.e., the local room command, using the local room link via the IR remote control 27 that includes keys such as recall door camera into PIP (Picture In Picture) onto the local room television, open voice, open door and emergency call.

The table help medical/emergency of FIG. 25 includes the extension commands when the emergency key is activated, to enable bed ridden and the elderly to operate bed observing camera, activate blood pressure and heart beat testers, measure temperature and transmit commands for communicating the signals, all of which are connected to and routed via the video interphone 20 or the shopping terminal or the dedicated controller through interfaces and via the Internet or through a local network.

The commands shown are an example for the many different application, services including e-services and e-commerce applications that can be implemented and clearly represent the simplicity of the coding via the sub header codes, the link codes and the ID codes. All of which provide a simple integration method to a whole range of electrical, audio video and communication apparatuses, while performing the important task of controlling and reporting the power consumption and conveniently operating the residence automation.

FIG. 26 shows the download and updates to and from the appliances, listing the basic appliances of the preferred embodiment. The list can be expanded to any number and types of appliances and/or to cover downloads and upgrades between electrical devices and the distributor driver 12 and/or with the video interphone 20.

The preferred embodiment provides for the ID code to be extended to a long string of n bytes for the downloading or upgrading programs, and for communicating the downloads via the bus line, two way or bidirectional IR signals as disclosed in the referenced patents and applications via the IR driver 28 and via visual light signals via the lightguide directly or via the converters 14 or 15.

Important to the downloading and upgrading is the direct feed to and from what are known as intelligent appliances such as televisions, Audio Visual recorders and playback units, game consoles and similar appliances, including intelligent electrical appliances.

The known intelligent appliances are operated via CPU or DSP and other embedded or full scale processors, with most can be remotely operated via IR or RF signals. For each of such remote control signals that include particulars of the appliance, the simplest way will be to provide for appended room or zone link, including the local link into the remote control protocols.

The local link of the preferred embodiment uses the numeric 9, shown in table 10B as 0x07, which is the default link number for the appliance protocol and the IR remote control unit. Once the room link, selected from 1~8 or 0 and the default local link 9 are recorded into a bidirectional transmit and receive IR or RF remote control protocols, for example, as an appended protocol, the appliance can be integrated into the residence automation, by simply activating the appended program and by selecting the room link number.

The addition of a transceiver circuit for communicating the bidirectional commands, acknowledge and status via the lightguide direct to a transceiver of a lightguide converter 14 or 15, or as shown in FIGS. 4A-4C included in the power cable 10 or 10Y will substantially improve the remote control communication via the enclosed residence automation network, including the power consumption report via the video interphone and/or via the shopping terminal, wherein the shopping terminal by itself can well be the large screen television in the living room.

It should be understood, of course, that the foregoing disclosure relates to only a preferred embodiment of the invention and that it is intended to cover all changes and modifications of the example of the invention herein chosen for the purpose of the disclosure, which modifications do not constitute departures from the spirit and scope of the invention.

What is claimed is:

1. A method to integrate an electrical operated appliance into an automation network of premises by introducing an identifying data of at least one of a location and a type of said electrical operated appliance via one of loading said identified data into a memory associated with said electrical operated appliance for storing setting data and appending original commands protocol of a remote control of said electrical operated appliance;

said location is arbitrary set and said electrical operated appliance is operated by at least one of receiving operate command and responding by transmitting status command via at least one of a remote control circuit included in said apparatus and a relay circuit, said remote control circuit include a digital signal processor, at least one of a receiver and a transmitter for at least one of receive and transmit signal of said remote control and at least one of a setting switch and said memory, said method comprising the steps of:

a. assigning arbitrarily said location to said premises;
b. introducing said data via said at least one of a setting switch and loading said data into said memory for at least one of said storing and appending;
c. updating commands of said automation network with particulars selected from a group comprising said location, said type, a portion of original commands, a whole of said original commands, a portion of the appended commands, the whole of said appended commands and combinations thereof; and
d. propagating a signal between said automation network and said electrical operated appliance for at least one of operating said electrical operated appliance and acknowledging status of at least one of said electrical operated appliance and said relay circuit.

2. The method to integrate an electrical operated appliance into an automation network according to claim 1, wherein said signal is selected from a group comprising a visual light signal, an IR signal, a UV signal, an RF signal, a low voltage electrical signal and combinations thereof.

3. The method to integrate an electrical operated appliance into an automation network according to claim 1, wherein said signal is at least one of an IR signal and a visual light signal and said at least one of a receiver and a transmitter include an optical access for receiving said commands via one of a lightguide and in air in line of sight.

4. The method to integrate an electrical operated appliance into an automation network according to claim 1, wherein said signal is at least one of an IR signal and a visual light signal and said receiver and said transmitter are packaged into a transceiver with a single optical access for bidirectionally propagating said commands via a single lightguide.

5. The method to integrate an electrical operated appliance into an automation network according to claim 1, wherein a local location is included in the appended protocols in addition to said arbitrarily assigned location for operating said electrical operated appliance from within an appliance location.

6. The method to integrate an electrical operated appliance into an automation network according to claim 5, wherein said electrical operated appliance is programmed to respond to commands selected from a group comprising original commands, appended commands when a data match, said appended commands when said data is local, said network commands when said data match, said network commands when said data is local and combinations thereof.

7. The method to integrate an electrical operated appliance into an automation network according to claim 1, wherein one of a wireless remote control unit of said electrical operated appliance and said automation network is used for loading at least one of said data and command particulars into said memory of at least one of said electrical operated appliance and said relay circuit, wherein said command particulars pertain to at least one of said operating and acknowledging of said electrical operated appliance via one of direct and said relay circuit.

8. The method to integrate an electrical operated appliance into an automation network according to claim 1, wherein said relay circuit is selected from a group comprising a converter circuit for converting electrical signal to light signal, light signal to electrical signal, electrical signal to IR signal, IR signal to electrical signal, electrical signal to RF signal, RF signal to electrical signal, light signal to IR signal, IR signal to Light signal, light signal to RF signal, RF signal to light signal, IR signal to RF signal, RF signal to IR signal, electrical signal to buffered electrical signal, IR signal to buffered IR signal, RF signal to buffered RF signal, light signal to buffered light signal and combinations thereof for propagating the signals at least one of one way and bidirectional;

a driver circuit for propagating signals selected from a group comprising IR, RF, light and electrical signals via a plurality of ports selected from a group comprising at least one input, at least one output, at least one adjustable input, at least one adjustable output, said converter circuit, and combinations thereof;

a distributor circuit including at least one said driver circuit for distributing said electrical signals to low voltage devices of said automation network selected from a group comprising a keypad, said driver circuit, said converter circuit, a receiver for current sensor signal, a touch screen, a controller, a USB driver, a USB converter, and combinations thereof and said light signal to power devices selected from a group comprising appliances, light bulbs, light fixtures, power switches, power relays, power outlets, power plugs and combinations thereof; and a keypad circuit, a current sensor adaptor circuit, a power cable assembly circuit, a power outlet circuit, a power switch circuit and combinations thereof.

9. The method to integrate an electrical operated appliance into an automation network according to claim 3, wherein said electrical operated appliance is an LED light bulb and said optical access is provided through a base of said LED light bulb and said loading includes mix data selected from a group comprising said location, individual light address, color select program, illumination select program, level select program and combinations thereof via a loader selected from a group comprising hand held remote control unit including loading adaptor for a threaded said base, hand held remote control unit including loading adaptor for a plug-in said base and a self-contained data loader including at least one of said threaded base and said plug-in base.

10. The method to integrate an electrical operated appliance into an automation network according to claim 4, wherein said electrical operated appliance is an LED light bulb and said single optical access is provided through a base of said LED light bulb and said loading includes mix data selected from a group comprising said location, individual light address, color select program, illumination select program, level select program and combinations thereof via a loader selected from a group comprising hand held remote control unit including loading adaptor for a threaded said base, hand held remote control unit including loading adaptor for a plug-in said base and a self-contained data loader including at least one of said threaded base and said plug-in base.

11. The method to integrate an electrical operated appliance into an automation network according to claim 9, wherein said self-contained data loader provides for printing one of the whole and a portion of the particulars of said mix data appended to said bulb.

12. The method to integrate an electrical operated appliance into an automation network according to claim 10, wherein said self-contained data loader provides for printing one of a whole and a portion of the particulars of said mix data loaded to said bulb.

13. The method to integrate an electrical operated appliance into an automation network according to claim 8, wherein a protocol of said network commands are composed of a header for identifying said signal, a checksum trailer and at least three data blocks comprising sub header codes for identifying a nature of command of at least one of said operating and said acknowledging, link codes for identifying a control source, a source location and said location of said electrical operated appliance and ID codes containing function commands of said at least one of said operating and said acknowledging to and by at least one of said electrical operated appliance and said relay.

14. The method to integrate an electrical operated appliance into an automation network according to claim 13, wherein said function commands include commands selected from a group comprising download, update and combinations thereof for enabling a string of data exchange between said network devices selected from the group comprising said converter, said driver, said distributor, said power relay, said keypad, said controller, current sensor adaptor, said current sensor receiver, said power outlet, said power plug and between said network devices and said electrical operated appliance.

15. The method to integrate an electrical operated appliance into an automation network according to claim 13, wherein same said link codes and said ID codes are exchanged for at least one of said operating and said acknowledging and wherein said operating including said loading and said acknowledging are differentiated by said sub header codes.

16. The method to integrate an electrical operated appliance into an automation network according to claim 13, wherein same said ID codes for at least one of operate and acknowledge of at least one of a basic function and an extended function are differentiated by said sub header codes.

17. The method to integrate an electrical operated appliance into an automation network according to claim 13, wherein at least one of same ID codes and different ID codes for said at least one of operating and acknowledging selected from a group comprising same appliances, different appliances, same relay circuits, different relay circuits and combinations thereof are differentiated by said sub header codes.

18. The method to integrate an electrical operated appliance into an automation network according to claim 8, wherein said electrical operated appliance is at least one of an alarm and an emergency device and said distributor propagates at least one of alarm and emergency command via one of said controller and a USB driver via a PC through a network selected from a group comprising, private, dedicated, public, the Internet and combinations thereof.

19. The method to integrate an electrical operated appliance into an automation network according to claim 18, wherein said emergency command opens an hands free voice communication via one of a video interphone monitor and an audio system including speaker and a microphone via said network selected from a group comprising, private, dedicated, public, the Internet and combinations thereof.

20. A data structure for loading into a control medium configured to store setting information of at least one of a location and a type of an appliance associated with remote control commands of an automation network of premises, said data structure composed of a header for identifying a signal of said remote control selected from a group comprising visual light, IR, RF and electrical signal, a checksum trailer and at least three data blocks comprising;

sub header codes for identifying a nature of a command selected from a group comprising loading, updating, operating and acknowledging, link codes for identifying a source control, a source location and said location of said electrical operated appliance, and ID codes containing function commands commensurate with said loading, updating, operating and acknowledging of at least one of said electrical operated appliance and a relay circuit associated with said automation network and said electrical operated appliance including a status of said loading and updating.

21. The data structure for loading according to claim 20, wherein said relay circuit is selected from a group comprising a converter circuit for converting electrical signal to light signal, light signal to electrical signal, electrical signal to IR signal, IR signal to electrical signal, electrical signal to RF signal, RF signal to electrical signal, light signal to IR signal, IR signal to Light signal, light signal to RF signal, RF signal to light signal, IR signal to RF signal, RF signal to IR signal, electrical signal to buffered electrical signal, IR signal to buffered IR signal, RF signal to buffered RF signal, light signal to buffered light signal and combinations thereof for propagating the signals at least one of one way and bidirectional;
- a driver circuit for propagating signals selected from a group comprising IR, RF, light and electrical signals via a plurality of ports selected from a group comprising at least one input, at least one output, at least one adjustable input, at least one adjustable output, said converter circuit and combinations thereof;
- a distributor circuit including at least one said driver circuit for distributing said electrical signals to low voltage devices of said automation network selected from a group comprising a keypad, said driver circuit, said converter, a receiver for current sensor signal, a touch screen, a controller, a USB driver, a USB converter, and combinations thereof and said light signals to power devices selected from a group comprising appliances, light bulbs, light fixtures, power switches, power relays, power outlets, power plugs and combinations thereof; and
- a keypad circuit, a current sensor adaptor circuit, a power cable assembly circuit, a power outlet circuit, a power switch circuit and combinations thereof.

22. The data structure for loading according to claim 21, wherein said function commands selected from a group comprising loading and updating enables to transfer a string of data between said relay circuits, between said relay circuits and low voltage devices of said automation network, between said low voltage devices of said automation network and said electrical operated appliance, between said relay circuits and power devices and between said relay circuits and said electrical operated appliance.

23. The data structure for loading according to claim 20, wherein same said link codes and said ID codes are exchanged for at least one of said operating and said acknowledging and wherein said operating including one of loading and updating are differentiated from said acknowledging by said sub header codes.

24. The data structure for loading according to claim 20, wherein same said ID codes are differentiated for at least one of operate and acknowledge for at least one of a basic functions and an extended functions by said sub header codes.

25. An apparatus for integrating an electrical operated appliance into an automation network of premises by introducing an identifying data of at least one of a location and a type of said electrical operated appliance via one of loaded into a medium associated with said electrical operated appliance for storing setting data and appended to an original commands protocol of a remote control of said electrical operated appliance via at least one of a memory and a setting switch;
- said location is arbitrary set and said electrical operated appliance is operated by at least one of receiving operate command and responding by transmitting status command via at least one of a remote control circuit included in said apparatus and a relay circuit;
- said remote control circuit include a receiver and a transmitter for at least one of receive and transmit signal of said remote control, a digital signal processor, and at least one of said memory and said setting switch; and
- wherein at least one of said medium and said commands protocol is one of loaded and appended with said identifying data by a setting selected from a group comprising direct loading to said memory, said operate command to update said memory, by at least one said setting switch and combinations thereof for enabling said electrical operated appliance to remotely link for at least one of operate and acknowledge its status on a basis of said identifying data.

26. The apparatus for integrating an electrical operated appliance into an automation network according to claim 25, wherein said signal is selected from a group comprising a visual light signal, an IR signal, a UV signal, an RF signal, a low voltage electrical signal and combinations thereof.

27. The apparatus for integrating an electrical operated appliance into an automation network according to claim 25, wherein at least one of an IR signal and a visual light signal and said at least one of a receiver and a transmitter include an optical access for receiving commands via one of a lightguide and in air in line of sight.

28. The apparatus for integrating an electrical operated appliance into an automation network according to claim 25, wherein at least one of an IR signal and a visual light signal and said receiver and said transmitter are packaged into a transceiver with a single optical access for bidirectionally propagating commands via a single lightguide.

29. The apparatus for integrating an electrical operated appliance into an automation network according to claim 25, wherein a local location is included in the appended identifying data in addition to said arbitrary set location for operating said electrical operated appliance from within an appliance location.

30. The apparatus for integrating an electrical operated appliance into an automation network according to claim 29, wherein commands of said automation network are updated with particulars selected from a group comprising a location, said type, a portion of said original commands protocol, a whole of said original commands and combinations thereof and said electrical operated appliance is programmed to respond to commands selected from a group comprising said original commands, said original commands when an appended data match, said appended data match, said original commands when said appended data is local, said network commands when an updated particulars match, said network commands when said updated particulars is local and combinations thereof.

31. The apparatus for integrating an electrical operated appliance into an automation network according to claim 25, wherein one of a wireless remote control unit of said electrical operated appliance and said automation network is used for loading at least one of said identifying data and command particulars into said memory of at least one of said electrical operated appliance and said relay circuit, wherein said command particulars pertain to at least one of said operating and said acknowledging of said electrical operated appliance via one of direct and said relay circuit.

32. The apparatus for integrating an electrical operated appliance into an automation network according to claim 25, wherein said relay circuit is selected from a group comprising a converter circuit for converting electrical signal to light signal, light signal to electrical signal, electrical signal to IR signal, IR signal to electrical signal, electrical signal to RF signal, RF signal to electrical signal, light signal to IR signal, IR signal to Light signal, light signal to RF signal, RF signal to light signal, IR signal to RF signal, RF signal to IR signal, electrical signal to buffered electrical signal, IR signal to buffered IR signal, RF signal to buffered RF signal, light signal to buffered light signal and combinations thereof for propagating the signals at least one of one way and bidirectional;
- a driver circuit for propagating signals selected from a group comprising IR, RF, light and electrical signals via a plurality of ports selected from a group comprising at least one input, at least one output, at least one adjustable input, at least one adjustable output, said converter circuit and combinations thereof;
- a distributor circuit including at least one said driver circuit for distributing said electrical signals to low voltage devices of said automation network selected from a group comprising a keypad, said driver circuit, said converter circuit, a receiver for current sensor signal, a touch screen, a controller, a USB driver, a USB converter, and combinations thereof and said light signals to power devices selected from a group comprising appliances, light bulbs, light fixtures, power switches, power relays, power outlets, power plugs and combinations thereof; and
- a keypad circuit, a current sensor adaptor circuit, a power cable assembly circuit, a power outlet circuit, a power switch circuit and combinations thereof.

33. The apparatus for integrating an electrical operated appliance into an automation network according to claim 27, wherein said electrical operated appliance is an LED light bulb and said optical access is provided through a base of said LED light bulb and loaded data further include mix data selected from a group comprising said location, individual light address, color select program, illumination select program, level select program and combinations thereof via a loader selected from a group comprising hand held remote control unit including loading adaptor for a threaded said base, hand held remote control unit including loading adaptor for a plug-in Raid base and a self-contained data loader including at least one of said threaded base and said plug-in base.

34. The apparatus for integrating an electrical operated appliance into an automation network according to claim 28, wherein said electrical operated appliance is an LED light bulb and said optical access is provided through a base of said LED light bulb and loaded data further include mix data selected from a group comprising said location, individual light address, color select program, illumination select program, level select program and combinations thereof via a loader selected from a group comprising hand held remote control unit including loading adaptor for a threaded said base, hand held remote control unit including loading adaptor for a plug-in said base and a self-contained data loader including at least one of said threaded base and said plug-in base.

35. The apparatus for integrating an electrical operated appliance into an automation network according to claim 33, wherein said self-contained data loader provides for printing one of a whole and a portion of particulars of said mix data loaded to said bulb.

36. The apparatus for integrating an electrical operated appliance into an automation network according to claim 34, wherein said self-contained data loader provides for printing one of the whole and a portion of particulars of said mix data loaded to said bulb.

37. The apparatus for integrating an electrical operated appliance into an automation network according to claim 25, wherein said relay circuit is included in a power plug and said switch setting of at least one of said arbitrary location and said type is provided via one of said memory and said at least one setting switch.

38. The apparatus for integrating an electrical operated appliance into an automation network according to claim 25, wherein said relay circuit is included in a current sensor adaptor and said setting of at least one of said arbitrary location and said type is provided via one of said memory and said at least one setting switch.

39. The apparatus for integrating an electrical operated appliance into an automation network according to claim 25, wherein said relay circuit is included in a power outlet and said switch setting of at least one of said arbitrary location and said type is provided via one of said memory and said at least one setting switch.

* * * * *